(12) United States Patent
Vidal, Jr. et al.

(10) Patent No.: US 12,005,456 B2
(45) Date of Patent: Jun. 11, 2024

(54) FIBER WASHING METHOD AND SYSTEM

(71) Applicant: Novozymes A/S, Bagsvaerd (DK)

(72) Inventors: Bernardo Vidal, Jr., Wake Forest, NC (US); Oscar Pastor Ferrer, Madrid (ES); Scott R. McLaughlin, Wake Forest, NC (US); Randall Deinhammer, Wake Forest, NC (US); Thomas Patrick Gibbons, Wake Forest, NC (US)

(73) Assignee: Novozymes A/S, Bagsvaerd (DK)

( * ) Notice: Subject to any disclaimer, the term of this patent is extended or adjusted under 35 U.S.C. 154(b) by 1065 days.

(21) Appl. No.: 16/326,952

(22) PCT Filed: Sep. 15, 2017

(86) PCT No.: PCT/US2017/051701
§ 371 (c)(1),
(2) Date: Feb. 21, 2019

(87) PCT Pub. No.: WO2018/053220
PCT Pub. Date: Mar. 22, 2018

(65) Prior Publication Data
US 2020/0009573 A1 Jan. 9, 2020

Related U.S. Application Data

(60) Provisional application No. 62/395,545, filed on Sep. 16, 2016, provisional application No. 62/426,711, (Continued)

(30) Foreign Application Priority Data

Jan. 16, 2017 (EP) .................................... 17151610

(51) Int. Cl.
*B02B 1/04* (2006.01)
*A23L 7/10* (2016.01)
(Continued)

(52) U.S. Cl.
CPC ................ *B02B 1/04* (2013.01); *A23L 7/115* (2016.08); *A23L 7/197* (2016.08); *A23L 29/225* (2016.08);
(Continued)

(58) Field of Classification Search
CPC . B02B 1/04; A23L 7/197; A23L 7/115; A23L 29/225; A23N 12/02; C08B 30/02; C08B 30/044; C08B 30/08; C08B 30/16
(Continued)

(56) References Cited

U.S. PATENT DOCUMENTS 5,066,218 A   11/1991   Silver
5,073,201 A   12/1991   Giesfeldt
(Continued)

FOREIGN PATENT DOCUMENTS

CN   202626066   4/2012
CN   103649308   3/2014
(Continued)

OTHER PUBLICATIONS

Guo et al., Proc. Natl. Acad. Sci. USA, vol. 101, pp. 9205-9210 (2004).
(Continued)

*Primary Examiner* — Brent T O'Hern
(74) *Attorney, Agent, or Firm* — David A. Fazzolare

(57) ABSTRACT

The present invention provides to a fiber washing system, optimized for the use of hydrolytic enzymes in the system. Furthermore, the present invention provides to a method for improving starch and gluten yield in a wet milling process, preferably comprising the optimized fiber washing system.

22 Claims, 10 Drawing Sheets

Specification includes a Sequence Listing.

Related U.S. Application Data filed on Nov. 28, 2016, provisional application No. 62/468,704, filed on Mar. 8, 2017.

(51) Int. Cl.
| | |
|---|---|
| *A23L 29/225* | (2016.01) |
| *A23N 12/02* | (2006.01) |
| *C08B 30/02* | (2006.01) |
| *C08B 30/04* | (2006.01) |
| *C08B 30/08* | (2006.01) |
| *C08B 30/16* | (2006.01) |

(52) U.S. Cl.
CPC .............. *A23N 12/02* (2013.01); *C08B 30/02* (2013.01); *C08B 30/044* (2013.01); *C08B 30/08* (2013.01); *C08B 30/16* (2013.01)

(58) Field of Classification Search
USPC ........................................................ 99/156
See application file for complete search history.

(56) References Cited

U.S. PATENT DOCUMENTS

| | | | |
|---|---|---|---|
| 6,566,125 | B2 | 5/2003 | Johnston |
| 2003/0070673 | A1 | 4/2003 | Liaw et al. |
| 2006/0003433 | A1 | 1/2006 | Steer et al. |
| 2007/0059432 | A1 | 3/2007 | Norman et al. |
| 2008/0286435 | A1 | 11/2008 | Fukumori et al. |
| 2012/0244590 | A1* | 9/2012 | Lee .................. C12M 21/12 |
| | | | 435/289.1 |
| 2012/0288900 | A1* | 11/2012 | He .................... C08B 30/02 |
| | | | 435/99 |
| 2014/0150137 | A1 | 5/2014 | Spodsberg et al. |
| 2016/0040203 | A1 | 2/2016 | St. John |
| 2016/0257981 | A1 | 9/2016 | Long |
| 2017/0183283 | A1 | 6/2017 | Vidal et al. |
| 2017/0202242 | A1 | 7/2017 | Blom |
| 2020/0009573 | A1 | 1/2020 | Vidal et al. |
| 2020/0140909 | A1 | 5/2020 | Gibbons et al. |

FOREIGN PATENT DOCUMENTS

| | | |
|---|---|---|
| CN | 104448011 A | 3/2015 |
| CN | 104812778 | 7/2015 |
| EP | 17151610.7 | 1/2017 |
| JP | 05277394 B2 | 8/2013 |
| WO | 02/00731 A1 | 1/2002 |
| WO | 02/00911 A1 | 1/2002 |
| WO | 02/02644 A1 | 1/2002 |
| WO | 2014/082564 A1 | 6/2014 |
| WO | 2014/082566 A1 | 6/2014 |
| WO | 2016/005519 A1 | 1/2016 |
| WO | 2016/005521 A1 | 1/2016 |
| WO | 2016/005522 A1 | 1/2016 |
| WO | 2016095856 A1 | 6/2016 |
| WO | 2017/088820 A1 | 6/2017 |
| WO | 2018/095408 A1 | 5/2018 |
| WO | 2019023222 A1 | 1/2019 |

OTHER PUBLICATIONS

Miyauchi et al., New Biotechnology, vol. 30, pp. 523-530 (2013).
Schulein, Methods in Enzymology, vol. 160, pp. 234-242 (1998).
Bier et al., 1974, Die Starke 26, 23-28.
Ramirez et al., 2009, biotechnology for biofuels 2, 1-9.
Maskow, Biotechnology, Fundamentals in Biotechnology, vol. IV, pp. 30-32 (2009).
Johnston et al., Cereal Chemistry, vol. 81, No. 5, pp. 626-632 (2004).
Anonymous, 2017, Glycoside Hydrolase Family 30.
KANTOR_2017_UniprotKB_No._A0A1Q4FVU7.
YUKI_2014_UniprotKB_No._W4QEI7.

* cited by examiner

FIBER WASHING METHOD AND SYSTEM

CROSS-REFERENCE TO RELATED APPLICATIONS

This application is a 35 U.S.C. 371 national application of international application no. PCT/US2017/051701 filed Sep. 15, 2017, which claims priority or the benefit under 35 U.S.C. 119 of European application no. 17151610.7 filed Jan. 16, 2017 and U.S. provisional application Nos. 62/395,545, 62/426,711 and 62/468,704 filed Sep. 16, 2016, Nov. 28, 2016 and Mar. 8, 2017, respectively. The content of each application is fully incorporated herein by reference.

FIELD OF THE INVENTION

The present invention relates to a fiber washing system, optimized for the use of hydrolytic enzymes in the system. Furthermore, the present invention relates to a method for improving starch and gluten yield in a wet milling process, preferably comprising the optimized fiber washing system.

BACKGROUND OF THE INVENTION

Conventional wet milling of corn is a process designed for the recovery and purification of starch and several coproducts including germ, gluten and fiber.

Fiber is the least valuable coproduct, so the industry has put substantial effort into increasing the yield of the more valuable products, such as starch and gluten, while decreasing the fiber fraction. High quality starch is valuable as it can be used for a variety of commercial purposes after further processing to products such as dried starch, modified starch, dextrins, sweeteners and alcohol. Gluten is usually used for animal feed, as corn gluten meal (Around 60% protein) or corn gluten feed (Around 20% protein).

The wet milling process can vary significantly dependent on the specific mill equipment used, but usually the process include: grain cleaning, steeping, grinding, germ separation, a second grinding, fiber separation, gluten separation and starch separation. After cleaning the corn kernels, they are typically softened by soaking in water or in a dilute $SO_2$ solution under controlled conditions of time and temperature. Then, the kernels are grinded to break down the pericarp and the germ is separated from the rest of the kernel. The remaining slurry, mainly consisting of fiber, starch and gluten is finely ground and screened in a fiber washing process, to separate the fiber from starch and gluten, before the gluten and starch is separated and the starch can be purified in a washing/filtration process.

The use of enzymes in several steps of the wet milling process has been suggested, such as the use of enzymes for the steeping step of wet milling processes. The commercial enzyme product Steepzyme® (available from Novozymes A/S) has been shown suitable for the first step in wet milling processes, i.e., the steeping step where corn kernels are soaked in water.

More recently, "enzymatic milling", a modified wet milling process that uses proteases to significantly reduce the total processing time during corn wet milling and eliminates the need for sulfur dioxide as a processing agent, has been developed. Johnston et al., *Cereal Chem*, 81, p. 626-632 (2004).

U.S. Pat. No. 6,566,125 discloses a method for obtaining starch from maize involving soaking maize kernels in water to produce soaked maize kernels, grinding the soaked maize kernels to produce a ground maize slurry, and incubating the ground maize slurry with enzyme (e.g., protease).

U.S. Pat. No. 5,066,218 discloses a method of milling grain, especially corn, comprising cleaning the grain, steeping the grain in water to soften it, and then milling the grain with a cellulase enzyme.

WO 2002/000731 discloses a process of treating crop kernels, comprising soaking the kernels in water for 1-12 hours, wet milling the soaked kernels and treating the kernels with one or more enzymes including an acidic protease.

WO 2002/000911 discloses a process of starch gluten separation, comprising subjecting mill starch to an acidic protease.

WO 2002/002644 discloses a process of washing a starch slurry obtained from the starch gluten separation step of a milling process, comprising washing the starch slurry with an aqueous solution comprising an effective amount of acidic protease.

WO 2014/082566 and WO 2014/082564 disclose cellulolytic compositions for use in wet milling.

While the art has investigated the effect of using enzymes in corn wet milling, during steeping/soaking of corn kernels, during grinding of the corn kernels and in starch gluten separation, there is still a need for improved enzyme technology that may lower the energy expenditure and costs associated with corn wet milling and provide increased yield of starch and gluten.

SUMMARY OF THE INVENTION

The present invention relates to a fiber washing system which can be used in corn wet milling and is optimized for use of hydrolytic enzymes in the system.

Furthermore, the present invention relates to a method for improving starch yield and/or gluten yield from corn kernels in a wet milling process, by contacting one or more fractions of the corn kernel mass with an effective amount of one or more hydrolytic enzymes for at least 35 minutes during fiber washing.

In a first aspect, the invention relates to a fiber washing system comprising a plurality of screen units being fluidly connected in a counter current washing configuration; each screen unit is configured for separating a stream of corn kernel mass and liquid into two fractions:
- a first fraction and a second fraction, said second fraction containing a higher amount measured in wt % fiber than the first fraction;
- a space arranged in the system and being fluidly connected to receive one of said first fraction, one of said second fraction, or a mixed first and second fraction, preferably only a second fraction, and configured to provide an incubation time for one or both fractions received in the space; and outletting the thereby incubated one or both fractions to a downstream screen unit, wherein the system is configured for inletting corn kernel mass and liquid to the most upstream screen unit, outletting the first fraction from the most upstream screen unit as a product stream containing starch, inletting process water, preferably arranged for inletting process water to a most downstream screen unit, outletting the second fraction from most downstream screen unit as a washed corn kernel mass containing a lower amount of starch and gluten than the original corn kernel mass.

introducing hydrolytic enzymes into the system.

In a second aspect, the invention relates to an incubator comprising a number of fluidic serially connected chambers by an opening forming a passage between two neighbouring chambers through which opening material may flow from an upstream to a downstream chamber), wherein
- a most upstream chamber being connected to receive said first fraction, said second fraction or a combination of a first and a second fraction, and
- a most downstream chamber having an outlet connection adapted to deliver incubated material out from the incubator;

the incubator further comprising one or more agitators configured for preventing solid decantation in the incubator.

An incubator according the second aspect may advantageously be used in a fiber washing system according the first aspect but is not considered limited to this use.

In a third aspect, the invention relates to a method to improve starch yield and/or gluten yield from corn kernels in a wet milling process, comprising the steps of:
- a) soaking the kernels in water to produce soaked kernels;
- b) grinding the soaked kernels;
- c) separating germs from the ground and soaked kernels to produce a corn kernel mass comprising fiber, starch and gluten; and
- d) subjecting the resultant corn kernel mass, to a fiber washing procedure;

wherein during step d) one or more fractions of the corn kernel mass is contacted with an effective amount of one or more hydrolytic enzymes, and step d) has a total retention time of at least 45 minutes.

BRIEF DESCRIPTION OF THE FIGURES

The present invention and in particular preferred embodiments according to the invention will be described in more detail with reference to the accompanying figures. The figures show ways of implementing the present invention and are not to be construed as being limiting to other possible embodiments falling within the scope of the attached claim set.

FIG. 7A illustrates the incubator in a vertical cross sectional view, FIG. 7B details on agitators arranged inside the incubator and FIG. 7C shows a horizontal cross sectional view along A-A.

DETAILED DESCRIPTION

Figure 1:
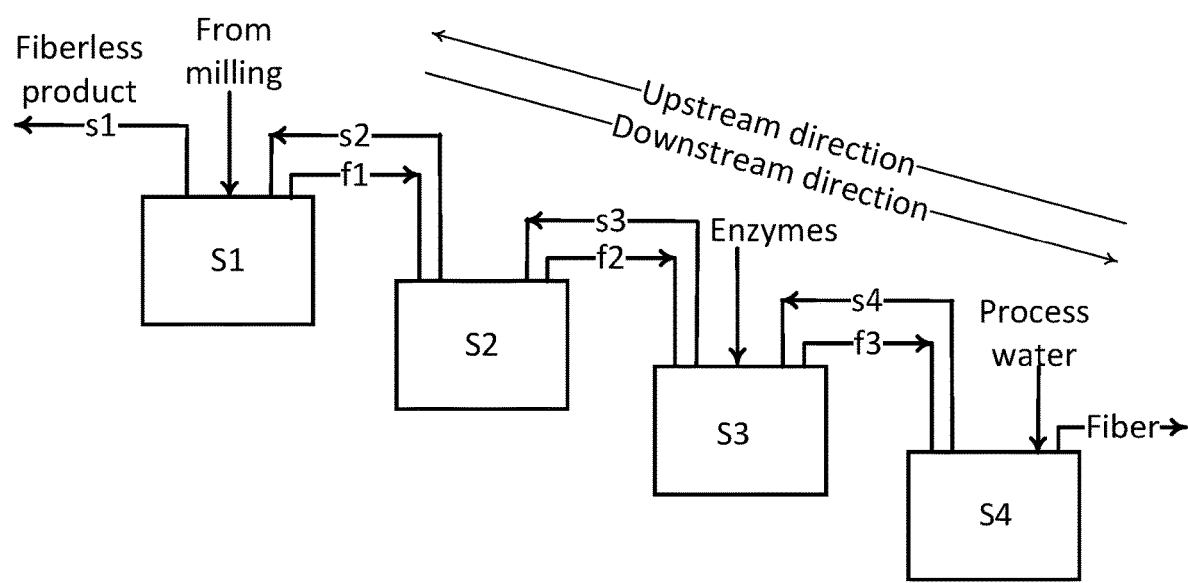
FIG. 1 schematically illustrates a first embodiment of a counter current fiber wash system according to present invention, FIG. 2 schematically illustrates a further embodiment of a system according to the present invention.

It is an object of the present invention to provide a fiber washing system optimized for the use of hydrolytic enzymes. Furthermore, it is an object of the present invention to provide a method that improves starch and gluten yield from corn kernels in a wet milling process. Other benefits of the invention include improved fiber dewatering and an anti-foaming effect.

The Wet Milling Process:

Corn kernels are wet milled in order to open up the kernels and separate the kernels into its four main constituents: starch, germ, fiber and gluten.

The wet milling process can vary significantly from mill to mill, however conventional wet milling usually comprises the following steps:
1. Steeping and germ separation,
2. Fiber washing, pressing and drying,
3. Starch/gluten separation, and
4. Starch washing.

1. Steeping, Grinding and Germ Separation

Corn kernels are softened by soaking in water for between about 30 minutes to about 48 hours, preferably 30 minutes to about 15 hours, such as about 1 hour to about 6 hours at a temperature of about 50° C., such as between about 45° C. to 60° C. During steeping, the kernels absorb water, increasing their moisture levels from 15 percent to 45 percent and more than doubling in size. The optional addition of e.g. 0.1 percent sulfur dioxide ($SO_2$) and/or $NaHSO_3$ to the water prevents excessive bacteria growth in the warm environment. As the corn swells and softens, the mild acidity of the steepwater begins to loosen the gluten bonds within the corn and release the starch. After the corn kernels are steeped they are cracked open to release the germ. The germ contains corn oil. The germ is separated from the heavier density mixture of starch, gluten and fiber essentially by "floating" the germ segment free of the other substances under closely controlled conditions. This method serves to eliminate any adverse effect of traces of corn oil in later processing steps.

2. Fiber Washing, Pressing and Drying

To get maximum starch and gluten recovery, while keeping any fiber in the final product to an absolute minimum, it is necessary to wash the free starch and gluten from the fiber during processing. The free starch and gluten is separated from fiber during screening (washing) and collected as mill starch. The remaining fiber is then pressed to decrease the water content and dried.

3. Starch Gluten Separation

The starch-gluten suspension from the fiber-washing step, called mill starch, is separated into starch and gluten. Gluten has a low density compared to starch. By passing mill starch through a centrifuge, the gluten is readily spun out.

4. Starch Washing

The starch slurry from the starch separation step contains some insoluble protein and much of solubles. They have to be removed before a top quality starch (high purity starch) can be made. The starch, with just one or two percent protein remaining, is diluted, washed 8 to 14 times, re-diluted and washed again in hydroclones to remove the last trace of protein and produce high quality starch, typically more than 99.5% pure.

Products of Wet Milling:

Wet milling can be used to produce, without limitation, corn steep liquor, corn gluten feed, germ, corn oil, corn gluten meal, corn starch, modified corn starch, syrups such as corn syrup, and corn ethanol.

Definition of Enzymes

Arabinofuranosidases/polypeptide with arabinofuranosidase activity: The term "arabinofuranosidase" means an alpha L-arabinofuranoside arabinofuranohydrolase (EC 3.2.1.55) that catalyzes the hydrolysis of terminal non-reducing alpha-L-arabinofuranoside residues in alpha-L-arabinosides. The enzyme acts on alpha-L-arabinofuranosides, alpha-L-arabinans containing (1,3)- and/or (1,2)- and/or (1,5)-linkages, arabinoxylans, and arabinogalactans. Alpha-L arabinofuranosidase is also known as arabinosidase, alpha-arabinosidase, alpha-L-arabinosidase, alphaarabinofuranosidase, polysaccharide alpha-L-arabinofuranosidase, alpha-L-arabinofuranoside hydrolase, L-arabinosidase, or alpha-L-arabinanase. Arabinofuranosidase activity can be determined using 5 mg of medium viscosity wheat arabinoxylan (Megazyme International Ireland, Ltd., Bray, Co. Wicklow, Ireland) per ml of 100 mM sodium acetate pH 5 in a total volume of 200 µl for 30 minutes at 40° C. followed by arabinose analysis by AMINEX® HPX-87H column chromatography (Bio-Rad Laboratories, Inc., Hercules, Calif., USA).

Beta-glucosidase/polypeptide with beta-glucosidase activity: The term "beta-glucosidase" means a beta-D-glucoside glucohydrolase (E.C. 3.2.1.21) that catalyzes the hydrolysis of terminal non-reducing beta-D-glucose residues with the release of beta-D-glucose. Beta-glucosidase activity can be determined using pnitrophenyl-beta-D-glucopyranoside as substrate according to the procedure of Venturi et al., 2002, *J. Basic Microbiol.* 42: 55-66. One unit of beta-glucosidase is defined as 1.0 µmole of pnitrophenolate anion produced per minute at 25° C., pH 4.8 from 1 mM p-nitrophenyl-beta-Dglucopyranoside as substrate in 50 mM sodium citrate containing 0.01% TWEEN® 20.

Beta-xylosidase/polypeptide with beta-xylosidase activity: The term "beta-xylosidase" means a beta-D-xyloside xylohydrolase (E.C. 3.2.1.37) that catalyzes the exo-hydrolysis of short beta (1-4)-xylooligosaccharides to remove successive D-xylose residues from non-reducing termini. Beta-xylosidase activity can be determined using 1 mM p-nitrophenyl-beta-D-xyloside as substrate in 100 mM sodium citrate containing 0.01% TWEEN® 20 at pH 5, 40° C. One unit of beta-xylosidase is defined as 1.0 µmole of p15 nitrophenolate anion produced per minute at 40° C., pH 5 from 1 mM p-nitrophenyl-beta-Dxylosidein 100 mM sodium citrate containing 0.01% TWEEN® 20.

Cellobiohydrolase/polypeptide with cellobiohydrolase activity: The term "cellobiohydrolase" means a 1,4-beta-D-glucan cellobiohydrolase (E.C. 3.2.1.91 and E.C. 3.2.1.176) that catalyzes the hydrolysis of 1,4-beta-D15 glucosidic linkages in cellulose, cellooligosaccharides, or any beta-1,4-linked glucose containing polymer, releasing cellobiose from the reducing end (cellobiohydrolase I) or non-reducing end (cellobiohydrolase II) of the chain (Teeri, 1997, *Trends in Biotechnology* 15: 160-167; Teeri et al., 1998, *Biochem. Soc. Trans.* 26: 173-178). Cellobiohydrolase activity can be determined according to the procedures described by Lever et al., 1972, *Anal. Biochem.* 47: 273-279; van Tilbeurgh et al., 1982, *FEBS Letters* 149: 152-156; van Tilbeurgh and Claeyssens, 1985, *FEBS Letters* 187: 283-288; and Tomme et al., 1988, *Eur. J. Biochem.* 170: 575-581.

Cellulolytic enzyme or cellulase/polypeptide with cellulase activity or cellulolytic activity: The term "cellulolytic enzyme" or "cellulase" means one or more (e.g., several) enzymes that hydrolyze a cellulosic material, which comprise any material comprising cellulose, such as fiber. Cellulytic enzymes include endoglucanase(s) (E.C 3.2.1.4), cellobiohydrolase(s) (E.C 3.2.1.91 and E.C 3.2.1.150), beta-glucosidase(s) (E.C. 3.2.1.21), or combinations thereof. The two basic approaches for measuring cellulolytic enzyme activity include: (1) measuring the total cellulolytic enzyme activity, and (2) measuring the individual cellulolytic enzyme activities (endoglucanases, cellobiohydrolases, and beta-glucosidases) as reviewed in Zhang et al., 2006, *Biotechnology Advances* 24: 452-481. Total cellulolytic enzyme activity can be measured using insoluble substrates, including Whatman No. 1 filter paper, microcrystalline cellulose, bacterial cellulose, algal cellulose, cotton, pretreated lignocellulose, etc. The most common total cellulolytic activity assay is the filter paper assay using Whatman No. 1 filter paper as the substrate. The assay was established by the *International Union of Pure and Applied Chemistry* (IUPAC) (Ghose, 1987, *Pure Appl. Chem.* 59: 257-68).

Cellulolytic enzyme activity can be determined by measuring the increase in production/release of sugars during hydrolysis of a cellulosic material by cellulolytic enzyme(s) under the following conditions: 1-50 mg of cellulolytic enzyme protein/g of cellulose in pretreated corn stover (PCS) (or other pretreated cellulosic material) for 3-7 days at a suitable temperature such as 40° C.–80° C., e.g., 40° C., 45° C., 50° C., 55° C., 60° C., 65° C., 70° C., 75° C., or 80° C., and a suitable pH, such as 4-9, e.g., 4.0, 4.5, 5.0, 5.5, 6.0, 6.5, 7.0, 7.5, 8.0, 8.5, or 9.0, compared to a control hydrolysis without addition of cellulolytic enzyme protein. Typical conditions are 1 ml reactions, washed or unwashed PCS, 5% insoluble solids (dry weight), 50 mM sodium acetate 5 pH 5, 1 mM MnSO4, 50° C., 55° C., or 60° C., 72 hours, sugar analysis by AMINEX® HPX-87H column chromatography (Bio-Rad Laboratories, Inc., Hercules, Calif., USA).

Hydrolytic enzymes or hydrolase/polypeptide with hydrolase activity: "Hydrolytic enzymes" refers to any catalytic protein that use water to break down substrates. Hydrolytic enzymes include cellulases (EC 3.2.1.4), xylanases (EC 3.2.1.8) arabinofuranosidases (EC 3.2.1.55 (Non-reducing end alpha-L-arabinofuranosidases); EC 3.2.1.185 (Non-reducing end beta-L-arabinofuranosidases) cellobiohydrolase I (EC 3.2.1.150), cellobiohydrolase II (E.C. 3.2.1.91), cellobiosidase (E.C. 3.2.1.176), beta-glucosidase (E.C. 3.2.1.21), beta-xylosidases (EC 3.2.1.37).

Xylanases/polypeptide with xylanase activity: The term "xylanase" means a 1,4-beta-D-xylan-xylohydrolase (E.C. 3.2.1.8) that catalyzes the endohydrolysis of 1,4-beta-D-xylosidic linkages in xylans. Xylanase activity can be determined with 0.2% AZCL-arabinoxylan as substrate in 0.01% TRITON® X-100 and 200 mM sodium phosphate pH 6 at 37° C. One unit of xylanase activity is defined as 1.0 µmole of azurine produced per minute at 37° C., pH 6 from 0.2% AZCL-arabinoxylan as substrate in 200 mM sodium phosphate pH 6.

Other Definitions

In the present context, terms are used in manner being ordinary to a skilled person. Some of these terms are elucidated below:

Anti-foaming effect: Foaming is a widely observed phenomenon in wet milling. An "anti-foaming effect" refers to means of reducing foaming.

Contact time: For one or more enzymes to react with a substrate, the one or more enzymes have to be in contact with the substrate. "Contact time" refers to the time period in which an effective amount of one or more enzymes is in contact with at least a fraction of a substrate mass. The enzymes may not be in contact with all of the substrate mass during the contact time, however mixing the one or more enzymes with a substrate mass allows the potential of enzymatically catalyzed hydrolysis of a fraction of the substrate mass during the contact time.

Corn kernel: A variety of corn kernels are known, including, e.g., dent corn, flint corn, pod corn, striped maize, sweet corn, waxy corn and the like.

Some corn kernels has an outer covering referred to as the "Pericarp" that protects the germ in the kernels. It resists water and water vapour and is undesirable to insects and microorganisms. The only area of the kernels not covered by the "Pericarp" is the "Tip Cap", which is the attachment point of the kernel to the cob.

Corn kernel mass: is preferably used to reference a mass comprising fiber, gluten and starch, preferably achieved by steaming and grinding crop kernels and separating a mass comprising fiber, gluten and starch from germs. As the corn kernel mass move through the fiber washing, it is separated into several fractions, including first (s) and second fractions (f). Hence, "fractions of corn kernel mass" and "one or more fractions of corn kernel mass" refer to these first (s) and second fractions (f).

Dewatering: "Dewatering" refers to any process in which excess water is removed from corn fiber.

Expression: The term "expression" includes any step involved in the production of a polypeptide including, but not limited to, transcription, post-transcriptional modification, translation, post-translational modification, and secretion.

Germ: The "Germ" is the only living part of the corn kernel. It contains the essential genetic information, enzymes, vitamins, and minerals for the kernel to grow into a corn plant. In yellow dent corn, about 25 percent of the germ is corn oil. The endosperm covered or surrounded by the germ comprises about 82 percent of the kernel dry weight and is the source of energy (starch) and protein for the germinating seed. There are two types of endosperm, soft and hard. In the hard endosperm, starch is packed tightly together. In the soft endosperm, the starch is loose.

GH10 polypeptide: refers to a polypeptide with enzyme activity, the polypeptide being classified as member of the Glycoside hydrolase family 10 in the database of Carbohydrate-Active enZYmes (CAZymes) available at www.cazy.org. (Lombard, V.; Golaconda Ramulu, H.; Drula, E.; Coutinho, P. M.; Henrissat, B. (21 Nov. 2013). "The carbohydrate-active enzymes database (CAZy) in 2013". *Nucleic Acids Research*. 42 (D1): D490-D495; Cantarel B L, Coutinho P M, Rancurel C, Bernard T, Lombard V, Henrissat B (January 2009). "The Carbohydrate-Active EnZymes database (CAZy): an expert resource for Glycogenomics". *Nucleic Acids Res*. 37 (Database issue): D233-8).

GH11 polypeptide refers to a polypeptide with enzyme activity, the polypeptide being classified as member of the Glycoside hydrolase family 11 in the database of Carbohydrate-Active enZYmes (CAZymes).

GH62 polypeptide: refers to a polypeptide with enzyme activity, the polypeptide being classified as member of the Glycoside hydrolase family 62 in the database of Carbohydrate-Active enZYmes (CAZymes).

Gluten: Gluten is a protein, made up from two smaller proteins, glutenin and gliadin. Herein "gluten" refers to the majority of proteins found in corn kernels. The major products of gluten from corn wet milling is corn gluten meal (Approximately 60% protein) and corn gluten feed (Approximately 20% protein).

Grind or grinding: The term "grinding" refers to breaking down the corn kernels into smaller components.

Incubation time: Time in which the one or more fractions of the corn kernel mass is/are in contact with hydrolytic enzyme during fiber washing, without being screened. In many preferred embodiments, a system and method according to the present invention utilises an incubator inside which the material is "left to be affected" by the enzymes and in such situations, the incubation time may be determined by:

$$t_{it} = \frac{\text{volume of incubator } [m^3] * \text{density of inflow to incubator } [kg/m^3]}{\text{mass inflow per time unit to the incubator } [kg/s]}$$

Alternatively, if the inflow to the incubator is expressed in terms of volume per time unit:

$$t_{it} = \frac{\text{volume of incubator } [m^3]}{\text{volume inflow per time unit to the incubator } [m^3/s]}$$

Insolubles: In the present context, "insolubles" is used interchangeably with "insoluble solids"; it is defined as materials that is able to pass through a 75 μm sieve and cannot be dissolved in water.

Mill equipment: "Mill equipment" refers to all equipment used on a mill. The wet milling process will vary dependent on the available mill equipment. Examples of mill equipment can be steeping tanks, evaporator, screw press, rotatory dryer, dewatering screen, centrifuge, hydrocyclone, ect. The size, and number of each mill equipment/milling lines can vary on different mills, which will affect the milling process. For example, the number of fiber washing screen units can vary and so can the size of a centrifuge. Retention time: The total retention time, is the time period in which the corn kernel mass, received in the first screen unit (S1) and one or more fractions thereof, are contacted with an effective amount of one or more hydrolytic enzymes before leaving the fiber washing system again. During the retention time, the one or more fractions of corn kernel mass is incubated with one or more hydrolytic enzymes in a space (V), before it leaves the fiber washing system, as part of a first fraction (s1) from the most upstream screen unit (S1) or as part of a second fraction (f4) from the most downstream screen unit (S4). Retention time may preferably be estimated as the average duration of time solid mater spends in a system according to the present invention. This may be estimated by the following relation:

$$t_{rt} = \frac{\text{volume of system } [m^3] * \text{density of mass inflow } [kg/m^3]}{\text{mass inflow per time unit to the system } [kg/s]}$$

Alternatively, if the inflow to the system is expressed in terms of volume per time unit:

$$t_n = \frac{\text{volume of system } [m^3]}{\text{volume inflow per time unit to the system } [m^3/s]}$$

The volume of the system is typically set equal to the sum of the volumes of all voids in the system; however, as the tubing in the system typically is made small, and it may thus be preferred to discard the volume of the tubing in the determination of the retention time.

Screened: The term "screened" refers to the process of separating corn kernel mass into a first fraction s and a second fraction f and movement of these fractions from one screen unit to another. A screen unit may for example be a pressure-fed screen/feed pressure screen wherein material is fed through a nozzle or a rotary screen, wherein material is forced through the screen by gravity. Examples of such screens could be DSM screen and ICM screens respectively.

A non-screening period is a non-separating period provided for incubation of corn kernel mass or fractions thereof with enzymes.

Sequence identity: The relatedness between two amino acid sequences or between two nucleotide sequences is described by the parameter "sequence identity".

For purposes of the present invention, the degree of sequence identity between two amino acid sequences is determined using the Needleman-Wunsch algorithm (Needleman and Wunsch, 1970, *J. Mol. Biol.* 48: 443-453) as implemented in the Needle program of the EMBOSS package (EMBOSS: The European Molecular Biology Open Software Suite, Rice et al., 2000, *Trends Genet.* 16: 276-277), preferably version 3.0.0 or later. Version 6.1.0 was used.

The optional parameters used are gap open penalty of 10, gap extension penalty of 0.5, and the EBLOSUM62 (EMBOSS version of BLOSUM62) substitution matrix. The output of Needle labelled "longest identity" (obtained using the –nobrief option) is used as the percent identity and is calculated as follows: (Identical Residues×100)/(Length of Alignment−Total Number of Gaps in Alignment).

Starch: The term "starch" means any material comprised of complex polysaccharides of plants, composed of glucose units that occurs widely in plant tissues in the form of storage granules, consisting of amylose and amylopectin, and represented as $(C_6H_{10}O_5)_n$, where n is any number.

Steeping or soaking: The term "steeping" means soaking the crop kernel with water and optionally $SO^2$.

Viscosity: The viscosity of a fluid is a measure of its resistance to gradual deformation by shear stress or tensile stress. In the present application "viscosity" also refers to the informal concept of "thickness".

DESCRIPTION OF THE INVENTION

In processes for conventional corn wet milling fiber washing and drying procedures have been optimized to achieve maximum throughput of fiber slurry. Hence, although the fiber washing process varies from mill to mill, it typically takes less than 30 minutes, which makes it little attractive to dose enzymes during fiber washing.

The present inventors have observed that dosing enzymes in fiber washing has a surprisingly great potential: When dosed correctly and with the appropriate retention time, the enzymes provide not only dewatering of the fiber fraction; the enzymes also release considerable amounts of valuable starch and gluten bound in the fiber. Further, the inventors have observed that with correct application of enzymes in the fiber washing process the enzymes also reduce foam formation, which reduces or may even obviate the need for anti-foaming chemicals. Hence, the present invention provides means for appropriate dosing of enzymes and means of increasing contact time between enzymes and corn kernel mass in the fiber washing process In one aspect, the present invention related to a fiber washing system comprising:
  a plurality of screen units (S1 . . . S4) being fluidly connected in a counter current washing configuration; each screen unit is configured for separating a stream of corn kernel mass and liquid into two fractions: a first fraction (s) and a second fraction (f), said second fraction (f) containing a higher amount measured in wt % fiber than the first fraction (s);
  a space (V) arranged in the system and being fluidly connected to receive said first fraction (s), said second fraction (f), or a mixed first and second fraction (s,f), preferably only a second fraction (f), and configured to provide an incubation time for one or both fractions received in the space; and outletting the thereby incubated one or both fractions to a downstream screen unit (S4),
wherein the system is configured for
  inletting corn kernel mass and liquid to the most upstream screen unit (S1)
  outletting the first fraction (s1) from the most upstream screen unit (S1) as a product stream containing starch,
  inletting process water, preferably arranged for inletting process water to a most downstream screen unit (S4),
  outletting the second fraction (f4) from most downstream screen unit (S4) as a washed corn kernel mass containing a lower amount of starch and gluten than the original corn kernel mass.
  introducing hydrolytic enzymes into the system.

FIG. 1 schematically illustrates an embodiment of a fiber washing system according to the present invention. As illustrated in FIG. 1, the fiber washing system comprises a plurality of screen units S1, S2, S3, S4 being fluidly connected in a counter current washing configuration. By fluidly connected typically means that the screen units are connected by use of flow lines, such as pipes for transporting matter between the screen units. Each of the screen units S1-S4 is configured for separating a stream of corn kernel mass and liquid into two fractions: a first fraction s (s1, s2, s3, s4) and a second fraction f (f1, f2, f3, f4). As the skilled person will understand, the number of first fractions produced in the fiber washing system depends on the number screen units included in the system. The number of screen units in the system is preferably between 2-8, and in such embodiments the number of firsts and second fractions will also be between 2-8. The screen units are typically configured so that the solid matter is separated out in a separate stream whereby the second fraction f contains a higher amount measured in wt % fiber than the first fraction s. In the figure, notation "s" preferably refers to a fibreless stream (containing starch) and notation "f" preferably refers to a fiber containing stream. Index on f and s refers to the origin of the stream. It is noted that although it is preferred that the first fractions s does not contain any fiber, this may in a practical set-up be difficult to achieve.

The flow in the system has a downstream direction and an upstream direction: each screen unit; e.g. screen unit S3, receives a stream; e.g. f2, from an upstream screen unit, e.g. S2 and delivers a stream; e.g. s3, to the upstream screen unit; e.g. S2. Similarly, the screen unit S3 receives a stream s4 from a downstream screen unit S4 and delivers a stream f3 to the downstream screen unit S4.

As illustrated in FIG. 1, process water, that is typically water that is used as washing water in the system, is provided to the most downstream screen unit S4, and the process water is typically water not containing fiber. Corn kernel mass is typically a liquid suspension (typically a suspension in water), provided at the most upstream screen unit S1. This is in FIG. 1 indicated by the arrow labelled "From milling". Thereby, and by the fluid connection between the screen units, the corn kernel mass and fractions f thereof flow downstream in the system and the process water moves upstream in the system. Thus, the fluid configuration in the system can be seen as the cornel kernel mass is washed in the most upstream screen unit S1 by a fluid containing high amount of starch and in the most downstream screen unit S4 washed by a fluid containing low amount of starch. Further, the corn kernel mass in the most upstream screen unit S1 contains a higher amount of starch than the fraction f of the corn kernel mass in the most downstream screen unit S4.

One of the aims of the invention is to provide a contact time between corn kernel mass or fractions thereof and enzymes in the system, in order to increase the efficiency of the removal of the starch from fiber. The contact time between enzymes and corn kernel mass or fractions thereof in the system is also referred to as retention time. By adding the enzymes at an optimal point in the fiber washing system, the retention time can be prolonged, which may increase the efficiency of the removal or separation of starch from fiber. In order to provide a longer retention time than that provided by a typical mill, a space V (not shown in FIG. 1) may be arranged in the system and being fluidly connected to receive one of said first fractions s, one of said second fractions f, or a mixed first and second fraction s, f, preferably only a second fraction f, and configured to provide an incubation time for one or both fractions received in the space; and outletting the thereby incubated fraction or fractions to a downstream screen unit S4. It is noted that while it may be preferred to have a separate incubator unit arranged in the system, the flow lines connecting the screen units may also be used to provide the space.

Further and as presented herein, it has been found advantageous to add enzymes at a position being downstream of a most upstream screen unit S1 and upstream of a most downstream screen unit S4; in the embodiment of FIG. 1, the addition of enzymes is illustrated as being at the fluid position of the screen unit S3 (illustrated by the arrow in FIG. 1 labelled "Enzymes".

According to embodiments wherein the fiber washing system comprises 2 screen units, dosing is preferred between the first and second screen unit or in a space configured between screen unit 1 and screen unit 2.

According to embodiments wherein the fiber washing system comprises 3 screen units, dosing is preferred in the second screen unit or in a space configured between screen unit 1 and screen unit 3, most preferred in screen unit 2, or a space configured between screen unit 2 and 3.

According to embodiments wherein the fiber washing system comprise 4 screen units, dosing is preferred in the second or third screen unit or in a space configured between screen unit 1 and screen unit 4, most preferred in screen unit 2, or a space configured between screen unit 2 and 3.

According to embodiments wherein the fiber washing system comprise 5 screen units, dosing is preferred in the second, third or fourth screen unit, or in a space configured between screen unit 1 and screen unit 5, most preferred in screen unit 3 or a space configured between screen unit 3 and 4.

According to embodiments wherein the fiber washing system comprise 6 screen units, dosing is preferred in the second, third, fourth or fifth screen unit, or in a space configured between screen unit 1 and screen unit 6, most preferred in screen unit 4, or a space configured between screen unit 4 and 5.

According to embodiments wherein the fiber washing system comprise 7 screen units, dosing is preferred in the second, third, fourth, fifth or sixth screen unit, or in a space configured between screen unit 1 and screen unit 7, most preferred in screen unit 4 or a space configured between screen unit 4 and 5.

According to embodiments wherein the fiber washing system comprise 8 screen units, dosing is preferred in the second, third, fourth, fifth, sixth and seventh screen unit, or in a space configured between screen unit 1 and screen unit 8, most preferred in screen unit 5 or a space configured between screen unit 5 and 6.

Thus, a system according to preferred embodiments of the invention is configured for
  inletting corn kernel mass and liquid to the most upstream screen unit S1, preferably by comprising an inlet into system feeding the matter to the most upstream screen unit S1;
  outletting the first fraction s1 from the most upstream screen unit S1 as a product stream containing starch, preferably by comprising an outlet from the most upstream screen unit feeding a fibreless stream out from the system;
  inletting process water, preferably arranged for inletting process water to a most downstream screen unit S4; the inlet of process water is preferably an inlet to the most downstream screen unit S4;
  outletting the second fraction f4 from most downstream screen unit S4 as a washed corn kernel mass containing a lower amount of starch and gluten than the original corn kernel mass; preferably by comprising an outlet from the most downstream screen unit.

The system is also configured for introducing hydrolytic enzymes into the system, which may be an inlet arranged at a preferred position to allow contact between the corn kernel mass or fractions thereof and the one or more hydrolytic enzymes.

Figure 2:
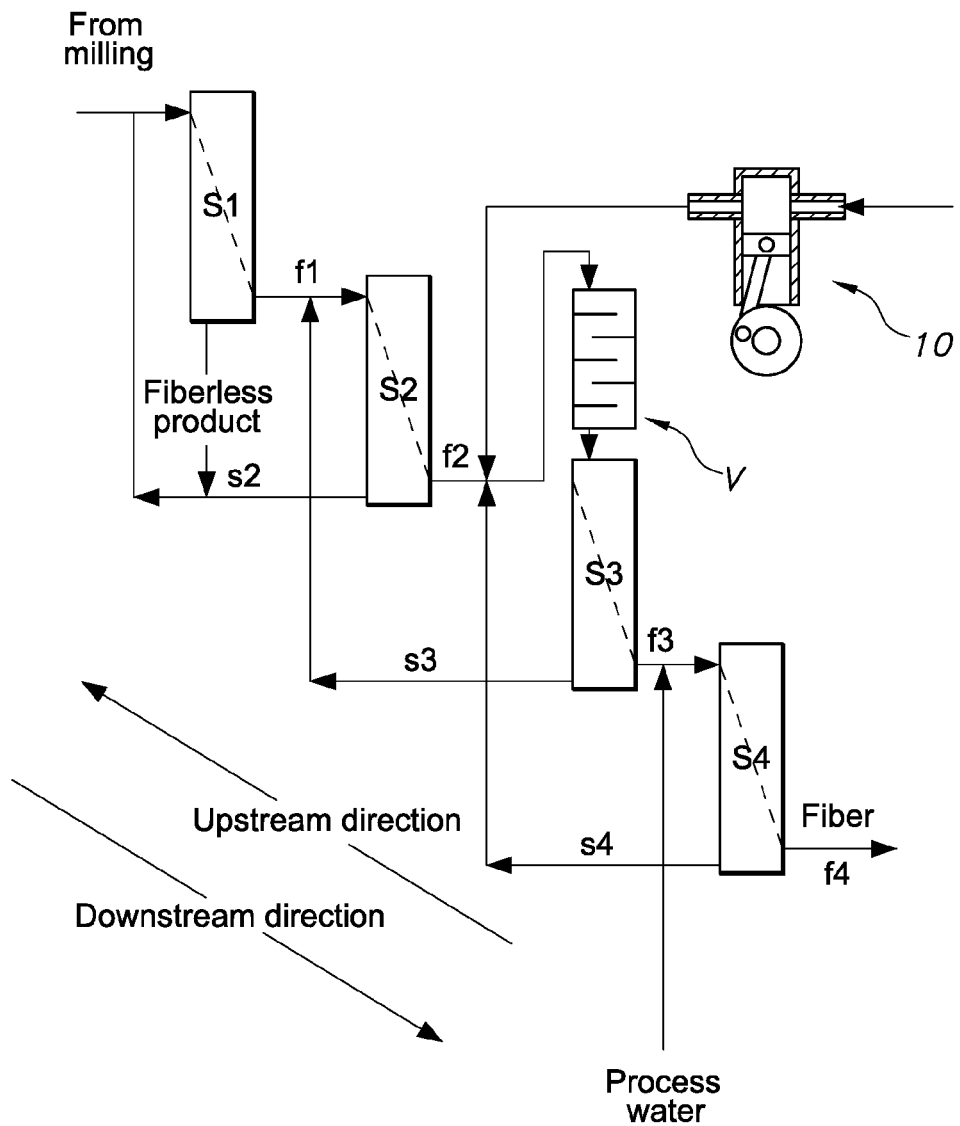

Reference is made to FIG. 2 schematically illustrating a further embodiment of a system according to the present invention. The same notation as used in FIG. 1 is used in FIG. 2. As presented in FIG. 2, the screen units S1 to S4 all comprises a screening element (screen) indicated by a slanted, dotted line inside the screen units. This slanted dotted line illustrate a device configured for separating out a fraction f containing fiber and a fraction preferably not containing any fiber; this could for instance be provided by a band filter or a filter in general arranged inside wall parts defining an interior void of a screen unit.

In the embodiment shown in FIG. 2, the various fraction to be mixed are illustrated as being mixed outside the screen units S1-S4. However, they may be mixed inside the screen units.

As also illustrated in FIG. 2, the space V is a separate container being fluidly connected to the screen unit S3 so that the screen unit S3 receives fluid with fiber and enzymes after the fluid with fiber and enzymes has had an incubation time in the space V. As schematically illustrated in FIG. 2, the space V may have baffle plates for assuring the fluid does not flow in a straight line from inlet to outlet of the container, which could otherwise short-cut the flow to provide an incubation time.

FIG. 2 also illustrates that enzymes are applied to the streams f2 and s4 going into the space V. In the embodiment shown, the enzymes are dosed by a dosing pump 10 illustrated schematically be a piston pump driven by a crank shaft where the amount of enzymes dosed is controlled by the rotation of the crank shaft (one-way inlet and outlet valves are present in the cylinder or cylinder head but not illustrated).

Thus, a system according to the present invention is preferably configured for introducing hydrolytic enzymes into said first fraction (s), and/or into said second fraction (f), and/or into a mixed first and second fraction and/or into the stream of process water supplied to the system.

The number of screen units S may be selected according to e.g. the volumetric capacity to separate into two stream and/or the other design aims. However, a system according to present invention will in general have a most upstream screen unit, a most downstream screen unit and preferably one or more intermediate screen units fluidic arranged in between the most upstream and most downstream screen units. That is, with reference to FIGS. 1 and 2, a preferred system will comprise a most upstream screen unit S1 and a most downstream screen unit S4 and a number of screen units (e.g. 2) arranged in between, where arranged in between refers to being fluidly connected as illustrated in the FIGS. 1 and 2.

In detail, the fluidly connected counter current washing configuration, as disclosed in FIGS. 1 and 2, typically comprising the plurality of screen units S1 . . . S4 being arranged in a manner so:

a second fraction f1 produced by an upstream screen unit S1 is mixed with a first fraction s3 produced by a downstream screen unit S3, and said mixed fractions being separated by a screen unit S2, being intermediate between said upstream and said downstream screen units S1, S3, into a first fraction s2 and a second fraction f2.

While this disclosure is made with reference to screen unit S3, the same description may apply for any intermediate screen units, such as screen S2, or other intermediate screen units where intermediate screen unit refers to a screen unit being arranged downstream of the most upstream screen unit and upstream of a most downstream screen unit.

As illustrated in FIG. 2, it is in some embodiments preferred that mixing of a second fraction f1 and a first fraction s3 occurs prior to being inlet into an intermediate screen unit S2. Such a mixing may be provided by inletting the two fractions into a mixing chamber comprising stirring means providing typically a vigorous agitation of the fluid or the mixing may be provide by a manifold having an inlet for each stream and an outlet for the mixed stream.

As an alternative to mixing prior to be inlet into a screen unit, mixing of a second fraction f1 and a first fractions 3 may occur inside an intermediate screen unit S2. This may for instance be accomplished by the interior of the screen unit being equipped with a stirring means providing typically a vigorous agitation of the fluid inside the screen unit.

Although the embodiments disclosed in FIGS. 1 and 2 are shown to comprise more than two screen units, a system is considered to be fully operational with as little as two screen units. Thus, it is generally preferred that the system comprising 2-8 screen units typically arranged as illustrated in FIG. 1 or 2.

A system according to the present invention may preferably be configured to provide a total retention time in said fiber washing system of at least 35 minutes, such as at least 40 minutes, at least 45 minutes, at least 50 minutes, at least 55 minutes, at least 60 minutes, at least 65 minutes, at least 70 minutes, at least 75 minutes, at least 80 minutes, at least 90 minutes, at least 100 minutes, at least 105 minutes, at least 110 minutes, at least 115 minutes, at least 120 minutes, during which the one or more hydrolytic enzymes is/are in contact with said corn kernel mass and/or one or more fractions thereof, where one or more fractions of corn kernel mass preferably refers to any fraction of corn kernel mass containing fiber and/or starch and/or gluten including any of fractions s and f. Here, retention time refers to the time a fluid element is present in the system calculated from the time where it enters into screen unit S1 and to the time where it leaves screen unit S4. This is typically determined on the basis of e.g. the total volume in m3 of the system (volume of screen units, flow lines and space (V) divided by the total volume flow of fibreless product out from screen unit S1 in m3/h. In a practical approach, the total volume flow of fibreless product is a predetermined design parameter, and the total volume of the system is then selected on the basis of this design parameter.

The total retention time in the fiber washing system may be between 35 minutes and 5 hours, such as between 35 minutes and 4 hours, 35 minutes and 3 hours, 35 minutes and 2.5 hours, 35 minutes and 2 hours, 35 minutes and 1.5 hour, 45 minutes and 5 hours, 45 minutes and 4 hours, 45 minutes and 3 hours, 45 minutes and 2.5 hours, 45 minutes and 2 hours, 1 hour and 5 hours, 1 hour and 4 hours, 1 hour and 3 hours, 1 hour and 2.5 hours, 1 hour and 2 hours, 70 minutes and 5 hours, 70 minutes and 4 hours, 70 minutes and 3 hours, 70 minutes and 2.5 hours, 70 minutes and 2 hours, 75 minutes and 5 hours, 75 minutes and 4 hours, 75 minutes and 3 hours, 75 minutes and 2.5 hours, 75 minutes and 2 hours, 80 minutes and 5 hours, 80 minutes and 4 hours, 80 minutes and 3 hours, 80 minutes and 2.5 hours, 80 minutes and 2 hours, 85 minutes and 5 hours, 85 minutes and 4 hours, 85 minutes and 3 hours, 85 minutes and 2.5 hours, 85 minutes and 2 hours, 90 minutes and 5 hours, 90 minutes and 4 hours, 90 minutes and 3 hours, 90 minutes and 2.5 hours, 90 minutes and 2 hours.

Further, the dimension of the space (in m3) is preferably configured to provide an incubation time of at least at least 5 minutes, such as at least 10 minutes, at least 15 minutes, at least 20 minutes at least 25 minutes, at least 30 minutes, at least 35 minutes, at least 40 minutes, at least 45 minutes, at least 50 minutes, at least 55 minutes, at least 60 minutes. The incubation time in the space (V) configured into the fiber washing procedure may be less than 24 hours, such as less than 12 hours, less than 8 hours, less than 5 hours, less than 3 hours, less than 2.5 hours, less than 2 hours, less than 1.5 hours, less than 1 hour.

Preferably, the incubation time in said space (V) is in the range of 0.5-3 hours, such as 1-3 hours, 1-2 hours or such as 85-95 minutes.

Again, the flow of fibreless product may be the design parameter and the layout of the system together with a desired incubation time can be used to determine the volume of the space V.

The space V designated for incubation preferably has a volume of at least 30 m$^3$, at least 40 m$^3$, at least 50 m$^3$, at least 60 m$^3$, at least 70, m$^3$, at least 80, m$^3$, at least 90, m$^3$, at least 100 m$^3$, at least 110 m$^3$, at least 120 m$^3$, at least 130 m$^3$, at least 140 m$^3$, at least 150 m$^3$, at least 160 m$^3$, at least 170 m$^3$, at least 180 m$^3$, at least 190 m$^3$, at least 200 m$^3$, at least 210 m³, at least 220 m³, at least 230 m³, at least 240 m³, at least 250 m³, at least 260 m³, at least 270 m³, at least 280 m³, at least 290 m³, at least 300 m³, at least 400 m³, or at least 500 m³. The incubation time may also be in more than one space V with a total or combined volume of at least 100 m³, at least 110 m³, at least 120 m³, at least 130 m³, at least 140 m³, at least 150 m³, at least 160 m³, at least 170 m³, at least 180 m³, at least 190 m³, at least 200 m³, at least 210 m³, at least 220 m³, at least 230 m³, at least 240 m³, at least 250 m³, at least 260 m³, at least 270 m³, at least 280 m³, at least 290 m³, at least 300 m³, at least 400 m³, at least 500 m³.

During the incubation time, it is preferred that the fluid received in the space V is not screened. Thus, the fluid leaving the space V has the same composition, e.g. of starch and fiber, as the fluid received in the space V, although it preferably contains a higher proportion of starch that has been released from the fibers.

To assure intimate contact between the enzymes and the fiber, it may be preferred to configure the space V for agitation of matter contained in said space V, such as by comprising a rotor or impeller.

As illustrated in FIG. 2, it is preferred to arrange the space V downstream of the most upstream screen unit S1 and upstream of said most downstream screen unit S4; in particular, the embodiment of FIG. 2 illustrates that the space V is arranged to feed fluid into the second most downstream screen unit S3.

As disclosed herein, the space may be provided in different manner and as illustrated in FIG. 2 the space V may preferably be provided as a separate incubator unit. The incubator unit may be configured by suitable fluid lines to receive a first fraction s, a second fraction f or a combination of a first and a second fraction s,f, preferably only a second fraction f, and deliver the thereby incubated material to a downstream screen unit S3.

Figures 7A, 7B, 7C:
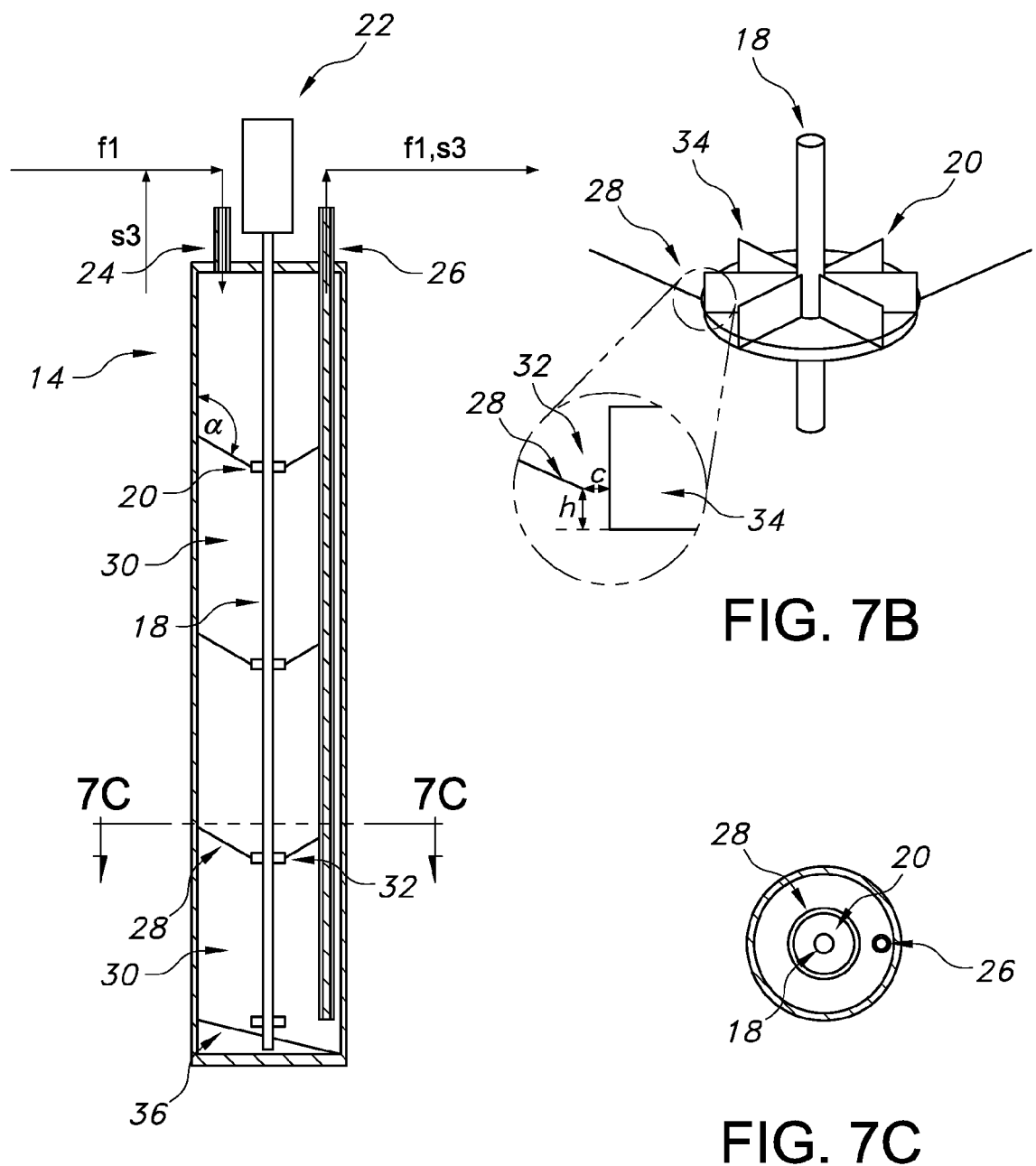
FIG. 7A, FIG. 7B, and FIG. 7C schematically illustrate a preferred embodiment of an incubator according to the present invention.

Reference is made to FIG. 7 which schematically illustrates a preferred embodiment of an incubator according to the present invention; FIG. 7 illustrates the incubator in a vertical cross sectional view (left side of FIG. 7), details on agitators arranged inside the incubator (upper right corner of FIG. 7) and in a horizontal cross sectional view along A-A (lower right corner of FIG. 7).

As illustrated in FIG. 7, the incubator 14 comprising a number of fluidic serially connected chambers 30 (four is shown). The chambers 30 are connected serially by an opening 32 forming a passage between two neighbouring chambers 30 through which opening 32 material may flow from an upstream to a downstream chamber 30. It is noted that the flow direction "from upstream to downstream" is in the figure vertically downwardly and this flow direction is typically dictated by a pump (not shown) and/or as elucidated below, by use of impellers arranged inside the incubator 14.

As illustrated in FIG. 7, the most upstream chamber 30 is connected to receive a first fraction s, a second fraction f or a combination of a first and a second fraction s,f. In FIG. 7 the first and the second fraction s, f are mixed outside the incubator 14 and fed into the most upstream chamber 30.

The most downstream chamber 30 of the incubator has an outlet connection 26 adapted to deliver incubated material out from the incubator 14.

Further, the incubator of FIG. 7 comprises one or more agitators 20 (four are shown in FIG. 7) configured for preventing solid decantation in the incubator 14. Decantation may be an issue to consider, since the material to be incubated in the incubator comprises solid material contained in a liquid (typically water) and the material typically has a density being different from the liquid whereby if the mixture of solid matter and liquid is left with no agitation, solid matter may (depending on the density) either settle on the bottom of a chamber or float at the surface of the liquid. To avoid this, the incubator comprises the agitators 20 to provide agitation.

The incubator 14 preferably has a cylindrical shape so as to provide circular cross sections as illustrated in the cross sectional view along line A-A.

As illustrated in FIG. 7, the incubator 14 may have a number of walls, preferably funnel shaped walls 28 (in FIG. 7, three such funnel shaped walls are shown), disposed horizontally distanced inside the incubator 14 to divide the interior of the incubator 14 into chambers 30. The funnel shaped walls 28 are arranged so as to funnel material downwardly from one chamber to a downstream chamber 30. That is the angle α in FIG. 7 is larger than 90 degrees. Typically the angle α is between 90 and 110, such as between 90 and 100, preferably between 90 and 95 degrees.

As illustrated in the cross sectional view along line A-A in FIG. 7, the funnel shaped walls 28 each has its opening 32 geometrical centred at the smallest cross section of each of the funnel shaped wall.

Since the most downstream chamber 30 of the incubator 14 is not fluidic serially connected to a downstream chamber 30, the bottom wall of such a most downstream chamber 30 is a sloping bottom wall 36 sloping towards an inlet of said outlet connection 26. The angle of the slope is typically selected as for the angle α of the funnel shaped walls 28. Such a one-side-sloping wall has the advantage that material contained in the chamber will be guided by the wall towards the outlet connection 26.

The outlet connection 26 is arranged so as to outlet material from the incubator 14 at the bottom thereof. This may be embodied as a horizontal extending tube extending through the wall of the incubator 14 at position close to the bottom wall 36.

In the embodiment shown in FIG. 7, the outlet connection 26 is in a form of a tube extending internally inside the incubator 14 from a position at the top and outside of the incubator 14 and to the bottom of the most downstream positioned chamber 30.

As illustrated in FIG. 7—see in particular upper right corner of the FIG. 7—the agitators 20 are preferably impellers comprising a plurality of impeller blades 34. Further, the incubator 14 further comprising a shaft 18 and a motor 22 configured for rotating the shaft 14; and as the impellers are arranged on said shaft 14 rotation of the shaft 14 provides a rotation of the impellers.

Since impellers beside prevents solid decantation (by agitation) also may provide a pumping action, the impellers may be configured to provide a pumping action pumping material through the incubator 14.

The combination of pumping and decantation may be designed by considering the vertical position of the impellers in the openings 32. This is illustrated in FIG. 7 by the magnified view (indicated by the dotted lined circle) illustrating that each of the impellers arranged in one of said openings 32 are arranged in a position where a lower end of the impeller being disposed a distance h below an edge 32 of the opening 32. The distance h being preferably smaller than a height of the impeller blade 34 measured at the opening 32. If for instance, the impellers are arranged so that the height h equal zero, substantially no pumping action (towards a downstream chamber) occurs and the impeller substantially only provides a agitation action.

It is also noted that in the exemplified embodiment of FIG. 7, the funnel shaped wall 28 is illustrated as not having a substantial thickness (compared to the height of the impeller blade 34); however, if the wall 28 is designed with a substantial thickness thereby defining an upper and lower edge, the height h is considered to be the height of the impeller blade 34 at the lower edge of the wall 28. It is noted that although it is preferred that all such impellers are arranged identical in each of the openings 32, the impellers may be arranged at different vertical heights h in each opening 32.

It is noted that FIG. 7 in the magnified view also indicates a clearance c. This clearance is typically selected so as to allow the impeller to avoid mechanical contact with the funnel shaped wall 28.

Thus, one or more of the agitators 20/impellers are preferably each arranged in one of said openings 32, so as to provide an agitation of material flowing from one chamber 30 to a downstream chamber 30 through the opening 32.

Typically, an incubator according to preferred embodiments of the invention, has a total volume larger than 50 m³, such as larger than 100 m³, preferably larger than 150 m³, such as larger than 200 m³.

The incubator may preferably be made, partly or fully, from stainless steel, but other materials, such as coated steel, coated stainless steel, polymers and fibre-reinforced polymers may also be used in the construction of the incubator.

If the incubator is made partly or fully from coated metal, the coating may include fused glass, fused flourpolymers or a thermoset coating system based on epoxy, polyurethane, vinylesther or polyester.

If the incubator is made from a polymer, the polymer is preferably a polyolefine preferably chosen between polypropylene or polyethylene.

If the incubator is made partly or fully from a fibre-reinforced polymer, the reinforcing fibres are preferably glass or basalt, and the matrix material is preferably chosen from the group of epoxies, vinylesters or polyesters.

Preferably, an incubator according to the present invention may comprise a number of fluidic serially connected chambers 30 being two, such as three, preferably four, such as five, and even preferably six fluidic serially connected chambers 30.

Preferably, all of the fluidic serially connected chambers 30 have the same volume.

Figure 3:
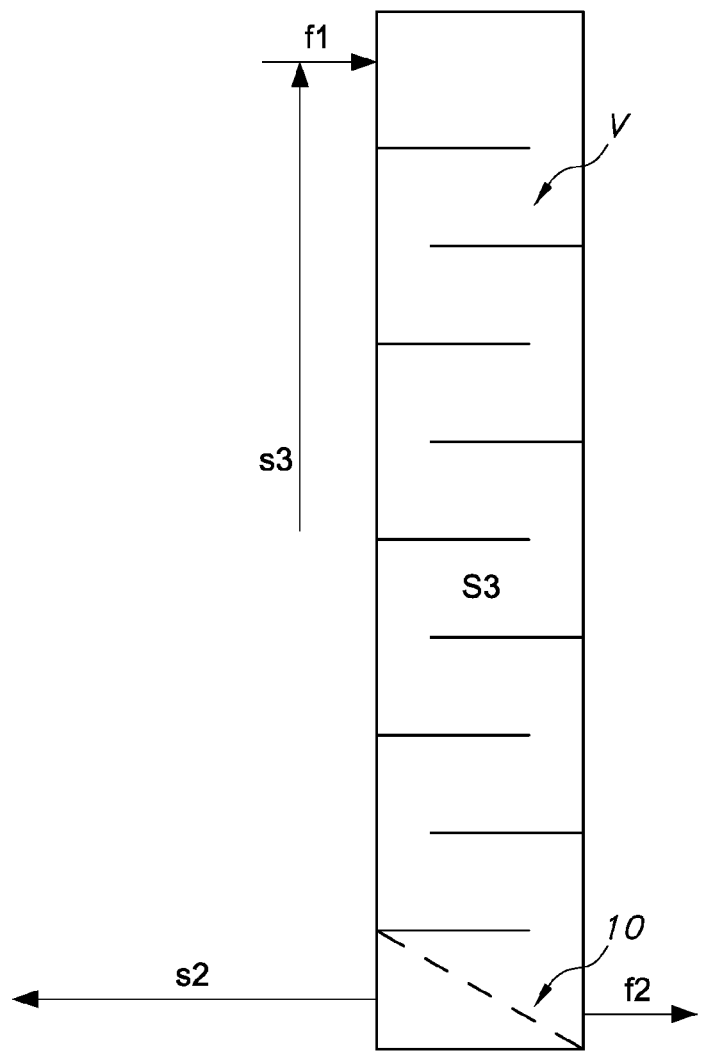
FIG. 3 schematically illustrates a screen unit with an build-in incubator

Reference is made to FIG. 3 schematically illustrating a screen unit with an build-in incubator/space V. As illustrated the screen unit/incubator comprising at the lower end, a screening element 14 and above that a space V. Inside the space baffle plates are arranged to avoid short-cut in the fluid flow from the upper end (receiving in the disclosed embodiment of FIG. 3 fractions f1 and s3) towards the screening element 14. As also illustrated, the fiberless stream s2 is screened out providing a fiber containing fraction f2.

The enzyme used in releasing the starch from the corn kernel mass typically has a thermal window inside which the release of enzyme is most efficient and it may therefore be advantageous to be able to control the temperature at selected positions in the system, such as in the space V. To this, a system according to the present invention may preferably comprising thermo elements for providing an incubation temperature of the fluid inside said space (V), preferably in the range 35-70° C., such of 40-60° C., such as in the range of 46-48° C., such as in the range of 45-49° C., such as in the range of 45-48° C., such as 47° C. In the embodiment where the space is provided as a separate incubation unit (as in FIG. 2) the thermo elements may be arranged inside the incubation unit and/or on a shell defining the enclosure of the incubation unit.

The thermo elements are preferably thermostat-able heating/cooling elements being adapted to measure the temperature and change the heat flux into/out from the space to control the temperature of material contained in the space to be within a predefined range.

In some preferred embodiments, the thermostat-able heating elements comprising electrical heating/cooling elements or liquid heating/cooling elements and temperature sensors.

As presented herein, the screen unit provides a separation of fluid into two fractions s and f and the screen unit typically screens in a mechanical manner where one or more, such as all the screen units, comprises one or more screening element having openings (as illustrated e.g. in FIG. 2 with a slanted, dotted lines) configured for allowing passage of solid matter below a predefined size. The predefined size may be defined according to a number of design criteria. However, it typically preferred than no fiber is allowed to pass through the opening. On the other hand to small opening may have a tendency to become blocked and in many instances the actual size of openings is selected by taking the blocking aspect and the screening aspect into consideration, which may result in that smaller amounts of fibers are allowed to pass through.

Figure 4:
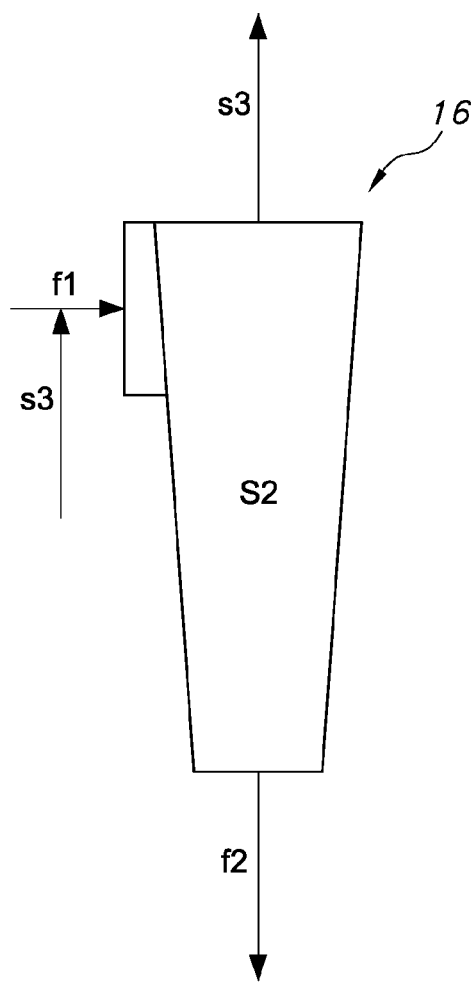
FIG. 4 schematically illustrates a screen unit in the form of a hydro-cyclone

In some preferred embodiments, one or more such as all screen units comprises rotor blade and/or sieves configured for providing said two fractions s, f. As an alternative to screening elements made up by openings one or more such as all screen units may be hydro-cyclones 16 as illustrated schematically in FIG. 4.

As disclosed above, the system is configured to introduce hydrolytic enzymes into said first fraction s and/or into said second fraction f and/or into a mixed first and second fraction and/or into the process water, by means of a dosing device 10—see FIG. 2.

Such a dosing device 10 is typically adapted to provide a controllable dosing quantity of enzymes, preferably according to a predetermined specific ratio between amount of enzymes and infeed of corn kernel mass to the system. To accomplish this, the dosing device 10 could be a metering pump as illustrated by a piston pump in FIG. 2.

Alternatively, the dosing device 10 may be a gravity flow dispenser having a controllable outflow valve configured for controlling the amount of enzyme flowing through the flow valve.

In one aspect the present invention relates to a method to improve starch yield and/or gluten yield from corn kernels in a wet milling process, comprising the steps of:
a) soaking the kernels in water to produce soaked kernels;
b) grinding the soaked kernels;
c) separating the germs from the ground and soaked kernels to produce a corn kernel mass comprising fiber, starch and gluten; and
d) subjecting the resultant corn kernel mass, to a fiber washing procedure;
wherein during step d) one or more fractions of the corn kernel mass is/are contacted with an effective amount of one or more hydrolytic enzymes, and step d) has a total retention time of at least 35 minutes, such as at least 40 minutes, at least 45 minutes, at least 50 minutes, at least 55 minutes, at least 60 minutes, at least 65 minutes, at least 70 minutes, at least 75 minutes, at least 80 minutes, at least 90 minutes, at least 100 minutes, at least 105 minutes, at least 110 minutes, at least 115 minutes, at least 120 minutes.

The total retention time in the fiber washing procedure may be between 35 minutes and 5 hours, such as between 35 minutes and 4 hours, 35 minutes and 3 hours, 35 minutes and 2.5 hours, 35 minutes and 2 hours, 35 minutes and 1.5 hour, 45 minutes and 5 hours, 45 minutes and 4 hours, 45 minutes and 3 hours, 45 minutes and 2.5 hours, 45 minutes and 2 hours, 1 hour and 5 hours, 1 hour and 4 hours, 1 hour and 3 hours, 1 hour and 2.5 hours, 1 hour and 2 hours, 70 minutes and 5 hours, 70 minutes and 4 hours, 70 minutes and 3 hours, 70 minutes and 2.5 hours, 70 minutes and 2 hours, 75 minutes and 5 hours, 75 minutes and 4 hours, 75 minutes and 3 hours, 75 minutes and 2.5 hours, 75 minutes and 2 hours, 80 minutes and 5 hours, 80 minutes and 4 hours, 80 minutes and 3 hours, 80 minutes and 2.5 hours, 80 minutes and 2 hours, 85 minutes and 5 hours, 85 minutes and 4 hours, 85 minutes and 3 hours, 85 minutes and 2.5 hours, 85 minutes and 2 hours, 90 minutes and 5 hours, 90 minutes and 4 hours, 90 minutes and 3 hours, 90 minutes and 2.5 hours, 90 minutes and 2 hours.

The one or more fractions of the corn kernel mass may be a first fraction (s), a second fraction (f), or a mixed first and second fraction as defined above.

In the fiber washing procedure, it can be difficult to obtain a retention time that allows the one or more hydrolytic enzymes to work optimally. Hence, in one embodiment, a space (V) is configured into the fiber washing procedure, to provide said total retention time of at least 45 minutes, such as at least 50 minutes, at least 55 minutes, at least 60 minutes, at least 65 minutes, at least 70 minutes, at least 75 minutes, at least 80 minutes, at least 90 minutes, at least 100 minutes, at least 105 minutes, at least 110 minutes, at least 115 minutes, at least 120 minutes, in which said one or more hydrolytic enzymes is/are in contact with one or more fractions of said corn kernel mass.

The total retention time in the fiber washing procedure may be between 35 minutes and 5 hours, such as between 35 minutes and 4 hours, 35 minutes and 3 hours, 35 minutes and 2.5 hours, 35 minutes and 2 hours, 35 minutes and 1.5 hour, 45 minutes and 5 hours, 45 minutes and 4 hours, 45 minutes and 3 hours, 45 minutes and 2.5 hours, 45 minutes and 2 hours, 1 hour and 5 hours, 1 hour and 4 hours, 1 hour and 3 hours, 1 hour and 2.5 hours, 1 hour and 2 hours, 70 minutes and 5 hours, 70 minutes and 4 hours, 70 minutes and 3 hours, 70 minutes and 2.5 hours, 70 minutes and 2 hours, 75 minutes and 5 hours, 75 minutes and 4 hours, 75 minutes and 3 hours, 75 minutes and 2.5 hours, 75 minutes and 2 hours, 80 minutes and 5 hours, 80 minutes and 4 hours, 80 minutes and 3 hours, 80 minutes and 2.5 hours, 80 minutes and 2 hours, 85 minutes and 5 hours, 85 minutes and 4 hours, 85 minutes and 3 hours, 85 minutes and 2.5 hours, 85 minutes and 2 hours, 90 minutes and 5 hours, 90 minutes and 4 hours, 90 minutes and 3 hours, 90 minutes and 2.5 hours, 90 minutes and 2 hours.

The total retention time, is the time period in which the corn kernel mass, received in the first screen unit (S1) and one or more fractions thereof, are contacted with an effective amount of one or more hydrolytic enzymes before leaving the fiber washing system again. During the retention time, the one or more fractions of corn kernel mass is incubated with one or more hydrolytic enzymes in a space (V), before it leaves the fiber washing system, as part of a first fraction (s1) from the most upstream screen unit (S1) or as part of a second fraction (f4) from the most downstream screen unit (S4).

Preferably, all of the second fractions will be in contact with the one or more hydrolytic enzymes through the whole fiber washing procedure, but the enzyme concentration will vary in the different fractions (f).

In one embodiment, the incubation time in said space configured into the fiber washing procedure is at least 5 minutes, such as at least 10 minutes, at least 15 minutes, at least 20 minutes at least 25 minutes, at least 30 minutes, at least 35 minutes, at least 40 minutes, at least 45 minutes, at least 50 minutes, at least 55 minutes, at least 60 minutes.

The incubation time in the space (V) configured into the fiber washing procedure may be less than 24 hours, such as less than 12 hours, less than 8 hours, less than 5 hours, less than 3 hours, less than 2.5 hours, less than 2 hours, less than 1.5 hours, less than 1 hour.

Preferably, the incubation time in said space (V) is in the range of 0.5-3 hours, such as 1-3 hours, 1-2 hours or such as 85-95 minutes.

The enzymes can be dosed into a screen unit, in a connection point between two screen units, in a space (V) configured into the fiber washing system or in the process water. Preferably, the one or more hydrolytic enzymes is dosed continuous, upstream of the most downstream screen unit and downstream of the most upstream screen unit, using a dosing device with a controllable flow rate.

According to preferred embodiments of the invention, the incubation time in said space V and/or total retention time in the fiber washing procedure provides reduced foam formation in the fiber washing process. Preferably, the formation of foam is reduced by at least 90% (v/v), such as by at least 80% (v/v), such as by at least 70% (v/v), such as by at least 60% (v/v), such as by at least 50% (v/v), such as by at least 30% (v/v), or such as by at least 20% (v/v).

In one embodiment, the fiber washing procedure comprises 2-8 fiber washing steps.

According to embodiments wherein the fiber washing system comprise 2 screen units, dosing is preferred between the first and second screen unit or in a space configured between screen unit 1 and screen unit 2.

According to embodiments wherein the fiber washing system comprise 3 screen units, dosing is preferred in the second screen unit or in a space configured between screen unit 1 and screen unit 3, most preferred in screen unit 2, or a space configured between screen unit 2 and 3.

According to embodiments wherein the fiber washing system comprise 4 screen units, dosing is preferred in the second or third screen unit or in a space configured between screen unit 1 and screen unit 4, most preferred in screen unit 2, or a space configured between screen unit 2 and 3.

According to embodiments wherein the fiber washing system comprise 5 screen units, dosing is preferred in the second, third or fourth screen unit, or in a space configured between screen unit 1 and screen unit 5, most preferred in screen unit 3 or a space configured between screen unit 3 and 4.

According to embodiments wherein the fiber washing system comprise 6 screen units, dosing is preferred in the second, third, fourth or fifth screen unit, or in a space configured between screen unit 1 and screen unit 6, most preferred in screen unit 4, or a space configured between screen unit 4 and 5.

According to embodiments wherein the fiber washing system comprise 7 screen units, dosing is preferred in the second, third, fourth, fifth or sixth screen unit, or in a space configured between screen unit 1 and screen unit 7, most preferred in screen unit 4 or a space configured between screen unit 4 and 5.

According to embodiments wherein the fiber washing system comprise 8 screen units, dosing is preferred in the second, third, fourth, fifth, sixth and seventh screen unit, or in a space configured between screen unit 1 and screen unit 8, most preferred in screen unit 5 or a space configured between screen unit 5 and 6.

In one embodiment, a fiber washing step comprises passing a stream of corn kernel mass and liquid/a liquid suspension, such an aqueous suspension, of corn kernel mass through a screen unit configured for separating said stream of corn kernel mass and liquid into two fractions: a first fraction s and a second fraction f, said second fraction f containing a higher amount of wt % fiber than the first fraction.

Some material from the corn kernel mass received in the first screening unit (S1) will go through all screening units in the fiber washing system, the number of screen units depending on the specific mill, and may thus be part of more than one second fraction and/or become part of more than one first fraction, while other material from the corn kernel mass will not go through all the screen units. These fractions will become part of one or more of a first fraction and/or one or more of a second fraction, but not all second fractions.

Preferably, the material from the corn kernel mass going through all screen units in the fiber washing procedure, comprise mostly fiber.

Preferably, the material from the corn kernel mass that are not going through all of the screen units in the fiber washing procedure, comprise mostly starch and/or gluten.

In one embodiment, the wt % of starch and/or gluten is reduced in a downstream second fraction (f4) compared to an upstream second fraction (f1).

The wt % of starch and/or gluten may be higher in an upstream first fraction (s1) compared to a downstream first fraction (s4).

Figure 9:
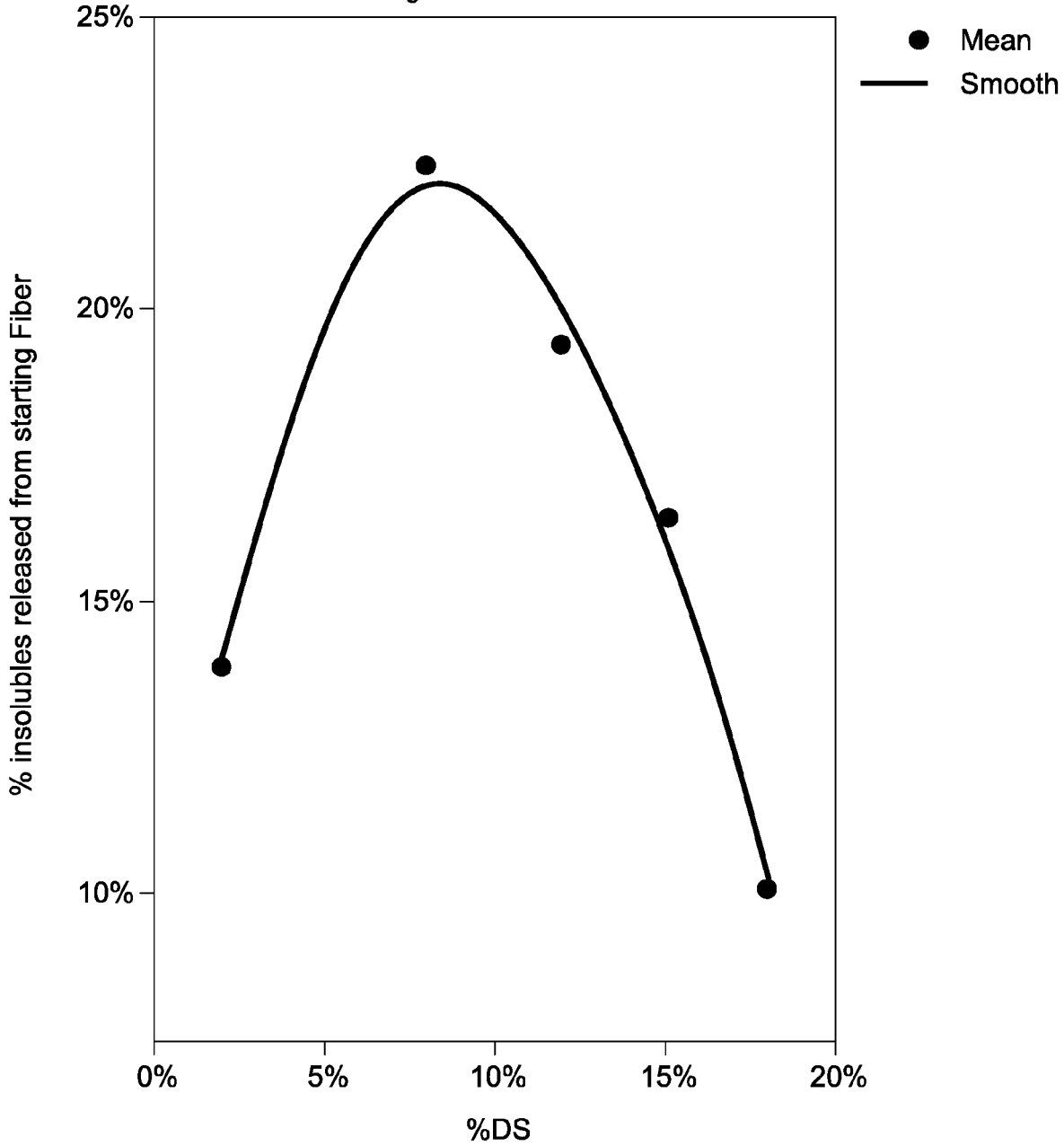
FIG. 9 shows mean (% insolubles released from starting fiber) & % insoluble released from starting fiber vs. % dry solids (DS).

In addition to observing the benefits of dosed enzymes correctly in the fiber washing procedure and with the appropriate retention time, the inventors also observed that the release of insolubles from the fibers: As shown in FIG. 9 herein, the most efficient release insoluble was achieved when the relative amount of fiber in the reaction corresponded to approximately 7.5-10% dry solids (DS).

Hence, the invention provides in particular embodiments a method as described above, wherein a fraction of the corn kernel mass is contacted with an effective amount of said one or more hydrolytic enzymes, said fraction containing an amount of fiber, which corresponds to 2-15% (w/w) dry solids (DS), such as to 5-15% (w/w) DS, to 5-12% (w/w) dry solids (DS), to 5-10% (w/w) dry solids (DS), to 7.5-12.5% (w/w) DS, to 8-12% (w/w) DS or to 9-11% dry solids (DS).

The amount of dry solids may in particular be determined in a sample of said one or more fractions of the corn kernel mass, taken from a space (V) or incubator unit as defined above, or from an inlet into said space (V) or incubator unit, such as through an opening in space (V) or incubator unit or in said inlet.

The inlet may be an inlet that connects space (V) or said incubator unit with a upstream screening unit (S), which is the closest upstream screening unit to space (V) or to said incubator. Hence, it is understood that, preferably, the sample is preferable taken from the fraction or fractions that are delivered to the space (V) or incubator unit disclosed above in such a way that the content of dry solids determined in the sample is a direct measure of the amount of dry solids present in the fraction or fractions which enter the space (V) or incubator and are contacted with the one or more hydrolytic enzymes.

In particular, the amount of dry solids may be determined by:
i) Providing a sample as defined as defined above, having a wet weight of 100 g;
ii) Washing the sample in 5 L distilled water and passing it through a 250 μm sieve;
iii) Drying the solids, which are retained by the sieve, overnight at 50° C.;
iv) Determining the weight of the dried solids and calculating the % dry solids (DS) according to the formula:

$$\% \; DS = \left(\frac{\text{weight of dried solids}}{\text{wet weight of sample}}\right) \times 100$$

In one embodiment, the one or more of said hydrolytic enzymes is/are selected from the group consisting of cellulases (EC 3.2.1.4), xylanases (EC 3.2.1.8) arabinofuranosidases (EC 3.2.1.55 (Non-reducing end alpha-L-arabinofuranosidases); cellobiohydrolase I (EC 3.2.1.150), cellobiohydrolase II (E.C. 3.2.1.91), cellobiosidase (E.C. 3.2.1.176), beta-glucosidase (E.C. 3.2.1.21), and beta-xylosidases (EC 3.2.1.37).

In one embodiment, the one or more of said hydrolytic enzymes is expressed in an organism with a cellulase background, such as *Trichoderma reesei*.

An organism with a cellulase background, should be understood as an organism naturally expressing one or more cellulytic enzymes.

In one embodiment, the one or more of said hydrolytic enzymes comprise a xylanase, which is a GH10 xylanase.

In one embodiment, the one or more of said hydrolytic enzymes comprise a xylanase, which is a GH11 xylanase.

In one embodiment, the one or more of said hydrolytic enzymes comprise an arabinofuranosidase, which is a GH62 arabinofuranosidase.

In one embodiment, the one or more of said hydrolytic enzymes comprise a GH10 polypeptide with xylanase activity, which is selected from the group consisting of
i) An amino acid sequence as set forth in any one of SEQ ID NOs: 22-26
ii) An amino acid sequence which has at least 60%, such as 65%, 70%, 75%, 80%, 85%, 90%, 95%, 98%, 99% identity to any one of SEQ ID NOs: 22-26; and
iii) A subsequence of any one of the amino acid sequences in i) and ii).

In one embodiment, the one or more of said hydrolytic enzymes comprise a GH11 polypeptide with xylanase activity, which is selected from the group consisting of
i) An amino acid sequence as set forth in any one of SEQ ID NOs: 27-35
ii) An amino acid sequence which has at least 60%, such as 65%, 70%, 75%, 80%, 85%, 90%, 95%, 98%, 99% identity to any one of SEQ ID NOs: 27-35; and
iii) A subsequence of any one of the amino acid sequences in i) and ii).

In one embodiment, the one or more of said hydrolytic enzymes comprise a GH62 polypeptide with arabinofuranosidase activity, which is selected from the group consisting of:
iv) An amino acid sequence as set forth in any one of SEQ ID NOs: 1-21
v) An amino acid sequence which has at least 60%, such as 65%, 70%, 75%, 80%, 85%, 90%, 95%, 98%, 99% identity to any one of the amino acid sequences set forth in SEQ ID NO:1-21; and
vi) A subsequence of any one of the amino acid sequences in iv) and v).

The subsequences defined above, may be subsequences in which 30 amino acid residues or less, such as 25 amino acid residues or less, 20 amino acid residues or less, 15 amino acid residues or less, 10 amino acid residues or less, or 5 amino acid residues or less have been deleted.

In other embodiments, the amino acid sequences in items ii) and/or v) above has a length, which in 75% or more, such as 80% or more, 90% or more, 95% or more, or 98% or more of the length of the sequence set forth under the respective SEQ ID NO.

In one embodiment, the one or more of said hydrolytic enzymes is expressed in *Trichoderma reesei* and comprise a xylanase, which is a GH10 xylanase or a GH11 xylanase and a arabinofuranosidase, which is a GH62 arabinofuranosidase.

In one embodiment, the effective amount of one or more hydrolytic enzymes contacted with one or more fractions of the corn kernel mass does not exceed 0.5, 0.4, 0.3, 0.2 kg enzyme protein/metric tonne (MT) corn kernel mass.

In one embodiment, the effective amount of one or more hydrolytic enzymes contacted with one or more fractions of said corn kernel mass is between 0.010-0.5 kg/MT corn kernel mass, such as between 0.05-0.5 kg/MT corn kernel mass or 0.075-0.5 kg/MT or 0.1-0.5 kg/MT corn kernel mass or 0.01-0.4 kg/MT corn kernel mass or 0.05-0.4 kg/MT corn kernel mass or 0.075-0.4 kg/MT corn kernel mass or 0.1-0.4 kg/MT corn kernel mass or 0.01-0.3 kg/MT corn kernel mass or 0.05-0.3 kg/MT corn kernel mass or 0.075-0.3 kg/MT or 0.1-0.3 kg/MT corn kernel mass or 0.010-0.2 kg/MT corn kernel mass or 0.05-0.2 kg/MT corn kernel mass or 0.075-0.2 kg/MT or 0.1-0.2 kg/MT corn kernel mass or such as 0.075-0.10 kg/MT corn kernel mass or 0.075-0.11 kg/MT corn kernel mass.

In one embodiment said fiber washing procedure is performed with the use of a fiber washing system as defined above in aspects and embodiments of the invention. Hence, the fiber washing procedure may be performed with the use of a fiber washing system comprising:
 a plurality of screen units (S1 . . . S4) being fluidly connected in a counter current washing configuration; each screen unit is configured for separating a stream of corn kernel mass and liquid into two fractions: a first fraction (s) and a second fraction (f), said second fraction (f) containing a higher amount measured in wt % fiber than the first fraction (s);
 a space (V) arranged in the system and being fluidly connected to receive said first fraction (s), said second fraction (f), or a mixed first and second fraction (s,f), preferably only a second fraction (f), and configured to provide an incubation time for one or both fractions received in the space; and outletting the thereby incubated one or both fractions to a downstream screen unit (S4),
wherein the system is configured for
 inletting corn kernel mass and liquid to the most upstream screen unit (S1)
 outletting the first fraction (s1) from the most upstream screen unit (S1) as a product stream containing starch,
 inletting process water, preferably arranged for inletting process water to a most downstream screen unit (S4),
 outletting the second fraction (f4) from most downstream screen unit (S4) as a washed corn kernel mass containing a lower amount of starch and gluten than the original corn kernel mass.
 introducing hydrolytic enzymes into the system.

In one aspect, the invention is a wet milling process, which comprises the use of a fiber washing procedure as defined above in aspects and embodiments of the invention. Hence, the milling process may comprise subjecting corn kernel mass, to a fiber washing procedure wherein one or more fractions of the corn kernel mass is contacted with an effective amount of one or more hydrolytic enzymes, and step d) has a total retention time of at least 35 minutes, such as at least 40 minutes, at least 45 minutes, at least 50 minutes, at least 55 minutes, at least 60 minutes, at least 65 minutes, at least 70 minutes, at least 75 minutes, at least 80 minutes, at least 90 minutes, at least 100 minutes, at least 105 minutes, at least 110 minutes, at least 115 minutes, at least 120 minutes.

In particular, the total retention time in the fiber washing procedure may be between 35 minutes and 5 hours, such as between 35 minutes and 4 hours, 35 minutes and 3 hours, 35 minutes and 2.5 hours, 35 minutes and 2 hours, 35 minutes and 1.5 hour, 45 minutes and 5 hours, 45 minutes and 4 hours, 45 minutes and 3 hours, 45 minutes and 2.5 hours, 45 minutes and 2 hours, 1 hour and 5 hours, 1 hour and 4 hours, 1 hour and 3 hours, 1 hour and 2.5 hours, 1 hour and 2 hours, 70 minutes and 5 hours, 70 minutes and 4 hours, 70 minutes and 3 hours, 70 minutes and 2.5 hours, 70 minutes and 2 hours, 75 minutes and 5 hours, 75 minutes and 4 hours, 75 minutes and 3 hours, 75 minutes and 2.5 hours, 75 minutes and 2 hours, 80 minutes and 5 hours, 80 minutes and 4 hours, 80 minutes and 3 hours, 80 minutes and 2.5 hours, 80 minutes and 2 hours, 85 minutes and 5 hours, 85 minutes and 4 hours, 85 minutes and 3 hours, 85 minutes and 2.5 hours, 85 minutes and 2 hours, 90 minutes and 5 hours, 90 minutes and 4 hours, 90 minutes and 3 hours, 90 minutes and 2.5 hours, 90 minutes and 2 hours.

The invention further comprises a composition comprising corn starch, said composition being obtainable by the wet milling process defined above.

Finally, the invention provides a composition comprising corn gluten, said composition being obtainable by the wet milling process defined above.

The invention is further summarized in the following paragraphs:

1. A fiber washing system comprising a plurality of screen units (S1 . . . S4) being fluidly connected in a counter current washing configuration; each screen unit is configured for separating a stream of corn kernel mass and liquid into two fractions:
 a first fraction (s) and a second fraction (f), said second fraction (f) containing a higher amount measured in wt % fiber than the first fraction (s);
 a space (V) arranged in the system and being fluidly connected to receive one of said first fraction (s), one of said second fraction (f), or a mixed first and second fraction (s,f), preferably only a second fraction (f), and configured to provide an incubation time for one or both fractions received in the space; and outletting the thereby incubated one or both fractions to a downstream screen unit (S4),
wherein the system is configured for
 inletting corn kernel mass and liquid to the most upstream screen unit (S1)
 outletting the first fraction (s1) from the most upstream screen unit (S1) as a product stream containing starch,
 inletting process water, preferably arranged for inletting process water to a most downstream screen unit (S4),
 outletting the second fraction (f4) from most downstream screen unit (S4) as a washed corn kernel mass containing a lower amount of starch and gluten than the original corn kernel mass.
 introducing hydrolytic enzymes into the system.

2. The system according to paragraph 1, wherein the system is configured for introducing said hydrolytic enzymes into said first fraction (s), and/or into said second fraction (f), and/or into a mixed first and second fraction and/or into the stream of process water supplied to the system.

3. The system according to paragraphs 1 or 2, wherein the system comprise a most upstream screen unit (S1 . . . S4), a most downstream screen unit and preferably one or more intermediate screen units fluidic arranged inbetween the most upstream and most downstream screen units (S1, S4).

4. A fiber washing system according to any of paragraphs 1-3, wherein said fluidly connected counter current washing configuration, comprising the plurality of screen units (S1 . . . S4), is arranged in a manner so:
   a second fraction (f1) produced by an upstream screen unit (S1) is mixed with a first fraction (s3) produced by a downstream screen unit (S3), and said mixed fractions being separated by a screen unit (S2), being intermediate between said upstream and said downstream screen units (S1, S3), into a first fraction (s2) and a second fraction (f2).

5. A fiber washing system according to any of claims 1-4, wherein mixing of said second fraction (f1) and said first fraction (s3) occurs prior to being inlet into said intermediate screen unit (S2).

6 A fiber washing system according to any of paragraphs 1-4, wherein mixing of said second fraction (f1) and said first fraction(s3) occurs inside said intermediate screen unit (S2).

7. The system according to any of paragraphs 1-3, comprising 2-8 screen units.

8 The system according to any of the preceding paragraphs, wherein the system is configured to provide a total retention time in said fiber washing system of at least 35 minutes, 45 minutes, 1.5 hours, such as at least 3 hours during which the one or more hydrolytic enzymes is/are in contact with said corn kernel mass and/or one or more fractions thereof.

9. The system according to any of the preceding paragraphs, wherein said space (V) is configured to provide an incubation time of at least 5 minutes, preferably at least 15 minutes, such as at least 30 minutes, preferably at least 45 minutes, such as at least 1 hours, and preferably less than 24 hours, such as less than 12 hours.

10. The system according to any of the preceding paragraphs, wherein the fluid received in said space (V) is not screened during said incubation time.

11. The system according to any of the preceding paragraphs, wherein said space (V) is configured for agitating matter contained in said space (V), such as by comprising a rotor or impeller.

12. The system according to any of the preceding paragraphs, wherein said space (V) is arranged downstream of said most upstream screen unit (S1) and upstream of said most downstream screen unit (S4).

13. The system according to any of the preceding paragraphs, wherein said space is provided as a separate incubator unit (14) configured to receive said first fraction (s), said second fraction (f) or a combination of a first and a second fraction (s,f), preferably only a second fraction (f), and deliver the incubated material to a downstream screen unit (S3).

14. The system according to paragraph 13, wherein the incubator (14) comprise a number of fluidic serially connected chambers (30) by an opening (32) forming a passage between two neighbouring chambers (30) through which opening (32) material may flow from an upstream to a downstream chamber (30), wherein
   a most upstream chamber (30) being connected to receive said first fraction (s), said second fraction (f) or a combination of a first and a second fraction (s,f), and
   a most downstream chamber (30) having an outlet connection (26) adapted to deliver incubated material out from the incubator (14);
the incubator (14) further comprising one or more agitators (20) configured for preventing solid decantation in the incubator (14).

15. The system according to paragraph 14, wherein the incubator (14) comprise a number of funnel shaped walls (28) disposed horizontally distanced inside the incubator (14) to divide the interior of the incubator (14) into chambers (30) and funnelling material downwardly from one chamber to a downstream chamber (30).

16. The system according to paragraph 15, wherein the funnel shaped walls (28) each comprise said opening (32) geometrical centred at the smallest cross section of each of the funnel shaped wall.

17. The system according to any of the preceding paragraphs 14-16, wherein the incubator comprise a sloping bottom wall (36) sloping towards an inlet of said outlet connection (26).

18. The system according to any of the preceding paragraphs 14-17, wherein said outlet connection (26) is arranged so as to outlet material from the incubator (14) at the bottom thereof.

19. The system according to any of the preceding paragraphs 14-18, wherein said outlet connection (26) being in a form of a tube extending internally inside the incubator (14) from a position at the top and outside of the incubator (14) and to the bottom of the most downstream positioned chamber (30).

20. The system according to any of the preceding paragraphs 14-19, wherein one or more, such as all, of the agitators (20) are impellers comprising a plurality of impeller blades (34), the incubator (14) further comprising a shaft (18) and a motor (22) configured for rotating the shaft (14) and wherein the impellers are arranged on said shaft (14) so that rotation of the shaft (14) provides a rotation of the impellers.

21. The system according to paragraph 20, wherein the impellers are configured to provide a pumping action pumping material through the incubator (14).

22. The system according to paragraphs 20 or 21, wherein each of the impellers arranged in one of said openings (32) are arranged in a position where a lower end of the impeller being disposed a distance (h) below an edge (32) of the opening (32), said distance being preferably smaller than a height of the impeller blade (34) measured at the opening (32).

23. The system according to any of the preceding paragraphs 14-22, wherein one of said agitators (20) each are arranged in one of said openings (32), so as to provide an agitation of material flowing from one chamber (30) to a downstream chamber (30) through the opening (32).

24. The system according to any of the preceding paragraphs 14-23, wherein the incubator has a total volume larger than 50 $m^3$, such as larger than 100 $m^3$, preferably larger than 150 $m^3$, such as larger than 200 $m^3$.

25. The system according to any of the preceding paragraphs 14-24, wherein the number of fluidic serially connected chambers (30) are two, such as three, preferably four, such as five, and even preferably six.

26. The system according to any of the preceding paragraphs 14-25, wherein all of the fluidic serially connected chambers (30) have the same volume.

27. The system according to any paragraph 1-11, wherein said space is provided internally in a screen unit.

28. The system according to any of the preceding paragraphs, further comprising thermo elements for providing an incubation temperature of the fluid inside said space (V), preferably in the range 35-70 C, such of 40-60° C., such as in the range of 46-48° C., such as in the range of 45-49° C., such as in the range of 45-48° C., such as 47 C.

29. The system according to paragraph 28, wherein the thermo elements are thermostat-able heating/cooling elements being adapted to measure the temperature and change the heat flux into/out from the space to control the temperature of material contained in the space to be within a predefined range.

30. The system according to paragraph 28 or 29, wherein the thermostat-able heating elements comprising electrical heating/cooling elements or liquid heating/cooling elements and temperature sensors.

31. The system according to any of the preceding paragraphs, wherein one or more such as each of the screen units (S1, . . . S4) comprising one or more screening element (22) having openings configured for allowing passage of solid matter below a predefined size.

32. The system according to any of the preceding paragraphs where one or more such as all screen unit comprising rotor blade and/or sieves configured for providing said two fractions (s,f).

33. The system according to any of the preceding paragraphs, wherein one or more such as all screen units are hydro-cyclones (16).

34. The system according to any of the preceding paragraphs, wherein the system is configured to introduce hydrolytic enzymes into said first fraction (s) and/or into said second fraction (f) and/or into a mixed first and second fraction and/or into the process water, by means of a dosing device (10).

35. The system according to any of the preceding paragraphs, wherein said dosing device (10) is adapted to provide a controllable dosing quantity of enzymes, preferably according to a predetermined specific ratio between amount of enzymes and infeed of corn kernel mass to the system.

36. The system according to paragraphs 34 or 35, wherein the dosing device (10) is a metering pump.

37. The system according to paragraphs 34 or 35, wherein the dosing device (10) is a gravity flow dispenser having a controllable outflow valve configured for controlling the amount of enzyme flowing through the flow valve.

38. A crop kernel wet milling system comprising a fiber washing system as defined in any of the preceding claims.

39. A method to improve starch yield and/or gluten yield from corn kernels in a wet milling process, comprising the steps of:
a) soaking the kernels in water to produce soaked kernels;
b) grinding the soaked kernels;
c) separating germs from the ground and soaked kernels to produce a corn kernel mass comprising fiber, starch and gluten; and
d) subjecting the resultant corn kernel mass, to a fiber washing procedure;
wherein during step d) one or more fractions of the corn kernel mass is contacted with an effective amount of one or more hydrolytic enzymes, and step d) has a total retention time of at least 45 minutes.

40. The method according to paragraph 39, wherein said one or more fractions of the corn kernel mass is a first fraction (s), a second fraction (f), or a mixed first and second fraction as defined in any of claims 1-37.

41. The method according to paragraph 39 or 40, wherein a space (V) is configured into the fiber washing procedure, to provide said total retention time of at least 45 minutes in which said one or more hydrolytic enzymes is/are in contact with one or more fractions of said corn kernel mass.

42. The method according to any of paragraphs 39-41, wherein the incubation time in said space (V) configured into the fiber washing procedure is at least 5 minutes and less than 24 hours.

43. The method according to any of the preceding paragraphs 39-42, wherein said fiber washing procedure comprises 2-8 fiber washing steps.

44. The method according to any of paragraphs 39-43, wherein a fiber washing step comprises passing a stream of corn kernel mass and liquid through a screen unit configured for separating a stream of corn kernel mass and liquid into two fractions: a first fraction (s) and a second fraction (f), said second fraction (f) containing a higher amount of wt % fiber than the first fraction.

45. The method according to any of paragraphs 39-44, wherein the wt % of starch and/or gluten is reduced in a downstream second fraction (f4) compared to an upstream second fraction (f1).

46. The method according to any of paragraphs 39-45, wherein a fraction of the corn kernel mass is contacted with an effective amount of said one or more hydrolytic enzymes, said fraction containing an amount of fiber, which corresponds to 2-15% (w/w) dry solids (DS), such as to 5-15% (w/w) DS, to 5-12% (w/w) dry solids (DS), to 5-10% (w/w) dry solids (DS), to 7.5-12.5% (w/w) DS, to 8-12% (w/w) DS or to 9-11% dry solids (DS).

47. The method according to paragraph 46, wherein the amount of dry solids is determined in a sample of said one or more fractions of the corn kernel mass, taken from a space (V) or incubator unit as defined in any of claims 1-37 or from an inlet into said space (V) or incubator unit, such as through an opening in space (V) or incubator unit or in said inlet.

48. The method according to paragraph 47, wherein said inlet connects space (V) or said incubator unit with a upstream screening unit (S), which is the closest upstream screening unit to space (V) or to said incubator.

49. The method according to any of paragraphs 46-48, wherein the amount of dry solids are determined by:
i) Providing a sample as defined in claim 46 or 47, having a wet weight of 100 g;
ii) Washing the sample in 5 L distilled water and passing it through a 250 μm sieve;
iii) Drying the solids, which are retained by the sieve, overnight at 50° C.;
iv) Determining the weight of the dried solids and calculating the % dry solids (DS) according to the formula:

$$\% \, DS = \left(\frac{\text{weight of dried solids}}{\text{wet weight of sample}}\right) \times 100$$

50. The method according to any of paragraphs 39-49, wherein one or more of said hydrolytic enzymes is/are selected from the group consisting of cellulases (EC 3.2.1.4), xylanases (EC 3.2.1.8) arabinofuranosidases (EC 3.2.1.55 (Non-reducing end alpha-L-arabinofuranosidases); EC 3.2.1.185 (Non-reducing end beta-L-arabinofuranosidases) cellobiohydrolase I (EC 3.2.1.150), cellobiohydrolase II (E.C. 3.2.1.91), cellobiosidase (E.C. 3.2.1.176), beta-glucosidase (E.C. 3.2.1.21), beta-xylosidases (EC 3.2.1.37).

51. The method according to any of paragraphs 39-50, wherein the one or more of said hydrolytic enzymes is expressed in an organism with a cellulase background, such as Trichoderma reesei.

52. The method according to any of paragraphs 39-52, wherein the one or more of said hydrolytic enzymes comprise a xylanase, which is a GH10 xylanase 53. The method according to any of paragraphs 39-52, wherein the one or more of said hydrolytic enzymes comprise an arabinofuranosidase, which is a GH62 arabinofuranosidase.

54. The method according to any of paragraphs 39-53, wherein the one or more of said hydrolytic enzymes comprise a GH10 polypeptide with xylanase activity, which is selected from the group consisting of
    i) An amino acid sequence as set forth in any one of SEQ ID NOs: 22-26;
    ii) An amino acid sequence which has at least 80% identity to any one of SEQ ID NOs: 22-26; and
    iii) A subsequence of any one of the amino acid sequences in i) and ii).

55. The method according to any of paragraphs 39-54, wherein the one or more of said hydrolytic enzymes comprise a GH11 polypeptide with xylanase activity, which is selected from the group consisting of
    i) An amino acid sequence as set forth in any one of SEQ ID NOs: 27-35
    ii) An amino acid sequence which has at least 80% identity to any one of SEQ ID NOs: 27-35; and
    iii) A subsequence of any one of the amino acid sequences in i) and ii).

56. The method according to any of paragraphs 39-55, wherein the one or more of said hydrolytic enzymes comprise a GH62 polypeptide with arabinofuranosidase activity, which is selected from the group consisting of:
    i) An amino acid sequence as set forth in any one of SEQ ID NOs: 1-21
    ii) An amino acid sequence which has at least 80% identity to any one of the amino acid sequences set forth in SEQ ID NO:1-21; and
    iii) A subsequence of any one of the amino acid sequences in iv) and v).

57. The method according to any of paragraphs 39-56, wherein the one or more of said hydrolytic enzymes is expressed in Trichoderma reesei and comprise a xylanase, which is a GH10 xylanase and a arabinofuranosidase, which is a GH62 arabinofuranosidase.

58. The method according to any of paragraphs 39-57, wherein the effective amount of one or more hydrolytic enzymes contacted with one or more fractions of the corn kernel mass does not exceed 0.5 kg enzyme protein/metric tonne corn kernel mass.

59. The method according to any of paragraphs 39-58, wherein the effective amount of one or more hydrolytic enzymes contacted with one or more fractions of said corn kernel mass, is between 0.010-0.5 kg/metric tonne corn kernel mass.

60. The method according to any of preceding paragraphs 39-59, wherein said fiber washing procedure is performed with the use of a system as defined in any one of paragraphs 1-38.

61. A wet milling process, which comprises the use of a fiber washing procedure as defined in any of paragraphs 39-60.

62. A composition comprising corn starch, said composition being obtainable by the wet milling process defined in paragraph 61.

63. A composition comprising corn gluten, said composition being obtainable by the wet milling process defined in paragraph 61.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

EXAMPLES

Example 1: The Optimal Enzyme Dosing Point in Wet Milling

Because of short residence times in the wet milling process, selecting the optimum location to dose enzymes is critical for maximizing contact between enzyme and substrate. This means achieving the highest enzyme concentration at a given dose rate within the process sections where the substrate is most available. However, this determination is not easily done because of numerous splitting and recycling of streams in the process. To help provide an answer for the optimal dosing point, a process simulation was conducted.

Figure 5A:
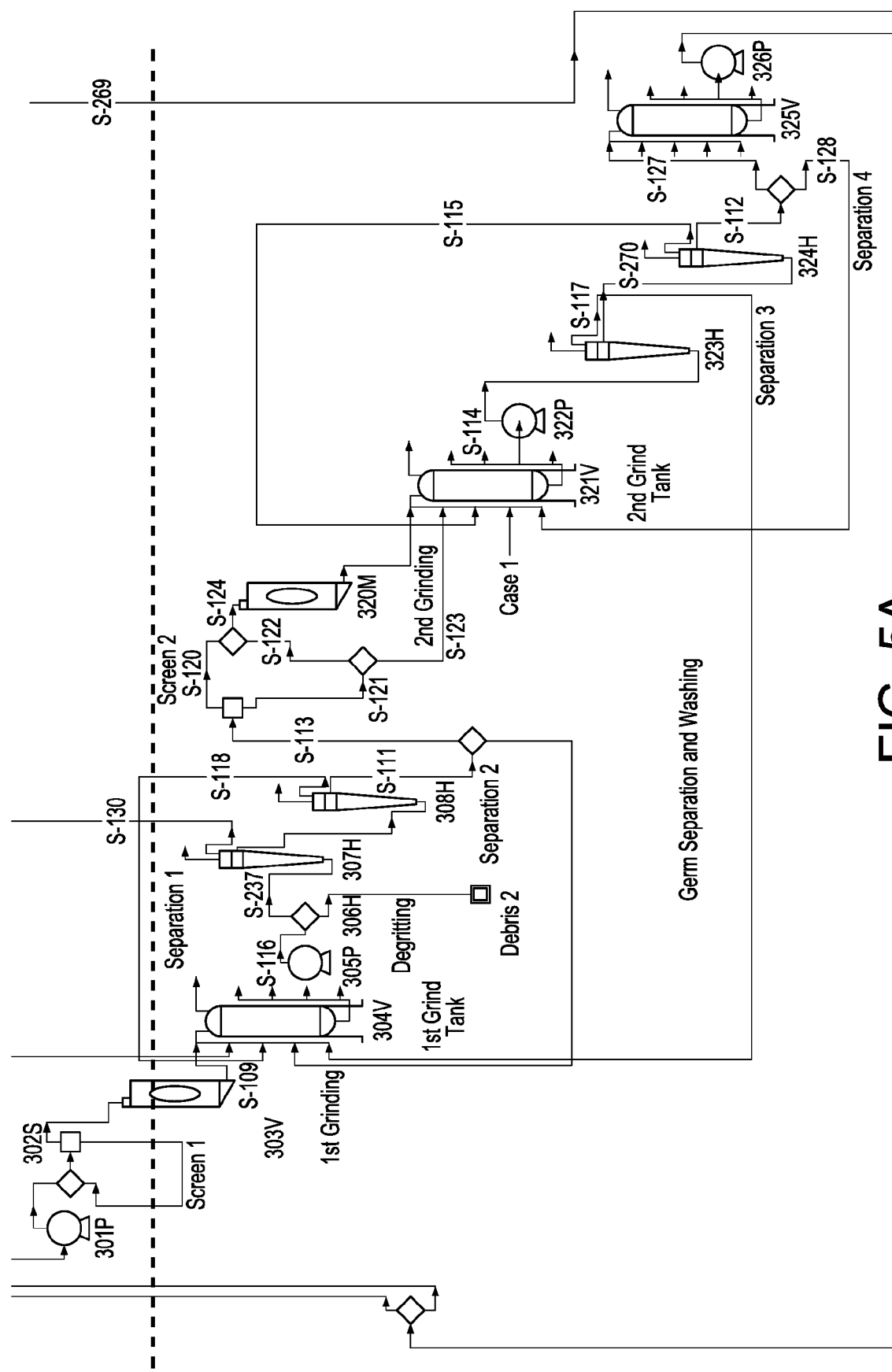
FIG. 5A and FIG. 5B illustrate flow diagrams of a wet milling process segment, showing different dosing locations used for the simulations.
Figure 5B:
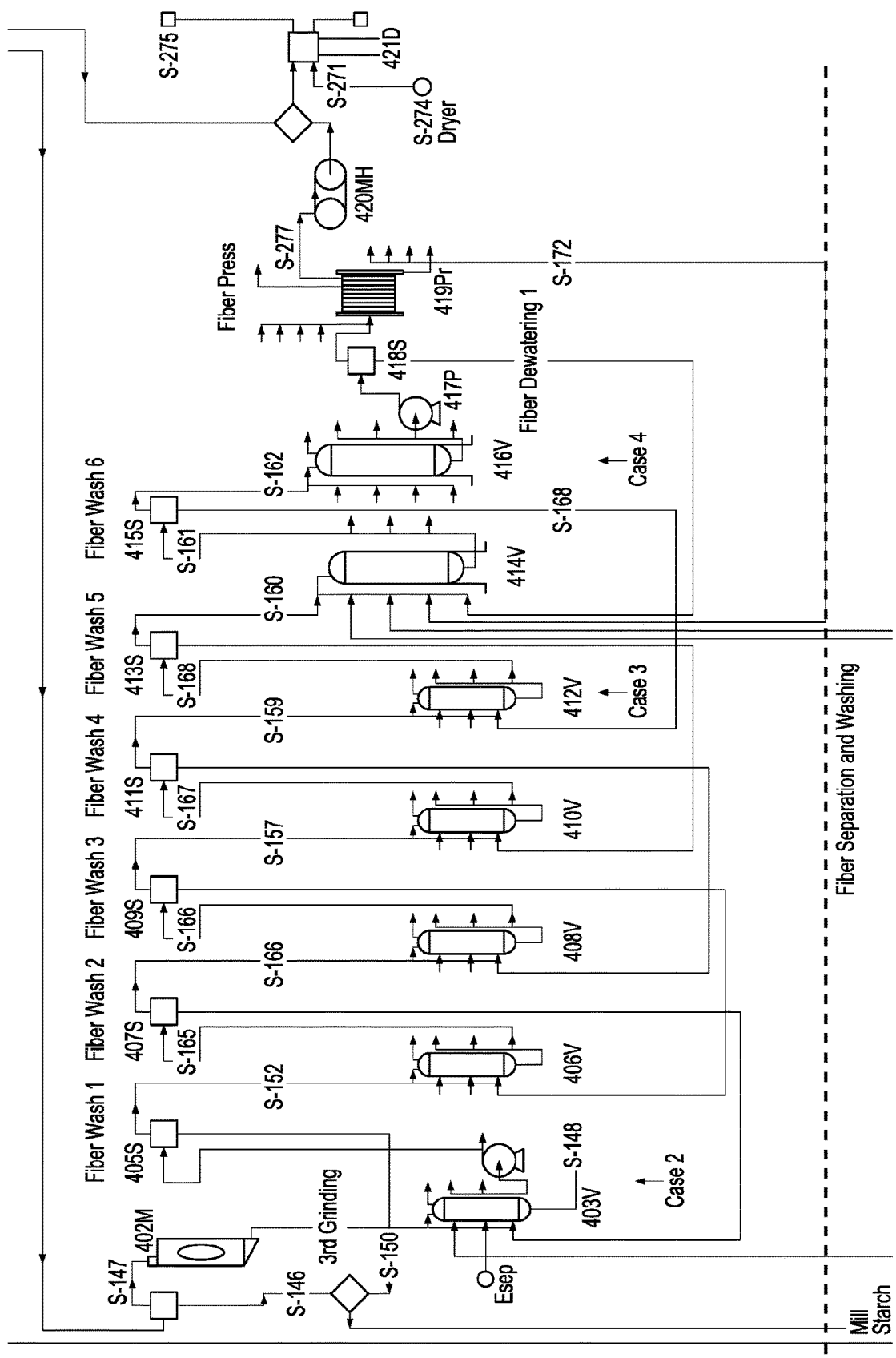
Figure 6:
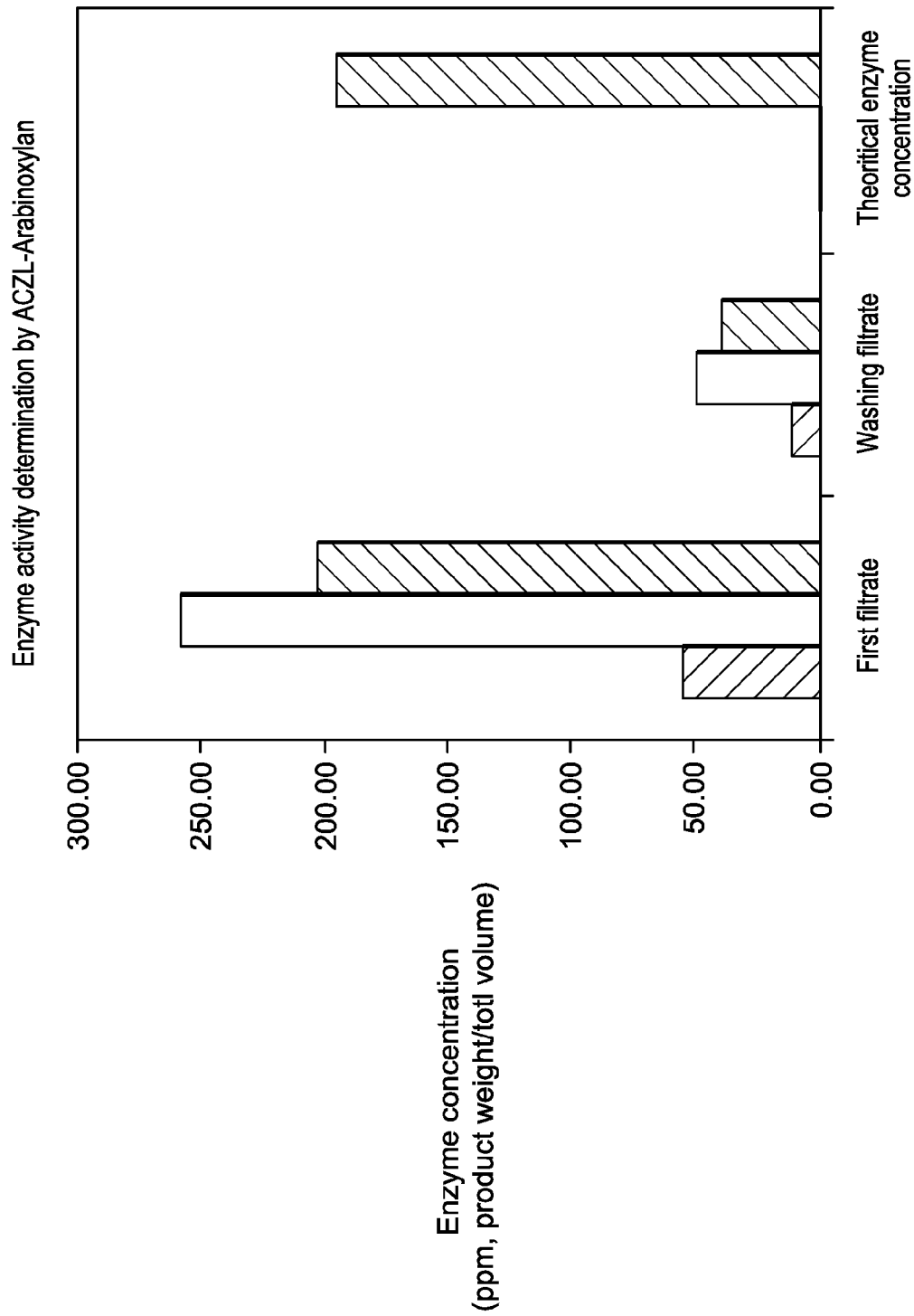
FIG. 6 shows enzyme recovery in filtrate, during laboratory fiber incubation

Method:
1. The model simulation was done in SuperPro Designer V.9 (evaluation version). The USDA model represents a 100,000 bu/day wet mill plant, including all unit operations. No change was made to the model, except to introduce the enzyme at four different points in the process, illustrated in FIG. 5. These dose points, referred to as cases, are (1) after $2^{nd}$ grind, (2) after $3^{rd}$ grind, (3) after $4^{th}$ fiber washing step, and (4) after $6^{th}$ fiber washing step (last wash stage before fiber press). The enzyme feed rate was pegged at a dose of 0.20 kg/MT corn.
2. A determining parameter for the simulation is the enzyme's partitioning characteristic. In this case, the simple assumption was taken that the enzyme behaves just like a soluble solid. This assumption is supported by data in FIG. 6 showing close to 100% enzyme recovery in the filtrate, during laboratory fiber incubation.
3. The partitioning of soluble components in the model was mainly based on empirical data on solubles and moisture of some of the streams coming out of separation units, such as centrifuges and screens (Reference: Ramirez et al. 2008; Industrial Crops and Products 27; 91-97), with the rest approximated using the model.
4. Taking the above parameters as-is from the USDA model, the mass balance was solved using Superpro (energy balance was ignored in this case). The mass balance results were checked for accuracy after convergence, as shown in table 1 for one of the cases simulated. Once the mass balance was solved, the mass flowrates (at steady state) of the different intermediate streams are obtained as output. These mass flowrates are the needed data to calculate an effective dose of enzyme (or ratio of enzyme to fiber solids) at the different stages of the fiber wash segment.

TABLE 1

Overall component balance (kg/h)

| Component | IN | OUT | IN-OUT |
|---|---|---|---|
| Esep | 18.000 | 18.000 | 0.000 |
| Fiber | 11,172.400 | 11,172.400 | 0.000 |
| Germ | 6,8847.600 | 6,847.600 | 0.000 |
| Gluten | 5,586.200 | 5,586.200 | 0.000 |
| Nitrogen | 94,997.522 | 94,997.522 | 0.000 |
| Oxygen | 28,839.407 | 28,766.839 | 72.569 |
| Soluble Solids | 6,577.300 | 6,577.300 | 0.000 |
| Starch | 59,916.500 | 59,916.500 | 0.000 |
| Sulfur | 72.718 | 0.000 | 72.718 |
| Sulforuos acid | 0.000 | 186.139 | −186.139 |
| Water | 151,028.444 | 150,987.579 | 40.865 |
| TOTAL | 365,056.092 | 365,056.078 | 0.014 |

5. Since fiber is considered the target substrate, the effective dose was taken as the ratio of enzyme to fiber within the relevant segment of the process. For simplicity, this segment is taken to begin at the second grind and end at the last fiber washing step just before fiber pressing. This would include every step of the process where relevant substrate-enzyme contact is expected to take place. A weighted averaged dose is determined for the whole segment by factoring in the residence times of the receiving tanks, placed after each screen to the individual effective dose at every process step included. The whole segment in this case, had a total residence time of 1.28 hr. However, it should be noted that the residence time is due to the use of receiving tanks, which some plants may or may not have. Furthermore, the tank size may vary from plant to plant. However, regardless of tank size, the conclusions arrived here shouldn't change.

Results:

Table 2 below depicts weighted average effective enzyme doses (factoring in residence times) at various stages of the wet milling process, for each of the dosing cases simulated. From this it appears that dosing in the fiber washing result in higher enzyme levels compared to $2^{nd}$ grind or $3^{rd}$ grind. The best case suggests dosing towards the end of the fiber wash steps, but not at the last wash step.

TABLE 2

Weighted average enzyme conc. for the different cases (weights based on residence times of the operations included).

| Case | Dose Location | Weighted Average Effective Conc (% w/w fiber) |
|---|---|---|
| 1 | $2^{nd}$ Grind | 0.51 |
| 2 | $3^{rd}$ Grind | 0.53 |
| 3 | Fiber Washing step 4 | 0.72 |
| 4 | Fiber Washing step 6 | 0.64 |

The residual enzyme concentrations (ppm based on total product weight) under the different dosing cases are given in Table 3 below. In general, the levels are very similar for the different cases. The highest levels are found in the dry gluten feed (DGF), since most of the enzymes (>85%) end up with the steep liquor that is added back to the DGF. The starch slurry has the least, less than a tenth of a ppm, because of the extensive starch washing that takes place. This is important, since the starch stream is the likeliest place for the enzyme to retain any activity; all others will go through high temperature drying that would potentially deactivate the enzymes.

TABLE 3

Residual enzyme concentrations (total weight basis) in the final product streams.

| | Enzyme Residual (ppm) | | | |
|---|---|---|---|---|
| End Products | CASE 1 | CASE 2 | CASE 3 | CASE 4 |
| Starch slurry | <0.1 | <0.1 | <0.1 | <0.1 |
| Dry Gluten Meal | 218 | 218 | 207 | 170 |
| Dry Gluten Feed | 814 | 814 | 821 | 844 |
| Dry Germ | 169 | 168 | 160 | 131 |

Example 2. The Effect of Enzyme on Fiber Slurry Viscosity

In this example, we measured the viscosity profile of fiber slurry with time using an RVA (Rapid Visco Analyzer). The fiber slurry was taken from the overflow of the 5th fiber washing stage containing 12% of dry solids. In one treatment, hydrolytic enzymes were added at a dose of 1 mg BCA proteins/g dry solids. In another, only water of equivalent volume was added, to serve as a negative control. The total time of the RVA run was 90 minutes, and the temperature was set to 48° C. The absolute viscosity numbers are very sensitive to the consistency of the samples, and due to the inhomogeneity of the slurry, it is difficult to ensure the starting values are similar. We set the rpm of the RVA impeller at different values in order to keep the starting viscosity as close as possible between the two treatments. However, it should be noted that more important than the absolute value of the results is the change in viscosity with time.

The change in viscosity is a convenient way to follow the change in water concentration of the slurry due to enzyme treatment. In an ideal case of a Newtonian suspension, the effective viscosity is a positive function of the volume fraction of solids (Bailey, J. E. and Ollis, D. F., *Biochemical Engineering Fundamentals* $2^{nd}$ ed, 1986, McGraw-Hill, Inc. page 502). While most likely the slurry behaves as non-Newtonian, it does not change the generality that as the solid volume fraction increases (or equivalently, the aqueous volume fraction decreases), the viscosity increases, and vice versa. So if dewatering occurs during enzyme reaction, this should cause the solid volume fraction to go down (or equivalently, the aqueous volume fraction to go up), and consequently the viscosity to go down with it.

The RVA measurements were taken continuously, and in order to summarize the results, a running average was calculated for each 10-minute duration. Each average and standard deviation calculated consist of >300 data points. Tables 4 and 5 below shows the results for the enzyme treated and control samples, respectively.

TABLE 4

Average viscosity (in centipoise) measured within
10-min time durations over the 90-min RVA run.
With addition of hydrolytic enzymes

| Time range (min) | Average (cP) | StDev | % change from starting value |
|---|---|---|---|
| 0, 10 | 6404 | 2671 | 0% |
| 10, 20 | 5774 | 1970 | −10% |
| 20, 30 | 4891 | 1182 | −24% |
| 30, 40 | 4144 | 1073 | −35% |
| 40, 50 | 3181 | 661 | −50% |
| 50, 60 | 3143 | 749 | −51% |
| 60, 70 | 2938 | 607 | −54% |
| 70, 80 | 2803 | 585 | −56% |
| 80, 90 | 2753 | 612 | −57% |

TABLE 5

Average viscosity (in centipoise) measured within
10-min time durations over the 90-min RVA run.
Without addition of hydrolytic enzymes.

| Time range (min) | Average (cp) | StDev | % change from starting value |
|---|---|---|---|
| 0, 10 | 5733 | 378 | 0% |
| 10, 20 | 5719 | 409 | 0% |
| 20, 30 | 5803 | 407 | 1% |
| 30, 40 | 5661 | 379 | −1% |
| 40, 50 | 5610 | 357 | −2% |
| 50, 60 | 5527 | 327 | −4% |
| 60, 70 | 5644 | 355 | −2% |
| 70, 80 | 5741 | 393 | 0% |
| 80, 90 | 5645 | 405 | −2% |

Very clear differences in viscosity profile emerged between enzyme treated and untreated fiber slurry. Significant reduction (by more than 50%) of viscosity during the 90 min reaction time was observed when enzyme was added. In contrast, no viscosity change was observed without enzyme addition in the fiber slurry during the same period. In addition, majority of the viscosity change in the enzyme-treated slurry occurred in the first 40 min, and then a more gradual decrease takes place from there on. (It is not as clear in the discretized averages above, but in the continuous viscosity data, the inflection point occurs close to the 40 min time point). Another striking feature is the more erratic viscosity values obtained in the enzyme-treated slurry, especially in the first 10 to 20 min, as described by the high standard deviations observed during this period, and which gradually subsided after 40 min. This was not observed in the case of the negative control. This surprising observation is likely due to a phasing-out taking place during the early time period, wherein water that is newly released from being bound by fiber has not yet equilibrated with the aqueous phase, thus resulting to a transient non-homogeneity that adds to the viscosity variation. These observations point to the notion of a rapid dewatering phase occurring during the enzyme reaction.

Example 3. The Effect of Incubation Time and Enzyme Dose on Starch and Gluten Yield In this example, we measured the starch and gluten separated from the fiber after incubation with and without hydrolytic enzyme (mature polypeptides of SEQ ID NO: 7 and 22, expressed in Trichoderma reesei), while varying incubation time and enzyme dose. The fiber sample was obtained from a wet-mill plant after fiber pressing with a total dry matter content of 41%. The sample was re-suspended in buffer (pH 4, 0.02M Na Acetate) to 100-g slurry containing 5% dry solids. To this slurry was added enzyme at a final ratio of 0, 2, 6, and 10-mg enzyme concentrate per g dry-solids substrate (one gram enzyme concentrate contains about 280 mg proteins). The incubation was done at 50 C in an air-heated incubator with constant shaking, varying the incubation time to 10, 50 and 90 min. After incubation, the samples were cooled quickly in ice-water (5° C.) before processing. The slurry was transferred on to a 100-micron sieve, while collecting the filtrate that passed through. The fiber that was retained over the sieve was pressed using a spatula to recover as much filtrate as possible. The pressed fiber was then transferred to a beaker containing 200-ml of water and stirred. This slurry was again passed through the 100-micron sieve, and the collected filtrate was combined with the first. The pressing, washing and filtering steps above were repeated once more, so that a final filtrate was recovered and combined with the first two. The combined filtrate was then vacuum filtered, this time through a glass micro filter paper (Whatman) which retained the insoluble solids that were released from the fiber and passed through the 100-micron screen. After passing 200 ml water over the filter paper to remove any trace of solubles, the total insoluble solids retained on the filter paper was dried and weighed. The dry weight was reported as Starch+Gluten released as percentage of fiber dry matter of starting substrate. The results are shown in Table 6.

TABLE 6

Yield of starch and gluten released from fiber under
different enzyme dose and incubation time.

| Incubation Time (min) | Dose (mg/g fiber) | Starch + Gluten Released (% of fiber) |
|---|---|---|
| 10 | 0 | 4.98% |
|  | 2 | 7.49% |
|  | 6 | 8.54% |
|  | 10 | 8.13% |
| 50 | 0 | 6.16% |
|  | 2 | 9.04% |
|  | 6 | 12.29% |
|  | 10 | 13.29% |
| 90 | 0 | 5.04% |
|  | 2 | 10.44% |
|  | 6 | 14.02% |
|  | 10 | 15.11% |

The effect of enzyme addition is apparent from the increase in the starch and gluten yields for all incubation time. However, the response to dose is flat for an incubation time of 10 minutes, whereas there is a steep response to dose in the 50 min, and especially in the 90 min incubation. With these longer residence times, a lower dose is able to achieve the yields that only a much higher dose is capable for a shorter residence time. For example, a 6 mg dose at 90 min was able to achieve a higher yield than a 10 mg dose at 50 min. This also underlines the importance of having a minimum sufficient incubation time for the enzyme to perform, as for example an incubation of 10 min, regardless of the dose, could not attain yields of even the lowest dose (i.e., 2 mg) with longer incubation.

Example 4: Effect of Increased Retention Time on Starch and Gluten Yields in Wet Milling Fiber Washing System:

The fiber washing lay-out of the test facility consists of four screen units. An incubation tank (250 m³) was installed between the second and third screen unit to allow additional retention time of the corn kernel mass or fractions thereof. The enzymes (mature polypeptides of SEQ ID NO: 7 and 22, expressed in *Trichoderma reesei*) were dosed in the second screen, before the holding tank. Without the additional incubation tank, the retention time (RT) in the fiber washing system was estimated to be around 10 min (based on the total capacity of the pre-existing receiving tanks). The effect of retention time was evaluated by increasing the utilization capacity of the additional tank from 0%, to 40% (100 m³, adding 40 min RT), and then finally to 80% (200 m³, adding 80 min RT).

Method:

The fiber was washed in a fiber washing system as described above. The trial without enzymes and incubation tank was run for 3 months. The trial without incubation tank (10 min RT), but with enzymes, was run over 4 weeks at an enzyme dose of 0.5 kg/MT corn. The experiment with incubation tank (100 m³), 50 min RT (40 min incubation time) and enzymes was run over 1 week at an enzyme dose of 0.5 kg/MT corn. The experiment with incubation tank (200 m³), 90 min RT (80 min incubation time) and enzymes was run over 2 weeks at an enzyme dose of 0.5 kg/MT corn.

After fiber washing, the fiber was pressed to decrease the water content before drying.

One sample of wet fiber was weighted before total starch (%) and total protein (%) in wet fiber was determined. The total starch (%) was determined by an enzymatic method established for measuring total starch in cereal products (Method 76-13, AACC International 2000). The total protein (%) was determined by the micro-Kjeldahl method of measuring crude protein (AACCI Method 46-13.01).

One sample of wet fiber was then dried and the dry fiber weight was determined, to allow calculation of total starch and total protein (%) in dry fiber.

Figure 8:
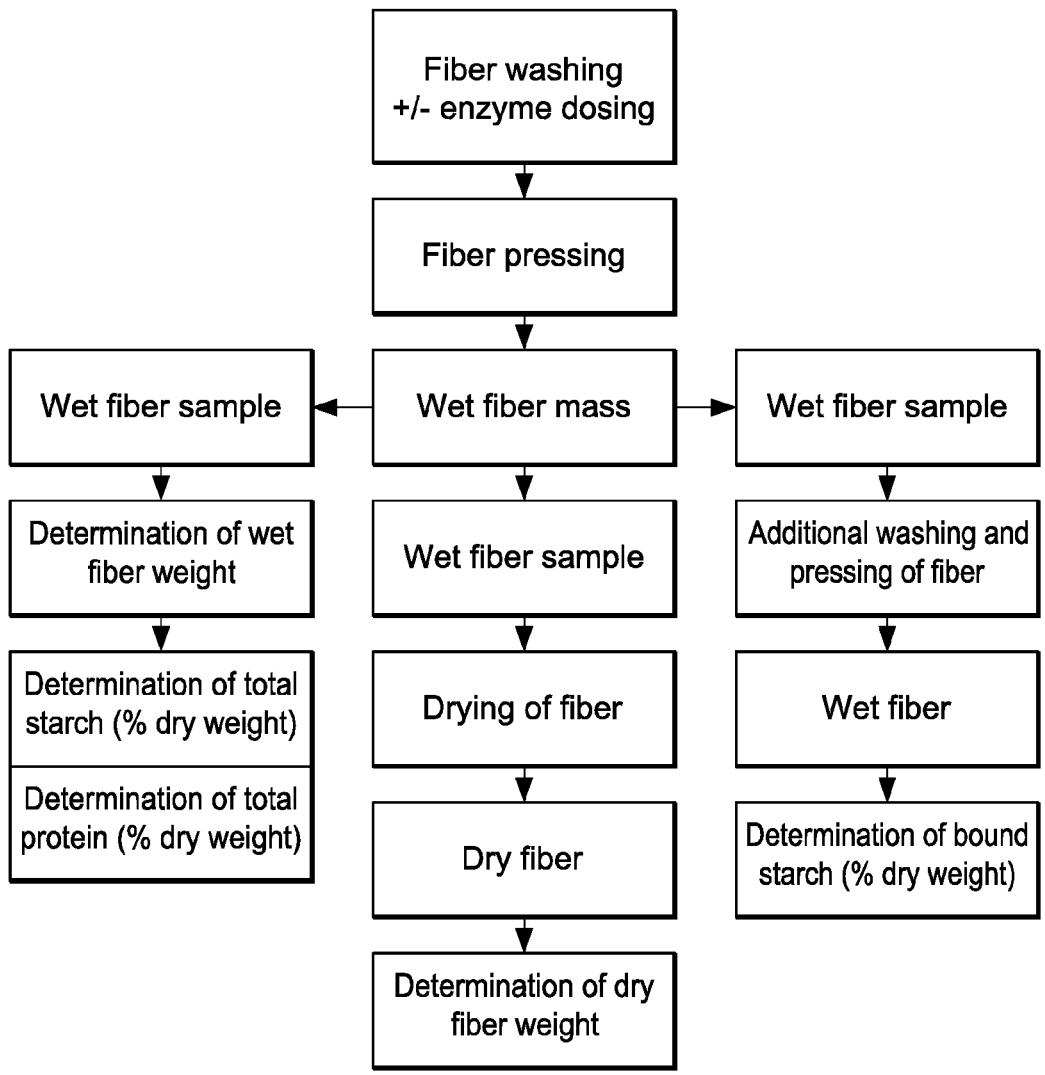
FIG. 8 provides an outline of a process for determining total starch, total protein, dry fiber weight and amount of bound starch.

The total starch can be divided into extractable starch (starch that can be washed off), and bound starch (starch that is stuck with the fiber even washing). The amount of starch remaining in a sample after an additional washing step in clean water (bound starch) was used as a control, to make sure that starch and protein were released from the fiber. The sample was washed with 10 L water and filtered through a 50-micron sieve to wash away extractable starch before measuring the bound starch. The process is illustrated in a flow diagram in FIG. 8.

The total starch (wt %) and protein (wt %) of dry fiber reflects the amount of starch and protein still present in the fiber after fiber wash, pressing and drying. This amount of starch and protein should in theory decrease as the retention time increase, as the hypothesis is that enzymes catalyse the release of starch and protein into the process stream. The effect on total starch (wt %) and total protein (wt %) of dry fiber, by change in retention time is given in table 7 below. As shown, there is a significant effect on the removal of starch and protein by the addition of the enzyme, even at the original retention time of 10 min. With increased retention time (+80 min RT) a decrease in both total starch and protein can be seen, reflecting that increased retention time in fiber washing can indeed increase the total starch and protein yields in corn wet milling.

The total moisture (wt %) of the pressed wet fiber was calculated as: the wet fiber weight minus the dry fiber weight. The moisture content decreases in the wet fiber (dewatering) with addition of enzymes, but does not seem to be effected by retention time.

TABLE 7

| Wet fiber (After fiber pressing) | Baseline[a] | Enzyme (10 min RT)[b] | Enzyme (50 min RT)[c] | Enzyme (90 min RT)[d] |
|---|---|---|---|---|
| Dry fiber (%) of wet fiber | 38.5 | 42.0 | 43.7 | 33.05 |
| Moisture (%) of wet fiber | 61.5 | 58.0 | 56.3 | 56.95 |
| Total starch (%) of dry fiber | 25.85 | 21.85 | 21.2 | 19.25 |
| Protein (%) of dry fiber | 11.44 | 10.68 | 11.16 | 10.35 |
| Bound starch (%) of dry fiber | 20.37 | 17.54 | 17.3 | 15.35 |

[a]Baseline average over 3 months without enzyme
[b]Average over 4 weeks at 0.5 kg/MT dose (<1 week @ 1.2 kg/MT)
[c]Average over 1 week at 0.5 kg/MT dose
[d]Average over 2 weeks at 0.5 kg/MT dose Example 5: Effect of the Amount of Dry Solids on Insolubles Released Form Starting Fiber in Enzyme Reaction In this example, we measured the insoluble solids that are separated from the fiber after incubation with enzyme (Frontia® Fiberwash, commercially available from Novozymes A/S) at varying % dry solids.

The fiber sample was obtained from a wet-mill plant after the vetter press with a total dry matter content of 42.80%. The sample was re-suspended in buffer (pH 4, 0.02M Na Acetate) to a slurry containing various dry solids. To this slurry the enzyme was added at 0.9 kg/MT wet corn.

The % DS was adjusted with various amounts of water as shown in the table below to achieve a range of % DS.

(Fiber dry solids/% dried solids)−Fiber weight=Water added

| % DS | Time Incubated (min) | Tube # | Fiber Weight (g) | Fiber DS (g) | Enzyme | Buffer | Water add (ml) |
|---|---|---|---|---|---|---|---|
| 2.00% | 2 | 1 | 8.08 | 3.46 | 73 | 1.00 | 165 |
| 2.00% | 2 | 2 | 8.14 | 3.48 | 74 | 1.00 | 166 |
| 2.00% | 2 | 3 | 8.36 | 3.58 | 76 | 1.00 | 171 |
| 8.00% | 2 | 4 | 13.54 | 5.80 | 123 | 1.00 | 59 |
| 8.00% | 2 | 5 | 13.21 | 5.65 | 120 | 1.00 | 57 |
| 8.00% | 2 | 6 | 13.34 | 5.71 | 121 | 1.00 | 58 |
| 12.00% | 2 | 7 | 13.14 | 5.62 | 119 | 1.00 | 34 |
| 12.00% | 2 | 8 | 13.23 | 5.66 | 120 | 1.00 | 34 |
| 12.00% | 2 | 9 | 13.06 | 5.59 | 118 | 1.00 | 34 |
| 15.00% | 2 | 10 | 13.01 | 5.57 | 118 | 1.00 | 24 |
| 15.00% | 2 | 11 | 13.06 | 5.59 | 118 | 1.00 | 24 |
| 15.00% | 2 | 12 | 13.08 | 5.60 | 119 | 1.00 | 24 |
| 18.00% | 2 | 13 | 13.20 | 5.65 | 120 | 1.00 | 18 |
| 18.00% | 2 | 14 | 13.10 | 5.61 | 119 | 1.00 | 18 |
| 18.00% | 2 | 15 | 13.03 | 5.58 | 118 | 1.00 | 18 |

The incubation was done at 48 C in a Werner Mathis AG Labomat reactor with constant mixing for 120 minutes. After incubation, the samples were cooled quickly in ice-water (5° C.) before processing.

The slurry was then poured into an Omega 1000 Juicer and the variable autotransformer was set to 30% power for 1 minute. The filtrate was caught with a 75 μm screen and catch pan. The insoluble solids in the catch pan were transferred into a 500 ml Nalgene bottle. The fiber was scraped out of the Omega 1000 juicer basket and washed with 200 mls of DI water in a beaker with a spatula. The fiber slurry was then poured back into the juicer and run for 1 minutes at 30% power. Again the filtrate was poured over a 75 μm sieve and catch pan the insoluble solids were transferred to the same Nalgene bottle. The juice basket was taken out of the juicer and the juicer body was rinsed with a water spray bottle to rinse any and all insoluble over the 75 μm sieve and catch pan and transferred to the 500 ml Nalgene bottle.

The bottle was then capped and the insoluble solids were separated using vacuum filtration. The vacuum filtration set up utilized a funnel with filter paper (Whatman) the insoluble solids slurry was poured over the filter paper under vacuum. A weight was taken of the filter paper before filtration and filter paper was put in a 50 C oven to dry and a weight was taken after 24 hours in the oven.

The insoluble solids are reported in the table below and are also shown in FIG. 9.

| % DS | % insoluble solids released from starting Fiber |
|---|---|
| 2.00% | 11.74% |
| 2.00% | 16.65% |
| 2.00% | 13.25% |
| 8.00% | 23.94% |
| 8.00% | 21.47% |
| 8.00% | 21.91% |
| 12.00% | 18.57% |
| 12.00% | 20.52% |
| 12.00% | 19.10% |
| 15.00% | 17.55% |
| 15.00% | 15.14% |
| 15.00% | 16.53% |
| 18.00% | 9.44% |
| 18.00% | 10.68% |

LIST OF REFERENCE SYMBOLS USED

S Screen
f Fraction produced by a screen
V Void/space
c Clearance
h height
10 dosing device
12 screening element
14 Incubator
16 Hydro-cyclone
18 Shaft
20 Stirring means; agitator
22 Motor
26 Outlet connection
28 Funnel shaped wall
30 Chamber
32 Opening
34 Impeller blades
36 Sloping bottom wall
32 Edge of opening

---

The invention claimed is:

1. A fiber washing system in a corn kernel wet milling system comprising a plurality of screen units being fluidly connected in a counter current washing configuration from a most upstream screen unit to a most downstream screen unit; each screen unit is configured for separating a stream of corn kernel mass and liquid into two fractions:
    a first fraction (s) and a second fraction (f), said second fraction (f) containing a higher amount measured in wt % fiber than the first fraction (s);
    a space (V) is a separate container being fluidly connected with one or more screen units to receive one of said first fraction (s), one of said second fraction (f), or a mixed first and second fraction (s,f), and wherein the space (V) is configured to provide an incubation time in which the first fraction (s), the second fraction (f), or the mixed first and second fraction (s,f) received in the space (V) are contacted with one or more hydrolytic enzymes to produce incubated fractions; and outletting the incubated fractions to a downstream screen unit,
wherein the system is configured for
    inletting the corn kernel mass and the liquid to the most upstream screen unit,
    outletting the first fraction (s) from the most upstream screen unit as a product stream containing starch,
    inletting process water,
    outletting the second fraction (f) from the most downstream screen unit as a washed corn kernel mass containing a lower amount of starch and gluten than the corn kernel mass, and
    introducing the one or more hydrolytic enzymes into the first fraction (s), the second fraction (f), the mixed first and second fraction (s,f), or the process water, wherein an incubation time in the space (V) is from 0.5 to 3 hours and a total retention time in which one or more fractions of the corn kernel mass is contacted with an effective amount of the one or more hydrolytic enzymes in the fiber-washing system is from 90 minutes to 5 hours.

2. The system according to claim 1, wherein one or more screen units are hydro-cyclones (16).

3. The system according to claim 1 wherein the system is configured to introduce the one or more hydrolytic enzymes into said first fraction (s) and/or into said second fraction (f) and/or into said mixed first and second fraction (s,f) and/or into the process water, by means of a dosing device (10).

4. The system according to claim 3, wherein said dosing device (10) is adapted to provide a controllable dosing of a quantity of the one or more hydrolytic enzymes according to a predetermined specific ratio between an amount of the one or more hydrolytic enzymes and an infeed of the corn kernel mass to the system.

5. The system according to claim 3, wherein the dosing device (10) is a metering pump.

6. The system according to claim 3, wherein the dosing device (10) is a gravity flow dispenser having a controllable outflow valve configured for controlling an amount of one or more hydrolytic enzymes flowing through a flow valve.

7. The system according to claim 1, wherein the second fraction (f) of the corn kernel mass contacted with the one or more hydrolytic enzymes in the space (V) has a fiber content, which corresponds to 5-15% (w/w) dry solids (DS).

8. The system according to claim 1, wherein the second fraction (f) of the corn kernel mass contacted with the one or more hydrolytic enzymes in the space (V) has a fiber content, which corresponds to 5-12% (w/w) dry solids (DS).

9. The system according to claim 1, wherein the second fraction (f) of the corn kernel mass contacted with the one or more hydrolytic enzymes in the space (V) has a fiber content, which corresponds to 5-10% (w/w) dry solids (DS).

10. The system according to claim 1, wherein the second fraction (f) of the corn kernel mass contacted with the one or more hydrolytic enzymes in the space (V) has a fiber content, which corresponds to 7.5-12.5% (w/w) dry solids (DS).

11. The system according to claim 1, wherein the second fraction (f) of the corn kernel mass contacted with the one or more hydrolytic enzymes in the space (V) has a fiber content, which corresponds to 8-12% (w/w) dry solids (DS).

12. The system according to claim 1, wherein the second fraction (f) of the corn kernel mass contacted with the one or more hydrolytic enzymes in the space (V) has a fiber content, which corresponds to 8-11% (w/w) dry solids (DS).

13. A method to improve starch yield and/or gluten yield from corn kernels in a wet milling process, comprising the steps of:
   a) soaking the kernels in water to produce soaked kernels;
   b) grinding the soaked kernels;
   c) separating germs from the ground and soaked kernels to produce a corn kernel mass comprising fiber, starch and gluten; and
   d) subjecting the resultant corn kernel mass, to a fiber washing procedure;
   wherein during step d) one or more fractions of the corn kernel mass is contacted with an effective amount of one or more hydrolytic enzymes, and wherein the fiber washing procedure is performed with a fiber washing system in a corn kernel wet milling system comprising a plurality of screen units being fluidly connected in a counter current washing configuration from a most upstream screen unit to a most downstream screen unit; each screen unit is configured for separating a stream of corn kernel mass and liquid into two fractions:
   a first fraction (s) and a second fraction (f), said second fraction (f) containing a higher amount measured in wt % fiber than the first fraction (s);
   a space (V) is a separate container being fluidly connected with one or more screen units to receive one of said first fraction (s), one of said second fraction (f), or a mixed first and second fraction (s,f), and wherein the space (V) is configured to provide an incubation time in which the first fraction (s), the second fraction (f), or the mixed first and second fraction (s,f) received in the space (V) are contacted with the one or more hydrolytic enzymes to produce incubated fractions; and outletting the incubated fractions to a downstream screen unit,
   wherein the system is configured for
   inletting the corn kernel mass and the liquid to the most upstream screen unit,
   outletting the first fraction (s) from the most upstream screen unit as a product stream containing starch,
   inletting process water,
   outletting the second fraction (f) from the most downstream screen unit as a washed corn kernel mass containing a lower amount of starch and gluten than the corn kernel mass, and
   introducing the one or more hydrolytic enzymes into the first fraction (s), the second fraction (f), the mixed first and second fraction (s,f), or the process water, wherein an incubation time in the space (V) is from 0.5 to 3 hours and a total retention time in which one or more fractions of the corn kernel mass is contacted with an effective amount of the one or more hydrolytic enzymes in the fiber-washing system is from 90 minutes to 5 hours.

14. The method according to claim 13, wherein the one or more of said hydrolytic enzymes is/are selected from the group consisting of cellulases (EC 3.2.1.4), xylanases (EC 3.2.1.8) arabinofuranosidases (EC 3.2.1.55 (Non-reducing end alpha-L-arabinofuranosidases); EC 3.2.1.185 (Non-reducing end beta-L-arabinofuranosidases) cellobiohydrolase I (EC 3.2.1.150), cellobiohydrolase II (E.C. 3.2.1.91), cellobiosidase (E.C. 3.2.1.176), beta-glucosidase (E.C. 3.2.1.21), beta-xylosidases (EC 3.2.1.37).

15. The method according to claim 13, wherein the one or more of said hydrolytic enzymes is expressed in an organism with a cellulase background.

16. The method according to claim 13, wherein the one or more of said hydrolytic enzymes comprise a xylanase, which is a GH10 xylanase.

17. The method according to claim 13, wherein the one or more of said hydrolytic enzymes comprise an arabinofuranosidase, which is a GH62 arabinofuranosidase.

18. The method according to claim 13, wherein the one or more of said hydrolytic enzymes comprise a GH10 polypeptide with xylanase activity, which is selected from the group consisting of
   i) an amino acid sequence as set forth in any one of SEQ ID NOs: 22-26;
   ii) an amino acid sequence which has at least 80% identity to any one of SEQ ID NOs: 22-26; and
   iii) a subsequence of any one of the amino acid sequences in i) and ii).

19. The method according to claim 13, wherein the one or more of said hydrolytic enzymes comprise a GH11 polypeptide with xylanase activity, which is selected from the group consisting of
   i) an amino acid sequence as set forth in any one of SEQ ID NOs: 27-35;
   ii) an amino acid sequence which has at least 80% identity to any one of SEQ ID NOs: 27-35; and
   iii) a subsequence of any one of the amino acid sequences in i) and ii).

20. The method according to claim 13, wherein the one or more of said hydrolytic enzymes comprise a GH62 polypeptide with arabinofuranosidase activity, which is selected from the group consisting of:
   i) an amino acid sequence as set forth in any one of SEQ ID NOs: 1-21;
   ii) an amino acid sequence which has at least 80% identity to any one of the amino acid sequences set forth in SEQ ID NO:1-21; and
   iii) a subsequence of any one of the amino acid sequences in i) and ii).

21. The method according to claim 13, wherein the one or more of said hydrolytic enzymes is expressed in *Trichoderma reesei* and comprise a xylanase, which is a GH10 xylanase and a arabinofuranosidase, which is a GH62 arabinofuranosidase.

22. A wet milling process, which comprises subjecting a corn kernel mass comprising fiber, starch and gluten to a fiber washing procedure in which one or more fractions of the corn kernel mass is contacted with an effective amount of one or more hydrolytic enzymes, and wherein the fiber washing procedure is performed with a fiber washing system in a corn kernel wet milling system comprising a plurality of screen units being fluidly connected in a counter current washing configuration from a most upstream screen unit to a most downstream screen unit; each screen unit is configured for separating a stream of said corn kernel mass and liquid into two fractions:

a first fraction (s) and a second fraction (f), said second fraction (f) containing a higher amount measured in wt % fiber than the first fraction (s);

a space (V) is a separate container being fluidly connected with one or more screen units to receive one of said first fraction (s), one of said second fraction (f), or a mixed first and second fraction (s,f), and wherein the space (V) is configured to provide an incubation time in which the first fraction (s), the second fraction (f), or the mixed first and second fraction (s,f) received in the space (V) are contacted with the one or more hydrolytic enzymes to produce incubated fractions; and outletting the incubated fractions to a downstream screen unit, wherein the system is configured for inletting the corn kernel mass and the liquid to the most upstream screen unit, outletting the first fraction (s) from the most upstream screen unit as a product stream containing starch, inletting process water, outletting the second fraction (f) from the most downstream screen unit as a washed corn kernel mass containing a lower amount of starch and gluten than the corn kernel mass, and introducing the one or more hydrolytic enzymes into the first fraction (s), the second fraction (f), the mixed first and second fraction (s,f), or the process water, wherein an incubation time in the space (V) is from 0.5 to 3 hours and a total retention time in which one or more fractions of the corn kernel mass is contacted with an effective amount of the one or more hydrolytic enzymes in the fiber-washing system is from 90 minutes to 5 hours.

* * * * *

SEQUENCE LISTING

```
<160> NUMBER OF SEQ ID NOS: 35

<210> SEQ ID NO 1
<211> LENGTH: 302
<212> TYPE: PRT
<213> ORGANISM: Penicillium capsulatum

<400> SEQUENCE: 1

Asn Cys Ala Leu Pro Ser Thr Tyr Ser Trp Thr Ser Thr Ser Ala Leu
1               5                   10                  15

Ala Asn Pro Lys Pro Gly Trp Thr Ala Ile Lys Asp Phe Thr Asn Val
            20                  25                  30

Val Phe Asn Asn Arg His Val Val Tyr Ala Ser Thr Thr Asp Thr Ser
        35                  40                  45

Gly Asn Tyr Gly Ala Met Ser Phe Gly Val Phe Ser Asp Trp Pro Gly
    50                  55                  60

Met Ala Ser Ala Ser Gln Asn Ala Leu Ser Phe Ala Ala Val Ala Pro
65                  70                  75                  80

Thr Leu Phe Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Tyr Gly Trp Ser Ser Glu Gln Ala Leu Phe Ser Gly Lys Val Thr
        115                 120                 125

Gly Ser Ser Thr Gly Ala Ile Asp Gln Thr Leu Ile Gly Asp Ala Thr
    130                 135                 140

His Met Tyr Leu Phe Phe Ala Gly Asp Asn Gly Lys Ile Tyr Arg Ser
145                 150                 155                 160
```

-continued

```
Ser Met Pro Ile Ser Asn Phe Pro Gly Asn Phe Gly Thr Val Ser Glu
            165                 170                 175

Val Val Leu Ser Asp Thr Gln Asn Asn Leu Phe Glu Ala Val Gln Val
        180                 185                 190

Tyr Thr Val Lys Gly Gln Asn Gln Tyr Leu Met Ile Val Glu Ala Ile
        195                 200                 205

Gly Ser Glu Gly Arg Tyr Phe Arg Ser Phe Thr Ala Ser Ser Leu Gly
    210                 215                 220

Gly Leu Trp Thr Ala Gln Ala Ser Glu Thr Lys Pro Phe Ala Gly
225                 230                 235                 240

Lys Ala Asn Ser Gly Ala Thr Trp Thr Asn Asp Ile Ser His Gly Asp
                245                 250                 255

Leu Val Arg Ser Asn Pro Asp Gln Thr Met Thr Ile Asp Pro Cys Asn
            260                 265                 270

Leu Gln Phe Leu Tyr Gln Gly Arg Asn Pro Gly Ala Ser Gly Asn Tyr
        275                 280                 285

Asn Thr Leu Pro Trp Arg Pro Gly Val Leu Thr Leu Asn Asn
        290                 295                 300

<210> SEQ ID NO 2
<211> LENGTH: 303
<212> TYPE: PRT
<213> ORGANISM: Penicillium aurantiogriseum

<400> SEQUENCE: 2

Asp Cys Ala Leu Pro Ser Thr Tyr Thr Trp Thr Ser Thr Gly Ala Leu
1               5                   10                  15

Ala Asn Pro Lys Ser Gly Trp Thr Ala Ile Lys Asp Phe Thr Asn Val
            20                  25                  30

Val Val Asn Lys His Leu Val Tyr Ala Ser Thr Thr Asp Ala Ser
        35                  40                  45

Gly Asn Tyr Gly Ala Met Asn Phe Gly Pro Phe Ser Asp Trp Ser Gly
    50                  55                  60

Met Ala Thr Ala Ser Gln Ile Lys Thr Ser Phe Asn Ala Val Ala Pro
65                  70                  75                  80

Thr Leu Phe Tyr Phe Gln Pro Lys Asp Ile Trp Val Ile Ala Tyr Gln
            85                  90                  95

Trp Gly Ser Ser Thr Phe Thr Tyr Arg Thr Ser Ser Asp Pro Thr Asn
            100                 105                 110

Ala Asn Gly Trp Ser Ser Glu Gln Ala Leu Phe Ser Gly Lys Ile Thr
        115                 120                 125

Ala Pro Asp Ala Ala Ile Asp Gln Thr Val Ile Gly Asp Ser Thr His
    130                 135                 140

Met Tyr Leu Phe Phe Ala Gly Asp Asn Gly Lys Ile Tyr Arg Ser Ser
145                 150                 155                 160

Met Ser Ile Asp Lys Phe Pro Gly Asn Phe Gly Thr Ser Ser Glu Ile
            165                 170                 175

Val Leu Ser Gly Ala Arg Asn Asp Leu Phe Glu Ala Val Gln Val Tyr
        180                 185                 190

Thr Val Lys Gly Gln Asn Lys Tyr Leu Met Leu Val Glu Ala Ile Gly
        195                 200                 205

Ala Gln Gly Gln Arg Tyr Phe Arg Ser Phe Val Ser Ser Ser Leu Gly
    210                 215                 220

Gly Lys Trp Glu Pro Gln Ala Ala Ser Glu Ser Lys Pro Phe Ala Gly
225                 230                 235                 240
```

```
Lys Ala Asn Val Gly Ala Thr Trp Thr Lys Asp Phe Ser His Gly Asp
                245                 250                 255

Leu Val Arg Thr Asn Pro Asp Gln Thr Met Thr Val Asp Pro Cys Asn
            260                 265                 270

Leu Gln Leu Leu Tyr Gln Gly Arg Asp Pro Thr Ala Thr Ser Ser Asn
        275                 280                 285

Tyr Asn Thr Ile Pro Trp Gln Pro Ala Val Leu Thr Leu Lys Lys
    290                 295                 300

<210> SEQ ID NO 3
<211> LENGTH: 382
<212> TYPE: PRT
<213> ORGANISM: Aspergillus clavatus

<400> SEQUENCE: 3

Gln Gln Thr Leu Tyr Gly Gln Cys Gly Gly Asn Gly Trp Thr Gly Pro
1               5                   10                  15

Thr Gln Cys Val Ser Gly Ala Cys Cys Gln Ile Gln Asn Pro Trp Tyr
            20                  25                  30

Ser Gln Cys Leu Pro Gly Ser Cys Ser Pro Ser Thr Thr Leu Thr Arg
        35                  40                  45

Val Thr Thr Thr Ala Thr Ser Thr Ala Ser Thr Ala Thr Ser Gly Thr
    50                  55                  60

Gly Gly Ser Leu Pro Ser Ser Phe Lys Trp Ser Ser Ser Gly Pro Leu
65                  70                  75                  80

Val Asp Pro Lys Asn Asp Gly Arg Gly Ile Ala Ala Leu Lys Asp Pro
                85                  90                  95

Ser Ile Val Glu Val Asp Gly Thr Tyr His Val Phe Ala Ser Thr Ala
            100                 105                 110

Thr Ser Ala Gly Tyr Asn Met Val Tyr Phe Asn Phe Thr Asp Phe Asn
        115                 120                 125

Gln Ala Asn Asn Ala Pro Phe Phe Tyr Leu Asp Lys Ser Pro Ile Gly
    130                 135                 140

Ser Gly Tyr Arg Ala Ala Pro Gln Val Phe Phe Lys Pro Gln Asn
145                 150                 155                 160

Leu Trp Tyr Leu Val Tyr Gln Asn Gly Asn Ala Ala Tyr Ser Thr Asn
                165                 170                 175

Lys Asp Ile Ser Asn Pro Ala Gly Trp Ser Ala Pro Lys Thr Phe Tyr
            180                 185                 190

Ser Ser Gln Pro Ser Ile Ile Thr Glu Asn Ile Gly Asn Gly Tyr Trp
        195                 200                 205

Val Asp Met Trp Val Ile Cys Asp Ser Ala Asn Cys His Leu Phe Ser
    210                 215                 220

Ser Asp Asp Asn Gly His Leu Tyr Arg Ser Gln Thr Thr Leu Ala Asn
225                 230                 235                 240

Phe Pro Asn Gly Met Thr Asn Thr Val Ile Ala Met Gln Asp Ser Asn
                245                 250                 255

Pro Asn Asn Leu Phe Glu Ala Ser Asn Val Tyr His Val Gly Gly Gly
            260                 265                 270

Lys Tyr Leu Leu Ile Val Glu Ala Ile Gly Ser Gly Gly Asp Arg Tyr
        275                 280                 285

Phe Arg Ser Trp Thr Ser Thr Ser Leu Thr Gly Thr Trp Thr Ala Leu
    290                 295                 300

Ala Ala Ser Glu Ser Asn Pro Phe Ala Gly Ala Lys Asn Val Ala Phe
```

```
            305                 310                 315                 320
Ser Gly Asn Val Trp Thr Lys Ser Ile Ser His Gly Glu Met Ile Arg
                325                 330                 335

Asp Gln Val Asp Gln Thr Leu Thr Ile Ser Pro Cys Lys Leu Arg Tyr
                340                 345                 350

Leu Tyr Gln Gly Val Asp Pro Ala Ala Thr Gly Asn Tyr Asn Ser Leu
                355                 360                 365

Pro Trp Lys Leu Ala Leu Leu Thr Gln Thr Asn Ser Ala Cys
                370                 375                 380

<210> SEQ ID NO 4
<211> LENGTH: 378
<212> TYPE: PRT
<213> ORGANISM: Aspergillus clavatus

<400> SEQUENCE: 4

Gln Gln Pro Leu Tyr Ala Gln Cys Gly Gly Asn Gly Trp Thr Gly Ser
1               5                   10                  15

Thr Gln Cys Val Ala Gly Ala Cys Cys Ser Ser Ile Asn Ala Trp Tyr
                20                  25                  30

Tyr Gln Cys Leu Ser Gly Asn Cys Met Pro Ser Thr Thr Met Thr Thr
                35                  40                  45

Thr Ala Thr Arg Thr Thr Ser Thr Ser Thr Gly Pro Thr Gly Ser
        50                  55                  60

Leu Pro Pro Ser Phe Lys Trp Ser Ser Thr Asn Ala Leu Val Gly Pro
65              70                  75                  80

Lys Asn Asp Gly Arg Asn Leu Ala Gly Ile Lys Asp Pro Ser Ile Ile
                85                  90                  95

Glu Val Asp Gly Thr Tyr His Val Phe Ala Ser Thr Ala Gln Ala Ser
                100                 105                 110

Gly Tyr Asn Leu Val Tyr Phe Asn Phe Thr Asp Phe Asn Gln Ala Gly
                115                 120                 125

Asn Ala Pro Phe Phe Tyr Leu Asp Gln Ser Gly Ile Gly Thr Gly Tyr
        130                 135                 140

Arg Ala Ala Pro Gln Val Phe Phe Gln Pro Gln Gln Leu Trp Tyr
145                 150                 155                 160

Leu Ile Phe Gln Asn Gly Asn Ala Ala Tyr Ser Thr Asn Lys Asp Ile
                165                 170                 175

Ser Asn Pro Ala Gly Trp Ser Ala Pro Lys Asn Phe Ser Ser Val
                180                 185                 190

Pro Ser Ile Ile Thr Gln Asn Ile Gly Asn Gly Tyr Trp Val Asp Met
                195                 200                 205

Trp Val Ile Cys Asp Ser Ser Asn Cys Tyr Leu Phe Ser Ser Asp Asp
        210                 215                 220

Asn Gly His Leu Tyr Arg Ser Gln Thr Thr Leu Ser Asn Phe Pro Asn
225                 230                 235                 240

Gly Met Gly Asn Thr Val Ile Ala Leu Ser Asp Ser Asn Pro Asn Asn
                245                 250                 255

Leu Phe Glu Ala Ser Asn Val Tyr Arg Val Gly Asn Glu Tyr Leu Leu
                260                 265                 270

Ile Val Glu Ala Ile Gly Ser Asp Gly Asn Arg Tyr Phe Arg Ser Trp
                275                 280                 285

Thr Ala Pro Ser Leu Thr Gly Ser Trp Thr Gly Leu Ala Asn Thr Glu
                290                 295                 300
```

```
Ala Asn Pro Phe Ala Arg Trp Asn Asn Val Val Phe Ser Gly Thr Ala
305                 310                 315                 320

Trp Thr Lys Ser Ile Ser His Gly Glu Met Val Arg Ser Gln Val Asp
            325                 330                 335

Gln Thr Met Thr Ile Ser Pro Cys Lys Leu Arg Tyr Leu Tyr Gln Gly
            340                 345                 350

Leu Ser Pro Thr Ala Thr Gly Asp Tyr Asn Ser Leu Pro Trp Lys Leu
            355                 360                 365

Ala Leu Leu Thr Gln Thr Asn Ser Ala Cys
        370                 375
```

<210> SEQ ID NO 5
<211> LENGTH: 311
<212> TYPE: PRT
<213> ORGANISM: Ustilago maydis

<400> SEQUENCE: 5

```
Asn Pro Glu Thr Glu Arg Arg Ser Cys Ala Leu Pro Thr Thr Tyr
1               5                   10                  15

Arg Trp Thr Ser Ser Ala Pro Leu Ala Gln Pro Lys Asp Gly Trp Val
            20                  25                  30

Ser Leu Lys Asp Phe Thr His Val Pro Tyr Asn Gly Gln His Leu Val
        35                  40                  45

Tyr Ala Ser Tyr His Asp Ser Thr Lys Tyr Gly Ser Met Ala Phe Ser
    50                  55                  60

Pro Phe Lys His Trp Ala Asp Met Ala Thr Ala Thr Gln Thr Gly Met
65                  70                  75                  80

Thr Gln Ala Ala Val Ala Pro Thr Val Phe Tyr Phe Thr Pro Lys Lys
                85                  90                  95

Leu Trp Phe Leu Val Ser Gln Trp Gly Ser Ala Pro Thr Tyr Arg
            100                 105                 110

Thr Ser Thr Asp Pro Thr Lys Val Asn Gly Trp Ser Ala Pro Gln Pro
            115                 120                 125

Leu Phe Thr Gly Lys Val Ala Asp Ser Gly Thr Gly Pro Ile Asp Gln
    130                 135                 140

Thr Val Ile Ala Asp Asp Arg Lys Val Tyr Leu Phe Phe Val Ala Asp
145                 150                 155                 160

Asn Gly Lys Val Tyr Arg Thr Ser Met Ala Ile Gly Asp Phe Pro Ala
                165                 170                 175

Asn Phe Gly Thr Ala Ser Glu Val Ile Leu Ser Asp Thr Gln Ala Lys
            180                 185                 190

Leu Phe Glu Ala Val Gln Val Tyr Thr Val Ala Gly Gln Asn Gln Tyr
        195                 200                 205

Leu Met Ile Val Glu Ala Gln Gly Thr Asn Gly Arg Tyr Phe Arg Ser
    210                 215                 220

Phe Thr Ala Asn Ser Leu Asp Gly Glu Trp Lys Val Gln Ala Gly Ser
225                 230                 235                 240

Glu Ser Ala Pro Phe Ala Gly Lys Ala Asn Ser Gly Ala Ser Trp Thr
                245                 250                 255

Asn Asp Val Ser His Gly Asp Leu Ile Arg Ser Asn Pro Asp Gln Thr
            260                 265                 270

Met Thr Ile Asp Pro Cys Arg Leu Gln Leu Tyr Gln Gly Arg Asp
        275                 280                 285

Lys Asn Lys Val Pro Ser Ser Tyr Asp Leu Ala Pro Tyr Arg Pro Gly
    290                 295                 300
```

Leu Leu Thr Leu Tyr Gly Leu
305                 310

<210> SEQ ID NO 6
<211> LENGTH: 302
<212> TYPE: PRT
<213> ORGANISM: Penicillium oxalicum

<400> SEQUENCE: 6

Pro Val Pro Ser Gln Gly Gln Tyr Arg Trp Ser Ser Thr Gly Ala Leu
1               5                   10                  15

Ala Gln Pro Gln His Gly Trp Thr Ser Ile Lys Asp Phe Thr Asn Val
            20                  25                  30

Val Tyr Asn Gly Lys His Leu Val Tyr Ala Ser Val Ala Asp Ser Lys
        35                  40                  45

Gly Asn Tyr His Ser Met Asn Phe Gly Leu Phe Ser Asp Trp Ser Gln
    50                  55                  60

Met Ala Ser Ala Ser Gln Asn Pro Met Asn Phe Asn Ala Val Ala Pro
65                  70                  75                  80

Thr Leu Phe Phe Phe Ala Pro Lys Asn Val Trp Val Leu Ala Tyr Gln
                85                  90                  95

Trp Gly Ala Asn Ala Phe Ser Tyr Arg Thr Ser Asn Asp Pro Ala Asn
            100                 105                 110

Ala Asn Gly Trp Ser Ser Glu His Pro Leu Phe Thr Gly Lys Ile Ala
        115                 120                 125

Asn Ser Gly Thr Gly Pro Ile Asp Gln Thr Leu Ile Gly Asp Asn Gln
    130                 135                 140

Asn Met Tyr Leu Phe Phe Ala Gly Asp Asn Gly Lys Ile Tyr Arg Ser
145                 150                 155                 160

Ser Met Pro Leu Asn Asn Phe Pro Gly Ser Phe Gly Ala Ser Glu
                165                 170                 175

Val Ile Leu Ser Asp Thr Thr Ala Asn Leu Phe Glu Ala Val Gln Val
            180                 185                 190

Tyr Lys Val Ala Gly Glu Asn Lys Tyr Leu Met Ile Val Glu Ala Met
        195                 200                 205

Gly Ala His Gly Arg Tyr Phe Arg Ser Phe Thr Ala Thr Ser Leu Asn
    210                 215                 220

Gly Lys Trp Thr Leu Asn Ala Gly Ser Glu Gly Ala Pro Phe Ala Gly
225                 230                 235                 240

Lys Ala Asn Ser Gly Ala Gly Trp Thr Asn Asp Ile Ser His Gly Asp
                245                 250                 255

Leu Val Arg Thr Asn Pro Asp Gln Thr Met Thr Val Asp Met Cys Asn
            260                 265                 270

Leu Gln Phe Leu Tyr Gln Gly Arg Asp Pro Asn Ala Asn Pro Thr Tyr
        275                 280                 285

Asn Ala Leu Pro Tyr Arg Pro Gly Val Leu Thr Leu Lys His
    290                 295                 300

<210> SEQ ID NO 7
<211> LENGTH: 309
<212> TYPE: PRT
<213> ORGANISM: Talaromyces pinophilus

<400> SEQUENCE: 7

Ser Pro Val Pro Glu Lys Arg Ser Gly Cys Ala Leu Pro Ser Thr Tyr
1               5                   10                  15

Lys Trp Thr Ser Thr Gly Pro Leu Ala Ser Pro Lys Ser Gly Leu Val
                20                  25                  30

Ala Leu Arg Asp Tyr Ser His Val Ile Tyr Asn Gly Gln His Leu Val
            35                  40                  45

Tyr Gly Ser Thr Ala Asn Thr Ala Gly Ser Tyr Gly Ser Met Asn Phe
        50                  55                  60

Gly Leu Phe Ser Asp Trp Ser Glu Met Ser Ser Ala Ser Gln Asn Thr
65                  70                  75                  80

Met Ser Thr Gly Ala Val Ala Pro Thr Ile Phe Tyr Phe Ala Pro Lys
                85                  90                  95

Ser Val Trp Ile Leu Ala Tyr Gln Trp Gly Pro Tyr Ala Phe Ser Tyr
            100                 105                 110

Arg Thr Ser Thr Asp Pro Ser Asn Ala Asn Gly Trp Ser Ser Pro Gln
        115                 120                 125

Pro Leu Phe Thr Gly Thr Ile Ser Gly Ser Ser Thr Gly Val Ile Asp
    130                 135                 140

Gln Thr Val Ile Gly Asp Ser Glu Asn Met Tyr Leu Phe Phe Ala Gly
145                 150                 155                 160

Asp Asn Gly His Ile Tyr Arg Ala Ser Met Pro Ile Gly Asp Phe Pro
                165                 170                 175

Gly Ser Phe Gly Ser Ala Ser Thr Ile Val Leu Ser Asp Ser Thr Asn
            180                 185                 190

Asn Leu Phe Glu Ala Val Glu Val Tyr Thr Val Glu Gly Gln Asn Gln
        195                 200                 205

Tyr Leu Met Ile Val Glu Ala Ile Gly Ala Asn Gly Arg Tyr Phe Arg
    210                 215                 220

Ser Phe Thr Ala Ser Ser Leu Gly Gly Thr Trp Thr Ala Gln Ala Ser
225                 230                 235                 240

Thr Glu Ser Asn Pro Phe Ala Gly Lys Ala Asn Ser Gly Ala Thr Trp
                245                 250                 255

Thr Asn Asp Ile Ser Ser Gly Asp Leu Val Arg Thr Asn Pro Asp Gln
            260                 265                 270

Thr Gln Thr Ile Asp Ala Cys Asn Leu Gln Phe Leu Tyr Gln Gly Arg
        275                 280                 285

Ser Thr Ser Ser Gly Gly Asp Tyr Asn Leu Leu Pro Tyr Gln Pro Gly
    290                 295                 300

Leu Leu Thr Leu Ala
305

<210> SEQ ID NO 8
<211> LENGTH: 438
<212> TYPE: PRT
<213> ORGANISM: Streptomyces nitrosporeus

<400> SEQUENCE: 8

Ala Ala Ser Gly Ala Leu Arg Gly Ala Gly Ser Gly Arg Cys Val Asp
1               5                   10                  15

Val Thr Gly Gly Glu Arg Thr Asp Gly Thr Thr Leu Gln Leu Tyr Asp
                20                  25                  30

Cys Trp Gly Gly Thr Asn Gln Gln Trp Thr Ser Thr Asp Ser Gly Gln
            35                  40                  45

Leu Thr Val Tyr Gly Asp Lys Cys Leu Asp Val Pro Gly His Ala Thr
        50                  55                  60

Thr Pro Gly Thr Arg Val Gln Ile Trp Gly Cys Ser Gly Gly Ala Asn

```
            65                  70                  75                  80
        Gln Gln Trp Arg Val Asn Ser Asp Gly Thr Val Val Gly Val Glu Ser
                         85                  90                  95
        Gly Leu Cys Leu Glu Ala Ala Gly Ala Gly Thr Ala Asn Gly Thr Ala
                        100                 105                 110
        Val Gln Leu Trp Thr Cys Asn Gly Ser Asn Gln Lys Trp Thr Gly
                        115                 120                 125
        Leu Pro Ala Thr Pro Thr Asp Gly Thr Cys Ser Leu Pro Ser Ala
        130                 135                 140
        Tyr Arg Trp Thr Ser Thr Gly Val Leu Ala Gln Pro Ala Asn Gly Trp
        145                 150                 155                 160
        Ala Ala Val Lys Asp Phe Thr Thr Val Thr His Asn Gly Lys His Leu
                        165                 170                 175
        Val Tyr Ala Ser Asn Val Ser Gly Ser Ser Tyr Gly Ser Met Met Phe
                        180                 185                 190
        Ser Pro Phe Thr Asp Trp Pro Asp Met Ala Ser Ala Gly Gln Thr Gly
                        195                 200                 205
        Met Ser Gln Ala Ala Val Ala Pro Thr Leu Phe Tyr Phe Ala Pro Lys
                        210                 215                 220
        Asn Ile Trp Val Leu Ala Tyr Gln Trp Gly Ala Trp Pro Phe Ile Tyr
        225                 230                 235                 240
        Arg Thr Ser Ser Asn Pro Ala Asp Pro Asn Gly Trp Ser Ser Pro Gln
                        245                 250                 255
        Pro Leu Phe Thr Gly Ser Ile Ser Gly Ser Asp Thr Gly Pro Ile Asp
                        260                 265                 270
        Gln Thr Leu Ile Ala Asp Gly Gln Asn Met Tyr Leu Phe Phe Ala Gly
                        275                 280                 285
        Asp Asn Gly Lys Ile Tyr Arg Ala Ser Met Pro Ile Gly Asn Phe Pro
                        290                 295                 300
        Gly Ser Phe Gly Ser Ser Tyr Thr Thr Val Met Ser Asp Thr Lys Ala
        305                 310                 315                 320
        Asn Leu Phe Glu Gly Val Gln Val Tyr Lys Val Lys Asp Arg Ser Gln
                        325                 330                 335
        Tyr Leu Met Ile Val Glu Ala Met Gly Ala Asn Gly Arg Tyr Phe Arg
                        340                 345                 350
        Ser Phe Thr Ala Ser Ser Leu Asn Gly Thr Trp Thr Pro Gln Ala Ala
                        355                 360                 365
        Thr Glu Ser Ser Pro Phe Ala Gly Lys Ala Asn Ser Gly Ala Thr Trp
                        370                 375                 380
        Thr Asn Asp Ile Ser His Gly Asp Leu Val Arg Asp Asn Pro Asp Gln
        385                 390                 395                 400
        Thr Met Thr Val Asp Pro Cys Asn Leu Arg Phe Leu Tyr Gln Gly Lys
                        405                 410                 415
        Ala Pro Asp Ala Gly Gly Glu Tyr Asn Arg Leu Pro Trp Arg Pro Gly
                        420                 425                 430
        Val Leu Thr Leu Arg Arg
                        435

<210> SEQ ID NO 9
<211> LENGTH: 446
<212> TYPE: PRT
<213> ORGANISM: Artificial Sequence
<220> FEATURE:
<223> OTHER INFORMATION: Mature sequence with His-tag
```

```
<400> SEQUENCE: 9

His His His His His Pro Arg Ala Ala Ser Gly Ala Leu Arg Gly
1               5                   10                  15

Ala Gly Ser Gly Arg Cys Val Asp Val Thr Gly Gly Glu Arg Thr Asp
            20                  25                  30

Gly Thr Thr Leu Gln Leu Tyr Asp Cys Trp Gly Gly Thr Asn Gln Gln
                35                  40                  45

Trp Thr Ser Thr Asp Ser Gly Gln Leu Thr Val Tyr Gly Asp Lys Cys
    50                  55                  60

Leu Asp Val Pro Gly His Ala Thr Thr Pro Gly Thr Arg Val Gln Ile
65                  70                  75                  80

Trp Gly Cys Ser Gly Ala Asn Gln Gln Trp Arg Val Asn Ser Asp
                85                  90                  95

Gly Thr Val Gly Val Glu Ser Gly Leu Cys Leu Glu Ala Ala Gly
                100                 105                 110

Ala Gly Thr Ala Asn Gly Thr Ala Val Gln Leu Trp Thr Cys Asn Gly
            115                 120                 125

Gly Ser Asn Gln Lys Trp Thr Gly Leu Pro Ala Thr Pro Thr Asp
    130                 135                 140

Gly Thr Cys Ser Leu Pro Ser Ala Tyr Arg Trp Thr Ser Thr Gly Val
145                 150                 155                 160

Leu Ala Gln Pro Ala Asn Gly Trp Ala Ala Val Lys Asp Phe Thr Thr
                165                 170                 175

Val Thr His Asn Gly Lys His Leu Val Tyr Ala Ser Asn Val Ser Gly
            180                 185                 190

Ser Ser Tyr Gly Ser Met Met Phe Ser Pro Phe Thr Asp Trp Pro Asp
    195                 200                 205

Met Ala Ser Ala Gly Gln Thr Gly Met Ser Gln Ala Ala Val Ala Pro
210                 215                 220

Thr Leu Phe Tyr Phe Ala Pro Lys Asn Ile Trp Val Leu Ala Tyr Gln
225                 230                 235                 240

Trp Gly Ala Trp Pro Phe Ile Tyr Arg Thr Ser Ser Asn Pro Ala Asp
                245                 250                 255

Pro Asn Gly Trp Ser Ser Pro Gln Pro Leu Phe Thr Gly Ser Ile Ser
                260                 265                 270

Gly Ser Asp Thr Gly Pro Ile Asp Gln Thr Leu Ile Ala Asp Gly Gln
            275                 280                 285

Asn Met Tyr Leu Phe Phe Ala Gly Asp Asn Gly Lys Ile Tyr Arg Ala
290                 295                 300

Ser Met Pro Ile Gly Asn Phe Pro Gly Ser Phe Gly Ser Ser Tyr Thr
305                 310                 315                 320

Thr Val Met Ser Asp Thr Lys Ala Asn Leu Phe Glu Gly Val Gln Val
                325                 330                 335

Tyr Lys Val Lys Asp Arg Ser Gln Tyr Leu Met Ile Val Glu Ala Met
            340                 345                 350

Gly Ala Asn Gly Arg Tyr Phe Arg Ser Phe Thr Ala Ser Ser Leu Asn
        355                 360                 365

Gly Thr Trp Thr Pro Gln Ala Ala Thr Glu Ser Pro Phe Ala Gly
    370                 375                 380

Lys Ala Asn Ser Gly Ala Thr Trp Thr Asn Asp Ile Ser His Gly Asp
385                 390                 395                 400

Leu Val Arg Asp Asn Pro Asp Gln Thr Met Thr Val Asp Pro Cys Asn
                405                 410                 415
```

```
Leu Arg Phe Leu Tyr Gln Gly Lys Ala Pro Asp Ala Gly Gly Glu Tyr
            420                 425                 430

Asn Arg Leu Pro Trp Arg Pro Gly Val Leu Thr Leu Arg Arg
            435                 440                 445

<210> SEQ ID NO 10
<211> LENGTH: 438
<212> TYPE: PRT
<213> ORGANISM: Artificial Sequence
<220> FEATURE:
<223> OTHER INFORMATION: Mature sequence with His-tag

<400> SEQUENCE: 10

Ala Ala Gly Gly Ala Leu Arg Gln Ala Ser Gly Arg Cys Leu Asp
1               5                   10                  15

Val Pro Gly Ala Val Gln Thr Asp Gly Thr Ser Val Gln Ile Tyr Asp
                20                  25                  30

Cys Trp Ser Gly Thr Asn Gln Gln Trp Thr Ser Thr Asp Ala Asn Gln
            35                  40                  45

Leu Thr Val Tyr Gly Asn Lys Cys Leu Asp Val Pro Gly His Ala Thr
        50                  55                  60

Thr Ala Gly Thr Arg Val Gln Ile Trp Ser Cys Ser Gly Gly Ala Asn
65                  70                  75                  80

Gln Gln Trp Arg Val Asn Ser Asp Gly Thr Val Thr Gly Val Glu Ser
                85                  90                  95

Gly Leu Cys Leu Glu Ala Ala Gly Ala Ala Thr Ala Asn Gly Thr Ala
            100                 105                 110

Val Gln Leu Gly Thr Cys Asn Gln Gly Ser Asn Gln Lys Trp Ser Gly
        115                 120                 125

Leu Thr Gly Thr Pro Pro Thr Asp Gly Ser Cys Ser Leu Pro Ser Thr
130                 135                 140

Tyr Arg Trp Ser Ser Thr Gly Val Leu Ala Gln Pro Ala Asn Gly Trp
145                 150                 155                 160

Ala Ala Val Lys Asp Phe Thr Thr Val Thr Tyr Asn Gly Lys His Leu
                165                 170                 175

Val Tyr Ala Ser Asn Val Ser Gly Ser Ser Tyr Gly Ser Met Met Phe
            180                 185                 190

Ser Pro Phe Thr Asn Trp Ser Asp Met Ala Ser Ala Gly Gln Ser Gly
        195                 200                 205

Met Ser Gln Ala Ala Val Ala Pro Thr Leu Phe Tyr Phe Ala Pro Lys
210                 215                 220

Asn Ile Trp Val Leu Ala Tyr Gln Trp Gly Ala Ser Pro Phe Val Tyr
225                 230                 235                 240

Arg Thr Ser Ser Asp Pro Thr Asn Pro Asn Gly Trp Ser Ser Pro Gln
                245                 250                 255

Pro Leu Phe Thr Gly Ser Ile Ser Gly Ser Asp Thr Gly Pro Ile Asp
            260                 265                 270

Gln Thr Leu Ile Ala Asp Gly Gln Asn Met Tyr Leu Phe Phe Ala Gly
        275                 280                 285

Asp Asn Gly Lys Ile Tyr Arg Ala Ser Met Pro Ile Gly Asn Phe Pro
290                 295                 300

Gly Asn Phe Gly Ser Ser Tyr Thr Thr Val Met Ser Asp Thr Lys Ala
305                 310                 315                 320

Asn Leu Phe Glu Gly Val Gln Val Tyr Lys Val Gln Gly Gln Asn Gln
                325                 330                 335
```

Tyr Leu Met Ile Val Glu Ala Met Gly Ala Asn Gly Arg Tyr Phe Arg
                340                 345                 350

Ser Phe Thr Ala Ser Ser Leu Asn Gly Ser Trp Ala Pro Gln Ala Ala
                355                 360                 365

Thr Glu Ser Asn Pro Phe Ala Gly Lys Ala Asn Ser Gly Ala Thr Trp
            370                 375                 380

Thr Asn Asp Ile Ser His Gly Asp Leu Val Arg Gly Asn Pro Asp Gln
385                 390                 395                 400

Thr Met Thr Ile Asp Pro Cys Asn Leu Gln Leu Leu Tyr Gln Gly Lys
                405                 410                 415

Ser Pro Thr Ala Gly Gly Pro Tyr Asp Gln Leu Pro Trp Arg Pro Gly
                420                 425                 430

Val Leu Ser Leu Gln Arg
            435

<210> SEQ ID NO 11
<211> LENGTH: 446
<212> TYPE: PRT
<213> ORGANISM: Artificial Sequence
<220> FEATURE:
<223> OTHER INFORMATION: Mature sequence with His-tag

<400> SEQUENCE: 11

His His His His His Pro Arg Ala Ala Gly Gly Ala Leu Arg Gln
1               5                   10                  15

Ala Ala Ser Gly Arg Cys Leu Asp Val Pro Gly Ala Val Gln Thr Asp
                20                  25                  30

Gly Thr Ser Val Gln Ile Tyr Asp Cys Trp Ser Gly Thr Asn Gln Gln
            35                  40                  45

Trp Thr Ser Thr Asp Ala Asn Gln Leu Thr Val Tyr Gly Asn Lys Cys
50                  55                  60

Leu Asp Val Pro Gly His Ala Thr Thr Ala Gly Thr Arg Val Gln Ile
65                  70                  75                  80

Trp Ser Cys Ser Gly Gly Ala Asn Gln Gln Trp Arg Val Asn Ser Asp
                85                  90                  95

Gly Thr Val Thr Gly Val Glu Ser Gly Leu Cys Leu Glu Ala Ala Gly
                100                 105                 110

Ala Ala Thr Ala Asn Gly Thr Ala Val Gln Leu Gly Thr Cys Asn Gln
            115                 120                 125

Gly Ser Asn Gln Lys Trp Ser Gly Leu Thr Gly Thr Pro Pro Thr Asp
130                 135                 140

Gly Ser Cys Ser Leu Pro Ser Thr Tyr Arg Trp Ser Ser Thr Gly Val
145                 150                 155                 160

Leu Ala Gln Pro Ala Asn Gly Trp Ala Ala Val Lys Asp Phe Thr Thr
                165                 170                 175

Val Thr Tyr Asn Gly Lys His Leu Val Tyr Ala Ser Asn Val Ser Gly
            180                 185                 190

Ser Ser Tyr Gly Ser Met Met Phe Ser Pro Phe Thr Asn Trp Ser Asp
        195                 200                 205

Met Ala Ser Ala Gly Gln Ser Gly Met Ser Gln Ala Val Ala Pro
    210                 215                 220

Thr Leu Phe Tyr Phe Ala Pro Lys Asn Ile Trp Val Leu Ala Tyr Gln
225                 230                 235                 240

Trp Gly Ala Ser Pro Phe Val Tyr Arg Thr Ser Ser Asp Pro Thr Asn
                245                 250                 255

Pro Asn Gly Trp Ser Ser Pro Gln Pro Leu Phe Thr Gly Ser Ile Ser
             260                 265                 270

Gly Ser Asp Thr Gly Pro Ile Asp Gln Thr Leu Ile Ala Asp Gly Gln
         275                 280                 285

Asn Met Tyr Leu Phe Phe Ala Gly Asp Asn Gly Lys Ile Tyr Arg Ala
     290                 295                 300

Ser Met Pro Ile Gly Asn Phe Pro Gly Asn Phe Gly Ser Ser Tyr Thr
305                 310                 315                 320

Thr Val Met Ser Asp Thr Lys Ala Asn Leu Phe Glu Gly Val Gln Val
                 325                 330                 335

Tyr Lys Val Gln Gly Gln Asn Gln Tyr Leu Met Ile Val Glu Ala Met
             340                 345                 350

Gly Ala Asn Gly Arg Tyr Phe Arg Ser Phe Thr Ala Ser Ser Leu Asn
         355                 360                 365

Gly Ser Trp Ala Pro Gln Ala Ala Thr Glu Ser Asn Pro Phe Ala Gly
     370                 375                 380

Lys Ala Asn Ser Gly Ala Thr Trp Thr Asn Asp Ile Ser His Gly Asp
385                 390                 395                 400

Leu Val Arg Gly Asn Pro Asp Gln Thr Met Thr Ile Asp Pro Cys Asn
                 405                 410                 415

Leu Gln Leu Leu Tyr Gln Gly Lys Ser Pro Thr Ala Gly Gly Pro Tyr
             420                 425                 430

Asp Gln Leu Pro Trp Arg Pro Gly Val Leu Ser Leu Gln Arg
         435                 440                 445

<210> SEQ ID NO 12
<211> LENGTH: 318
<212> TYPE: PRT
<213> ORGANISM: Aspergillus clavatus

<400> SEQUENCE: 12

Ala Ser Leu Pro Arg Ser Phe Lys Trp Ser Ser Ser Ala Ala Leu Val
1               5                   10                  15

Gly Pro Lys Asn Asp Gly Arg His Ile Glu Gly Ile Lys Asp Pro Ser
             20                  25                  30

Ile Val Glu Val Asp Gly Thr Tyr His Val Phe Ala Ser Thr Ala Gln
         35                  40                  45

Ala Ser Gly Tyr Asn Leu Val Tyr Leu Ser Phe Thr Asp Phe Asn Lys
     50                  55                  60

Ala His Leu Ala Pro Phe His Tyr Leu Asp Gln Thr Arg Ile Gly Lys
65                  70                  75                  80

Gly Tyr Arg Ala Ala Pro Gln Val Phe Tyr Phe Lys Pro His Lys Leu
                 85                  90                  95

Trp Tyr Leu Val Tyr Gln Asn Gly Asn Ala Ala Tyr Ser Thr Asn Pro
             100                 105                 110

Asp Ile Ser Asn Pro Ala Gly Trp Thr Ser Pro Gln Asn Phe Phe Ser
         115                 120                 125

Gly Thr Pro Ser Ile Ile Thr His Asn Met Gly Arg Gly Ala Trp Val
     130                 135                 140

Asp Met Trp Thr Ile Cys Asp Thr Arg Asn Cys Tyr Leu Phe Ser Ser
145                 150                 155                 160

Asp Asp Asn Gly His Leu Tyr Arg Ser Gln Thr Ser Leu Ala Asp Phe
                 165                 170                 175

Pro His Gly Met Gly Asn Thr Ala Ile Ala Leu Ala Asp Arg Asn Lys

```
                    180             185             190
Phe Ser Leu Phe Glu Ala Ser Asn Val Tyr His Thr Gly Asp Gly Ser
                195             200             205
Tyr Leu Leu Ile Val Glu Ala Ile Gly Asn Asp Gly Gln Arg Tyr Phe
            210             215             220
Arg Ser Trp Thr Ala Ser Ser Leu Ala Gly Gln Trp Lys Pro Leu Ala
225             230             235             240
Asp Thr Glu Ser Asn Pro Phe Ala Arg Ser Asn Asn Val Ala Phe Ala
                245             250             255
Asn Gly His Ala Trp Thr Lys Ser Ile Ser His Gly Glu Met Ile Arg
            260             265             270
Thr Gln Thr Asp Gln Thr Met Thr Ile Ser Pro Cys Lys Leu Arg Tyr
        275             280             285
Leu Tyr Gln Gly Val Asp Pro Ala Ala Lys Gly Asp Tyr Asn Ala Leu
        290             295             300
Pro Trp Lys Leu Gly Leu Leu Thr Gln Thr Asn Ser Ala Cys
305             310             315
```

<210> SEQ ID NO 13
<211> LENGTH: 326
<212> TYPE: PRT
<213> ORGANISM: Artificial Sequence
<220> FEATURE:
<223> OTHER INFORMATION: Mature sequence with His-tag

<400> SEQUENCE: 13

```
Ala Ser Leu Pro Arg Ser Phe Lys Trp Ser Ser Ala Ala Leu Val
1               5                   10                  15
Gly Pro Lys Asn Asp Gly Arg His Ile Glu Gly Ile Lys Asp Pro Ser
            20              25                  30
Ile Val Glu Val Asp Gly Thr Tyr His Val Phe Ala Ser Thr Ala Gln
        35              40              45
Ala Ser Gly Tyr Asn Leu Val Tyr Leu Ser Phe Thr Asp Phe Asn Lys
    50              55              60
Ala His Leu Ala Pro Phe His Tyr Leu Asp Gln Thr Arg Ile Gly Lys
65              70              75              80
Gly Tyr Arg Ala Ala Pro Gln Val Phe Tyr Phe Lys Pro His Lys Leu
                85              90              95
Trp Tyr Leu Val Tyr Gln Asn Gly Asn Ala Ala Tyr Ser Thr Asn Pro
            100             105             110
Asp Ile Ser Asn Pro Ala Gly Trp Thr Ser Pro Gln Asn Phe Phe Ser
        115             120             125
Gly Thr Pro Ser Ile Ile Thr His Asn Met Gly Arg Gly Ala Trp Val
    130             135             140
Asp Met Trp Thr Ile Cys Asp Thr Arg Asn Cys Tyr Leu Phe Ser Ser
145             150             155             160
Asp Asp Asn Gly His Leu Tyr Arg Ser Gln Thr Ser Leu Ala Asp Phe
                165             170             175
Pro His Gly Met Gly Asn Thr Ala Ile Ala Leu Ala Asp Arg Asn Lys
            180             185             190
Phe Ser Leu Phe Glu Ala Ser Asn Val Tyr His Thr Gly Asp Gly Ser
        195             200             205
Tyr Leu Leu Ile Val Glu Ala Ile Gly Asn Asp Gly Gln Arg Tyr Phe
    210             215             220
Arg Ser Trp Thr Ala Ser Ser Leu Ala Gly Gln Trp Lys Pro Leu Ala
```

```
                225                 230                 235                 240
Asp Thr Glu Ser Asn Pro Phe Ala Arg Ser Asn Asn Val Ala Phe Ala
                    245                 250                 255

Asn Gly His Ala Trp Thr Lys Ser Ile Ser His Gly Glu Met Ile Arg
                260                 265                 270

Thr Gln Thr Asp Gln Thr Met Thr Ile Ser Pro Cys Lys Leu Arg Tyr
            275                 280                 285

Leu Tyr Gln Gly Val Asp Pro Ala Ala Lys Gly Asp Tyr Asn Ala Leu
        290                 295                 300

Pro Trp Lys Leu Gly Leu Leu Thr Gln Thr Asn Ser Ala Cys Arg His
305                 310                 315                 320

His His His His His Pro
                325

<210> SEQ ID NO 14
<211> LENGTH: 302
<212> TYPE: PRT
<213> ORGANISM: Aspergillus wentii

<400> SEQUENCE: 14

Asp Cys Ala Leu Pro Ser Thr Tyr Ser Trp Thr Ser Thr Gly Ser Leu
1               5                   10                  15

Ala Asp Pro Lys Ser Gly Trp Thr Ala Leu Lys Asp Phe Thr Asn Val
                20                  25                  30

Val Ser Asn Asn Lys His Ile Val Tyr Ala Ser Thr Thr Asp Ala Ser
            35                  40                  45

Gly Asn Tyr Gly Ser Met Asn Phe Ala Ser Phe Ser Asp Trp Ser Asp
        50                  55                  60

Met Ala Ser Ala Ser Gln Ala Ala Thr Ser Phe Thr Ala Val Ala Pro
65                  70                  75                  80

Thr Leu Leu Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
                100                 105                 110

Ala Asn Gly Trp Ser Ser Glu Lys Ala Leu Phe Ser Gly Lys Ile Thr
            115                 120                 125

Gly Ser Asp Thr Gly Ala Ile Asp Gln Thr Leu Ile Gly Asp Ala Thr
        130                 135                 140

Asn Met Tyr Leu Phe Phe Ala Gly Asp Asn Gly Lys Ile Tyr Arg Ser
145                 150                 155                 160

Ser Met Pro Ile Ala Asn Phe Pro Gly Asp Phe Gly Thr Ala Ser Glu
                165                 170                 175

Val Val Leu Ser Asp Ser Arg Asn Asn Leu Phe Glu Ala Val Gln Val
                180                 185                 190

Tyr Thr Val Glu Gly Gln Asn Gln Tyr Leu Met Ile Val Glu Ala Ile
            195                 200                 205

Gly Thr Asn Gly Arg Tyr Phe Arg Ser Phe Thr Ala Ser Ser Leu Asp
        210                 215                 220

Gly Ser Trp Thr Glu Gln Ala Ala Ser Glu Asn Asn Pro Phe Ala Gly
225                 230                 235                 240

Lys Ala Asn Ser Gly Ala Thr Trp Thr Asn Asp Ile Ser His Gly Asp
                245                 250                 255

Leu Val Arg Asn Asn Pro Asp Gln Thr Met Thr Ile Asp Pro Cys Asn
                260                 265                 270
```

Leu Gln Phe Leu Tyr Gln Gly Arg Asp Ala Ser Ala Gly Gly Asn Tyr
            275                 280                 285

Asn Thr Leu Pro Trp Arg Pro Gly Val Leu Thr Leu Lys His
        290                 295                 300

<210> SEQ ID NO 15
<211> LENGTH: 311
<212> TYPE: PRT
<213> ORGANISM: Artificial Sequence
<220> FEATURE:
<223> OTHER INFORMATION: Mature sequence with His-tag

<400> SEQUENCE: 15

Asp Cys Ala Leu Pro Ser Thr Tyr Ser Trp Thr Ser Thr Gly Ser Leu
1               5                   10                  15

Ala Asp Pro Lys Ser Gly Trp Thr Ala Leu Lys Asp Phe Thr Asn Val
            20                  25                  30

Val Ser Asn Asn Lys His Ile Val Tyr Ala Ser Thr Thr Asp Ala Ser
        35                  40                  45

Gly Asn Tyr Gly Ser Met Asn Phe Ala Ser Phe Ser Asp Trp Ser Asp
    50                  55                  60

Met Ala Ser Ala Ser Gln Ala Thr Ser Phe Thr Ala Val Ala Pro
65                  70                  75                  80

Thr Leu Leu Tyr Phe Gln Pro Lys Ser Ile Trp Val Leu Ala Tyr Gln
                85                  90                  95

Trp Gly Ser Ser Thr Phe Thr Tyr Arg Thr Ser Ser Asp Pro Thr Asn
            100                 105                 110

Ala Asn Gly Trp Ser Ser Glu Lys Ala Leu Phe Ser Gly Lys Ile Thr
        115                 120                 125

Gly Ser Asp Thr Gly Ala Ile Asp Gln Thr Leu Ile Gly Asp Ala Thr
    130                 135                 140

Asn Met Tyr Leu Phe Phe Ala Gly Asp Asn Gly Lys Ile Tyr Arg Ser
145                 150                 155                 160

Ser Met Pro Ile Ala Asn Phe Pro Gly Asp Phe Gly Thr Ala Ser Glu
                165                 170                 175

Val Val Leu Ser Asp Ser Arg Asn Asn Leu Phe Glu Ala Val Gln Val
            180                 185                 190

Tyr Thr Val Glu Gly Gln Asn Gln Tyr Leu Met Ile Val Glu Ala Ile
        195                 200                 205

Gly Thr Asn Gly Arg Tyr Phe Arg Ser Phe Thr Ala Ser Ser Leu Asp
    210                 215                 220

Gly Ser Trp Thr Glu Gln Ala Ala Ser Glu Asn Asn Pro Phe Ala Gly
225                 230                 235                 240

Lys Ala Asn Ser Gly Ala Thr Trp Thr Asn Asp Ile Ser His Gly Asp
                245                 250                 255

Leu Val Arg Asn Asn Pro Asp Gln Thr Met Thr Ile Asp Pro Cys Asn
            260                 265                 270

Leu Gln Phe Leu Tyr Gln Gly Arg Asp Ala Ser Ala Gly Gly Asn Tyr
        275                 280                 285

Asn Thr Leu Pro Trp Arg Pro Gly Val Leu Thr Leu Lys His Thr Arg
    290                 295                 300

Ala His His His His His His
305                 310

<210> SEQ ID NO 16
<211> LENGTH: 364

<212> TYPE: PRT
<213> ORGANISM: Acrophialophora fusispora

<400> SEQUENCE: 16

Ala Cys Ser Leu Pro Ser Ser Tyr Arg Trp Ala Ser Thr Gly Pro Leu
1               5                   10                  15

Ala Asn Pro Lys Ser Gly Trp Tyr Ser Leu Lys Asp Phe Thr His Val
            20                  25                  30

Pro Tyr Asn Gly Lys His Leu Val Tyr Ala Ser Asn Tyr Ala Gly Ser
        35                  40                  45

Ala Tyr Gly Ser Met Asn Phe Gly Leu Phe Ser Asn Trp Ser Asp Met
    50                  55                  60

Ala Ser Ala Ser Gln Asn Ser Met Asn Ala Ala Val Ala Pro Thr
65                  70                  75                  80

Leu Phe Tyr Phe Ala Pro Lys Asn Ile Trp Val Leu Ala Ser Gln Trp
                85                  90                  95

Gly Ala Thr Pro Phe Phe Tyr Arg Thr Ser Thr Asp Pro Thr Asn Pro
            100                 105                 110

Asn Ser Trp Ser Ser Asn Gln Pro Leu Phe Thr Gly Ser Ile Ser Asp
        115                 120                 125

Ser Ser Thr Gly Pro Ile Asp Gln Thr Leu Ile Gly Asp Ala Asn Tyr
    130                 135                 140

Met Tyr Leu Phe Phe Ala Gly Asp Asn Gly Lys Ile Tyr Arg Ser Arg
145                 150                 155                 160

Met Pro Ile Gly Asn Phe Pro Gly Ser Phe Gly Ser Ser Tyr Glu Val
                165                 170                 175

Ile Leu Ser Gly Ser Arg Asn Asp Phe Phe Glu Ala Val Gln Val Tyr
            180                 185                 190

Thr Val Thr Gly Gln Ser Ser Pro Leu Tyr Leu Met Ile Ile Glu Ser
        195                 200                 205

Ile Gly Ser Arg Gly Arg Tyr Phe Arg Ser Tyr Thr Ala Thr Asn Leu
    210                 215                 220

Gly Gly Ser Trp Ser Pro Gln Ala Thr Ser Glu Ser Ser Pro Phe Ala
225                 230                 235                 240

Gly Ala Ala Asn Ser Gly Ala Thr Trp Thr Asn Asp Ile Ser His Gly
                245                 250                 255

Asp Leu Ile Arg Ser Gly Pro Asp Gln Thr Met Pro Ile Asp Pro Cys
            260                 265                 270

Asn Leu Gln Leu Leu Tyr Gln Gly Leu Val Gly Thr Asn Ser Asp Tyr
        275                 280                 285

Asn Lys Leu Pro Tyr Arg Pro Gly Leu Leu Thr Leu Gln Asn Pro Val
    290                 295                 300

Gly Gly Gly Gly Thr Pro Thr Thr Thr Ser Lys Pro Pro Ala Thr
305                 310                 315                 320

Thr Thr Ser Thr Gly Gly Gly Thr Ala Pro Gln Tyr Ala Gln Cys
                325                 330                 335

Gly Gly Gln Gly Tyr Thr Gly Pro Thr Val Cys Ala Ser Pro Tyr Lys
            340                 345                 350

Cys Thr Tyr Ser Asn Pro Trp Tyr Ser Gln Cys Leu
        355                 360

<210> SEQ ID NO 17
<211> LENGTH: 373
<212> TYPE: PRT
<213> ORGANISM: Artificial Sequence
<220> FEATURE:
<223> OTHER INFORMATION: Mature sequence with His-tag

<400> SEQUENCE: 17

```
Ala Cys Ser Leu Pro Ser Ser Tyr Arg Trp Ala Ser Thr Gly Pro Leu
1               5                   10                  15
Ala Asn Pro Lys Ser Gly Trp Tyr Ser Leu Lys Asp Phe Thr His Val
            20                  25                  30
Pro Tyr Asn Gly Lys His Leu Val Tyr Ala Ser Asn Tyr Ala Gly Ser
        35                  40                  45
Ala Tyr Gly Ser Met Asn Phe Gly Leu Phe Ser Asn Trp Ser Asp Met
    50                  55                  60
Ala Ser Ala Ser Gln Asn Ser Met Asn Ala Ala Val Ala Pro Thr
65                  70                  75                  80
Leu Phe Tyr Phe Ala Pro Lys Asn Ile Trp Val Leu Ala Ser Gln Trp
                85                  90                  95
Gly Ala Thr Pro Phe Phe Tyr Arg Thr Ser Thr Asp Pro Thr Asn Pro
            100                 105                 110
Asn Ser Trp Ser Ser Asn Gln Pro Leu Phe Thr Gly Ser Ile Ser Asp
        115                 120                 125
Ser Ser Thr Gly Pro Ile Asp Gln Thr Leu Ile Gly Asp Ala Asn Tyr
    130                 135                 140
Met Tyr Leu Phe Phe Ala Gly Asp Asn Gly Lys Ile Tyr Arg Ser Arg
145                 150                 155                 160
Met Pro Ile Gly Asn Phe Pro Gly Ser Phe Gly Ser Ser Tyr Glu Val
                165                 170                 175
Ile Leu Ser Gly Ser Arg Asn Asp Phe Phe Glu Ala Val Gln Val Tyr
            180                 185                 190
Thr Val Thr Gly Gln Ser Ser Pro Leu Tyr Leu Met Ile Ile Glu Ser
        195                 200                 205
Ile Gly Ser Arg Gly Arg Tyr Phe Arg Ser Tyr Thr Ala Thr Asn Leu
    210                 215                 220
Gly Gly Ser Trp Ser Pro Gln Ala Thr Ser Glu Ser Ser Pro Phe Ala
225                 230                 235                 240
Gly Ala Ala Asn Ser Gly Ala Thr Trp Thr Asn Asp Ile Ser His Gly
                245                 250                 255
Asp Leu Ile Arg Ser Gly Pro Asp Gln Thr Met Pro Ile Asp Pro Cys
            260                 265                 270
Asn Leu Gln Leu Leu Tyr Gln Gly Leu Val Gly Thr Asn Ser Asp Tyr
        275                 280                 285
Asn Lys Leu Pro Tyr Arg Pro Gly Leu Leu Thr Leu Gln Asn Pro Val
    290                 295                 300
Gly Gly Gly Gly Thr Pro Thr Thr Thr Ser Lys Pro Pro Ala Thr
305                 310                 315                 320
Thr Thr Ser Thr Gly Gly Gly Thr Ala Pro Gln Tyr Ala Gln Cys
                325                 330                 335
Gly Gly Gln Gly Tyr Thr Gly Pro Thr Val Cys Ala Ser Pro Tyr Lys
            340                 345                 350
Cys Thr Tyr Ser Asn Pro Trp Tyr Ser Gln Cys Leu Thr Arg Ala His
        355                 360                 365
His His His His
    370
```

<210> SEQ ID NO 18

```
<211> LENGTH: 436
<212> TYPE: PRT
<213> ORGANISM: Streptosporangium sp-60756 60

<400> SEQUENCE: 18
```

| | | | | | | | | | | | | | | |
|---|---|---|---|---|---|---|---|---|---|---|---|---|---|---|
|Ala|Gly|Ala|Ala|Gly|Cys|Arg|Val|Asp|Tyr|Thr|Val|Ser|Asn|Gln|
|1| | | |5| | | | |10| | | | |15|
|Trp|Pro|Gly|Gly|Phe|Gly|Ala|Asn|Val|Asn|Ile|Thr|Asn|Leu|Gly|Asp|
| | | |20| | | | |25| | | | |30| | |
|Pro|Ile|Asn|Gly|Trp|Arg|Leu|Thr|Trp|Ser|Phe|Pro|Ala|Gly|Gln|Thr|
| | |35| | | | |40| | | | |45| | | |
|Ile|Thr|Gln|Leu|Trp|Ser|Gly|Ser|His|Thr|Gln|Ser|Gly|Ser|Gln|Val|
|50| | | | |55| | | | |60| | | | | |
|Thr|Val|Thr|Asn|Val|Asp|Tyr|Asn|Ala|Gly|Leu|Pro|Thr|Gly|Gly|Ser|
|65| | | | |70| | | | |75| | | | |80|
|Ala|Asn|Phe|Gly|Phe|Asn|Gly|Ser|Phe|Asn|Gly|Ser|Asn|Pro|Ala|Pro|
| | | | |85| | | | |90| | | | |95| |
|Thr|Ser|Phe|Ala|Leu|Asn|Gly|Val|Thr|Cys|Thr|Gly|Gly|Val|Thr|Ala|
| | | |100| | | | |105| | | | |110| | |
|Ser|Pro|Ser|Pro|Ser|Thr|Ser|Pro|Ser|Thr|Gly|Pro|Ser|Pro|Ser|Ser|
| | |115| | | | |120| | | | |125| | | |
|Thr|Pro|Thr|Ser|Pro|Gly|Thr|Cys|Ala|Leu|Pro|Ser|Thr|Tyr|Arg|Trp|
| |130| | | | |135| | | | |140| | | | |
|Thr|Ser|Thr|Gly|Pro|Leu|Ala|Asn|Pro|Lys|Ser|Gly|Trp|Val|Ser|Leu|
|145| | | | |150| | | | |155| | | | |160|
|Lys|Asp|Phe|Thr|Asn|Val|Val|His|Asn|Gly|Lys|His|Leu|Val|Tyr|Ala|
| | | | |165| | | | |170| | | | |175| |
|Thr|Thr|His|Asp|Thr|Gly|Thr|Ser|Trp|Gly|Ser|Met|Asn|Phe|Ser|Pro|
| | | |180| | | | |185| | | | |190| | |
|Phe|Thr|Asn|Trp|Ser|Asp|Met|Ala|Ser|Ala|Gly|Gln|Asn|Lys|Met|Asn|
| | |195| | | | |200| | | | |205| | | |
|Phe|Ser|Thr|Val|Ala|Pro|Thr|Leu|Phe|Tyr|Phe|Ala|Pro|Lys|Asn|Ile|
| |210| | | | |215| | | | |220| | | | |
|Trp|Val|Leu|Ala|Tyr|Gln|Trp|Gly|Gly|Thr|Ala|Phe|Ser|Tyr|Arg|Thr|
|225| | | | |230| | | | |235| | | | |240|
|Ser|Ser|Asp|Pro|Thr|Asn|Ala|Asn|Gly|Trp|Ser|Ala|Gln|Gln|Thr|Leu|
| | | | |245| | | | |250| | | | |255| |
|Phe|Thr|Gly|Ser|Ile|Ser|Gly|Ser|Gly|Thr|Gly|Pro|Ile|Asp|Gln|Thr|
| | | |260| | | | |265| | | | |270| | |
|Leu|Ile|Gly|Asp|Gly|Thr|Asn|Met|Tyr|Leu|Phe|Phe|Ala|Gly|Asp|Asn|
| | |275| | | | |280| | | | |285| | | |
|Gly|Lys|Ile|Tyr|Arg|Ala|Ser|Met|Pro|Ile|Gly|Asn|Phe|Pro|Gly|Ser|
| |290| | | | |295| | | | |300| | | | |
|Phe|Gly|Ser|Asn|Tyr|Thr|Thr|Ile|Met|Ser|Asp|Thr|Thr|Asn|Asn|Leu|
|305| | | | |310| | | | |315| | | | |320|
|Phe|Glu|Gly|Val|Glu|Val|Tyr|Lys|Leu|Gln|Gly|Gln|Asn|Lys|Tyr|Leu|
| | | | |325| | | | |330| | | | |335| |
|Met|Leu|Val|Glu|Ala|Ile|Gly|Ser|Gln|Gly|Arg|Tyr|Phe|Arg|Ser|Phe|
| | | |340| | | | |345| | | | |350| | |
|Thr|Ala|Thr|Ser|Leu|Asp|Gly|Thr|Trp|Thr|Pro|Gln|Ala|Ala|Thr|Glu|
| | |355| | | | |360| | | | |365| | | |
|Gly|Asn|Pro|Phe|Ala|Gly|Lys|Ala|Asn|Ser|Gly|Ala|Thr|Trp|Thr|Asn|
| |370| | | | |375| | | | |380| | | | |
|Asp|Ile|Ser|His|Gly|Asp|Leu|Val|Arg|Ser|Asn|Pro|Asp|Gln|Thr|Lys|

```
                385                 390                 395                 400
Thr Val Asp Pro Cys Asn Leu Gln Leu Leu Tyr Gln Gly Arg Ser Pro
                    405                 410                 415

Asn Ser Gly Gly Asp Tyr Gly Leu Leu Pro Tyr Arg Pro Gly Val Leu
                420                 425                 430

Thr Leu Gln Arg
        435

<210> SEQ ID NO 19
<211> LENGTH: 444
<212> TYPE: PRT
<213> ORGANISM: Artificial Sequence
<220> FEATURE:
<223> OTHER INFORMATION: Mature sequence with His-tag

<400> SEQUENCE: 19

His His His His His His Pro Arg Ala Gly Ala Ala Gly Cys Arg
1               5                   10                  15

Val Asp Tyr Thr Val Ser Asn Gln Trp Pro Gly Gly Phe Gly Ala Asn
                20                  25                  30

Val Asn Ile Thr Asn Leu Gly Asp Pro Ile Asn Gly Trp Arg Leu Thr
            35                  40                  45

Trp Ser Phe Pro Ala Gly Gln Thr Ile Thr Gln Leu Trp Ser Gly Ser
    50                  55                  60

His Thr Gln Ser Gly Ser Gln Val Thr Val Thr Asn Val Asp Tyr Asn
65                  70                  75                  80

Ala Gly Leu Pro Thr Gly Gly Ser Ala Asn Phe Gly Phe Asn Gly Ser
                85                  90                  95

Phe Asn Gly Ser Asn Pro Ala Pro Thr Ser Phe Ala Leu Asn Gly Val
                100                 105                 110

Thr Cys Thr Gly Gly Val Thr Ala Ser Pro Ser Pro Ser Thr Ser Pro
            115                 120                 125

Ser Thr Gly Pro Ser Pro Ser Ser Thr Pro Thr Ser Pro Gly Thr Cys
    130                 135                 140

Ala Leu Pro Ser Thr Tyr Arg Trp Thr Ser Thr Gly Pro Leu Ala Asn
145                 150                 155                 160

Pro Lys Ser Gly Trp Val Ser Leu Lys Asp Phe Thr Asn Val Val His
                165                 170                 175

Asn Gly Lys His Leu Val Tyr Ala Thr Thr His Asp Thr Gly Thr Ser
                180                 185                 190

Trp Gly Ser Met Asn Phe Ser Pro Phe Thr Asn Trp Ser Asp Met Ala
            195                 200                 205

Ser Ala Gly Gln Asn Lys Met Asn Phe Ser Thr Val Ala Pro Thr Leu
    210                 215                 220

Phe Tyr Phe Ala Pro Lys Asn Ile Trp Val Leu Ala Tyr Gln Trp Gly
225                 230                 235                 240

Gly Thr Ala Phe Ser Tyr Arg Thr Ser Ser Asp Pro Thr Asn Ala Asn
                245                 250                 255

Gly Trp Ser Ala Gln Gln Thr Leu Phe Thr Gly Ser Ile Ser Gly Ser
                260                 265                 270

Gly Thr Gly Pro Ile Asp Gln Thr Leu Ile Gly Asp Gly Thr Asn Met
            275                 280                 285

Tyr Leu Phe Phe Ala Gly Asp Asn Gly Lys Ile Tyr Arg Ala Ser Met
    290                 295                 300

Pro Ile Gly Asn Phe Pro Gly Ser Phe Gly Ser Asn Tyr Thr Thr Ile
```

```
                    305                 310                 315                 320
Met Ser Asp Thr Thr Asn Asn Leu Phe Glu Gly Val Glu Val Tyr Lys
                    325                 330                 335

Leu Gln Gly Gln Asn Lys Tyr Leu Met Leu Val Glu Ala Ile Gly Ser
                    340                 345                 350

Gln Gly Arg Tyr Phe Arg Ser Phe Thr Ala Thr Ser Leu Asp Gly Thr
                    355                 360                 365

Trp Thr Pro Gln Ala Ala Thr Glu Gly Asn Pro Phe Ala Gly Lys Ala
            370                 375                 380

Asn Ser Gly Ala Thr Trp Thr Asn Asp Ile Ser His Gly Asp Leu Val
385                 390                 395                 400

Arg Ser Asn Pro Asp Gln Thr Lys Thr Val Asp Pro Cys Asn Leu Gln
                    405                 410                 415

Leu Leu Tyr Gln Gly Arg Ser Pro Asn Ser Gly Gly Asp Tyr Gly Leu
                420                 425                 430

Leu Pro Tyr Arg Pro Gly Val Leu Thr Leu Gln Arg
            435                 440
```

<210> SEQ ID NO 20
<211> LENGTH: 302
<212> TYPE: PRT
<213> ORGANISM: Acrophialophora fusispora

<400> SEQUENCE: 20

```
Gln Cys Pro Leu Pro Ser Thr Tyr Arg Trp Lys Ser Thr Gly Val Leu
1               5                   10                  15

Ala Asn Pro Lys Ser Gly Trp Val Ser Leu Lys Asp Phe Thr Val Ala
                20                  25                  30

Pro Tyr Asn Gly Lys His Leu Val Tyr Ala Thr Thr His Asp Thr Gly
            35                  40                  45

Ser Ser Trp Gly Ser Met Asn Phe Gly Leu Phe Ser Ser Trp Ser Asp
        50                  55                  60

Met Ala Thr Ala Pro Gln Asn Gly Met Asn Gln Gly Thr Val Ala Pro
65                  70                  75                  80

Thr Leu Phe Tyr Phe Lys Pro Lys Asp Ile Trp Val Leu Ala Tyr Gln
                85                  90                  95

Trp Gly Pro Thr Thr Phe Ser Tyr Lys Thr Ser Lys Asp Pro Thr Asn
                100                 105                 110

Ala Asn Gly Trp Gly Ser Ala Gln Thr Leu Phe Ser Gly Lys Ile Ser
            115                 120                 125

Gly Ser Ser Thr Gly Ala Ile Asp Gln Thr Val Ile Gly Asp Asp Thr
        130                 135                 140

Asn Met Tyr Leu Phe Phe Ala Gly Asp Asn Gly Lys Ile Tyr Arg Ala
145                 150                 155                 160

Ser Met Pro Ile Asp Arg Phe Pro Gly Ser Phe Gly Asp Gln Tyr Gln
                165                 170                 175

Thr Ile Leu Ser Asp Ser Thr Asn Asn Leu Phe Glu Ala Val Gln Val
                180                 185                 190

Tyr Lys Leu Gln Gly Leu Asn Lys Tyr Leu Met Ile Val Glu Ala Ile
            195                 200                 205

Gly Ser Asn Gly Arg Tyr Phe Arg Ser Phe Thr Ala Asp Arg Leu Asp
        210                 215                 220

Gly Gln Trp Thr Pro Gln Ala Ala Thr Glu Ser Asn Pro Phe Ala Gly
225                 230                 235                 240
```

```
Lys Ala Asn Ser Gly Ala Thr Trp Thr Asn Asp Ile Ser His Gly Glu
                245                 250                 255
Leu Ile Arg Val Ser Ala Asp Gln Thr Phe Thr Val Asp Pro Cys Asn
            260                 265                 270
Leu Gln Leu Leu Tyr Gln Gly Arg Ser Pro Ser Ser Gly Gly Asp Tyr
            275                 280                 285
Gly Lys Leu Pro Tyr Arg Pro Gly Leu Leu Thr Leu Gln Arg
        290                 295                 300
```

<210> SEQ ID NO 21
<211> LENGTH: 311
<212> TYPE: PRT
<213> ORGANISM: Artificial Sequence
<220> FEATURE:
<223> OTHER INFORMATION: Mature sequence with His-tag

<400> SEQUENCE: 21

```
Gln Cys Pro Leu Pro Ser Thr Tyr Arg Trp Lys Ser Thr Gly Val Leu
1               5                   10                  15
Ala Asn Pro Lys Ser Gly Trp Val Ser Leu Lys Asp Phe Thr Val Ala
            20                  25                  30
Pro Tyr Asn Gly Lys His Leu Val Tyr Ala Thr Thr His Asp Thr Gly
        35                  40                  45
Ser Ser Trp Gly Ser Met Asn Phe Gly Leu Phe Ser Ser Trp Ser Asp
    50                  55                  60
Met Ala Thr Ala Pro Gln Asn Gly Met Asn Gln Gly Thr Val Ala Pro
65                  70                  75                  80
Thr Leu Phe Tyr Phe Lys Pro Lys Asp Ile Trp Val Leu Ala Tyr Gln
                85                  90                  95
Trp Gly Pro Thr Thr Phe Ser Tyr Lys Thr Ser Lys Asp Pro Thr Asn
            100                 105                 110
Ala Asn Gly Trp Gly Ser Ala Gln Thr Leu Phe Ser Gly Lys Ile Ser
        115                 120                 125
Gly Ser Ser Thr Gly Ala Ile Asp Gln Thr Val Ile Gly Asp Asp Thr
    130                 135                 140
Asn Met Tyr Leu Phe Phe Ala Gly Asp Asn Gly Lys Ile Tyr Arg Ala
145                 150                 155                 160
Ser Met Pro Ile Asp Arg Phe Pro Gly Ser Phe Gly Asp Gln Tyr Gln
                165                 170                 175
Thr Ile Leu Ser Asp Ser Thr Asn Asn Leu Phe Glu Ala Val Gln Val
            180                 185                 190
Tyr Lys Leu Gln Gly Leu Asn Lys Tyr Leu Met Ile Val Glu Ala Ile
        195                 200                 205
Gly Ser Asn Gly Arg Tyr Phe Arg Ser Phe Thr Ala Asp Arg Leu Asp
    210                 215                 220
Gly Gln Trp Thr Pro Gln Ala Ala Thr Glu Ser Asn Pro Phe Ala Gly
225                 230                 235                 240
Lys Ala Asn Ser Gly Ala Thr Trp Thr Asn Asp Ile Ser His Gly Glu
                245                 250                 255
Leu Ile Arg Val Ser Ala Asp Gln Thr Phe Thr Val Asp Pro Cys Asn
            260                 265                 270
Leu Gln Leu Leu Tyr Gln Gly Arg Ser Pro Ser Ser Gly Gly Asp Tyr
            275                 280                 285
Gly Lys Leu Pro Tyr Arg Pro Gly Leu Leu Thr Leu Gln Arg Thr Arg
        290                 295                 300
```

```
Ala His His His His His
305             310

<210> SEQ ID NO 22
<211> LENGTH: 405
<212> TYPE: PRT
<213> ORGANISM: Talaromyces leycettanus

<400> SEQUENCE: 22

Met Val His Leu Ser Ser Leu Ala Leu Ala Leu Ala Ala Gly Ser Gln
1               5                   10                  15

Leu Ala Gln Ala Ala Gly Leu Asn Thr Ala Ala Lys Ala Ile Gly Lys
                20                  25                  30

Leu Tyr Phe Gly Thr Ala Thr Asp Asn Pro Glu Leu Ser Asp Ser Thr
            35                  40                  45

Tyr Met Gln Glu Thr Asp Asn Thr Asp Asp Phe Gly Gln Leu Thr Pro
    50                  55                  60

Ala Asn Ser Met Lys Trp Asp Ala Thr Glu Pro Ser Gln Asn Thr Phe
65                  70                  75                  80

Thr Phe Thr Asn Gly Asp Gln Ile Ala Asn Leu Ala Lys Ser Asn Gly
                85                  90                  95

Gln Met Leu Arg Cys His Asn Leu Val Trp Tyr Asn Gln Leu Pro Ser
            100                 105                 110

Trp Val Thr Ser Gly Ser Trp Thr Asn Ala Thr Leu Leu Ala Ala Met
        115                 120                 125

Lys Asn His Ile Thr Asn Val Val Thr His Tyr Lys Gly Gln Cys Tyr
130                 135                 140

Ala Trp Asp Val Val Asn Glu Ala Leu Asn Asp Asp Gly Thr Tyr Arg
145                 150                 155                 160

Ser Asn Val Phe Tyr Gln Tyr Ile Gly Glu Ala Tyr Ile Pro Ile Ala
                165                 170                 175

Phe Ala Thr Ala Ala Ala Asp Pro Asn Ala Lys Leu Tyr Tyr Asn
            180                 185                 190

Asp Tyr Asn Ile Glu Tyr Pro Gly Ala Lys Thr Ala Ala Gln Asn
        195                 200                 205

Ile Val Lys Met Val Lys Ala Tyr Gly Ala Lys Ile Asp Gly Val Gly
210                 215                 220

Leu Gln Ser His Phe Ile Val Gly Ser Thr Pro Ser Gln Ser Ser Gln
225                 230                 235                 240

Gln Ser Asn Met Ala Ala Phe Thr Ala Leu Gly Val Glu Val Ala Ile
                245                 250                 255

Thr Glu Leu Asp Ile Arg Met Thr Leu Pro Ser Thr Ser Ala Leu Leu
            260                 265                 270

Ala Gln Gln Ser Thr Asp Tyr Gln Ser Thr Val Ser Ala Cys Val Asn
        275                 280                 285

Thr Pro Lys Cys Ile Gly Ile Thr Leu Trp Asp Trp Thr Asp Lys Tyr
    290                 295                 300

Ser Trp Val Pro Asn Thr Phe Ser Gly Gln Gly Asp Ala Cys Pro Trp
305                 310                 315                 320

Asp Ser Asn Tyr Gln Lys Lys Pro Ala Tyr Tyr Gly Ile Leu Thr Ala
                325                 330                 335

Leu Gly Gly Ser Ala Ser Thr Ser Thr Thr Thr Leu Val Thr Ser
            340                 345                 350

Thr Arg Thr Ser Thr Thr Thr Ser Thr Ser Ala Thr Ser Thr Ser Thr
        355                 360                 365
```

Gly Val Ala Gln His Trp Gly Gln Cys Gly Gly Ile Gly Trp Thr Gly
            370                 375                 380

Pro Thr Thr Cys Ala Ser Pro Tyr Thr Cys Gln Glu Leu Asn Pro Tyr
385                 390                 395                 400

Tyr Tyr Gln Cys Leu
            405

<210> SEQ ID NO 23
<211> LENGTH: 398
<212> TYPE: PRT
<213> ORGANISM: Trichophaea saccata

<400> SEQUENCE: 23

Met Arg Thr Phe Ser Ser Leu Leu Gly Val Ala Leu Leu Gly Ala
1               5                   10                  15

Ala Asn Ala Gln Val Ala Val Trp Gly Gln Cys Gly Gly Ile Gly Tyr
            20                  25                  30

Ser Gly Ser Thr Thr Cys Ala Ala Gly Thr Thr Cys Val Lys Leu Asn
            35                  40                  45

Asp Tyr Tyr Ser Gln Cys Gln Pro Gly Gly Thr Thr Leu Thr Thr Thr
50                  55                  60

Thr Lys Pro Ala Thr Thr Thr Thr Thr Thr Ala Thr Ser Pro Ser
65                  70                  75                  80

Ser Ser Pro Gly Leu Asn Ala Leu Ala Gln Lys Ser Gly Arg Tyr Phe
                85                  90                  95

Gly Ser Ala Thr Asp Asn Pro Glu Leu Ser Asp Ala Ala Tyr Ile Ala
            100                 105                 110

Ile Leu Ser Asn Lys Asn Glu Phe Gly Ile Ile Thr Pro Gly Asn Ser
            115                 120                 125

Met Lys Trp Asp Ala Thr Glu Pro Ser Arg Gly Ser Phe Ser Phe Thr
130                 135                 140

Gly Gly Gln Gln Ile Val Asp Phe Ala Gln Gly Asn Gly Gln Ala Ile
145                 150                 155                 160

Arg Gly His Thr Leu Val Trp Tyr Ser Gln Leu Pro Ser Trp Val Thr
            165                 170                 175

Ser Gly Asn Phe Asp Lys Ala Thr Leu Thr Ser Ile Met Gln Asn His
            180                 185                 190

Ile Thr Thr Leu Val Ser His Trp Lys Gly Gln Leu Ala Tyr Trp Asp
            195                 200                 205

Val Val Asn Glu Ala Phe Asn Asp Asp Gly Thr Phe Arg Gln Asn Val
210                 215                 220

Phe Tyr Thr Thr Ile Gly Glu Asp Tyr Ile Gln Leu Ala Phe Glu Ala
225                 230                 235                 240

Ala Arg Ala Ala Asp Pro Thr Ala Lys Leu Cys Ile Asn Asp Tyr Asn
            245                 250                 255

Ile Glu Gly Thr Gly Ala Lys Ser Thr Ala Met Tyr Asn Leu Val Ser
            260                 265                 270

Lys Leu Lys Ser Ala Gly Val Pro Ile Asp Cys Ile Gly Val Gln Gly
            275                 280                 285

His Leu Ile Val Gly Glu Val Pro Thr Thr Ile Gln Ala Asn Leu Ala
            290                 295                 300

Gln Phe Ala Ser Leu Gly Val Asp Val Ala Ile Thr Glu Leu Asp Ile
305                 310                 315                 320

Arg Met Thr Leu Pro Ser Thr Thr Ala Leu Leu Gln Gln Gln Ala Lys

```
            325                 330                 335
Asp Tyr Val Ser Val Thr Ala Cys Met Asn Val Pro Arg Cys Ile
            340                 345                 350
Gly Ile Thr Ile Trp Asp Tyr Thr Asp Lys Tyr Ser Trp Val Pro Gln
            355                 360                 365
Thr Phe Ser Gly Gln Gly Asp Ala Cys Pro Trp Asp Ala Asn Leu Gln
            370                 375                 380
Lys Lys Pro Ala Tyr Ser Ala Ile Ala Ser Ala Leu Ala Ala
385                 390                 395

<210> SEQ ID NO 24
<211> LENGTH: 384
<212> TYPE: PRT
<213> ORGANISM: Aspergillus aculeatus

<400> SEQUENCE: 24

Val Gly Leu Asp Gln Ala Ala Val Ala Lys Gly Leu Gln Tyr Phe Gly
1               5                   10                  15
Thr Ala Thr Asp Asn Pro Glu Leu Thr Asp Ile Pro Tyr Val Thr Gln
            20                  25                  30
Leu Asn Asn Thr Ala Asp Phe Gly Gln Ile Thr Pro Gly Asn Ser Met
            35                  40                  45
Lys Trp Asp Ala Thr Glu Pro Ser Gln Gly Thr Phe Thr Phe Thr Lys
    50                  55                  60
Gly Asp Val Ile Ala Asp Leu Ala Glu Gly Asn Gly Gln Tyr Leu Arg
65                  70                  75                  80
Cys His Thr Leu Val Trp Tyr Asn Gln Leu Pro Ser Trp Val Thr Ser
                85                  90                  95
Gly Thr Trp Thr Asn Ala Thr Leu Thr Ala Ala Leu Lys Asn His Ile
            100                 105                 110
Thr Asn Val Val Ser His Tyr Lys Gly Lys Cys Leu His Trp Asp Val
            115                 120                 125
Val Asn Glu Ala Leu Asn Asp Asp Gly Thr Tyr Arg Thr Asn Ile Phe
130                 135                 140
Tyr Thr Thr Ile Gly Glu Ala Tyr Ile Pro Ile Ala Phe Ala Ala Ala
145                 150                 155                 160
Ala Ala Ala Asp Pro Asp Ala Lys Leu Phe Tyr Asn Asp Tyr Asn Leu
                165                 170                 175
Glu Tyr Gly Gly Ala Lys Ala Ala Ser Ala Arg Ala Ile Val Gln Leu
            180                 185                 190
Val Lys Asn Ala Gly Ala Lys Ile Asp Gly Val Gly Leu Gln Ala His
            195                 200                 205
Phe Ser Val Gly Thr Val Pro Ser Thr Ser Ser Leu Val Ser Val Leu
    210                 215                 220
Gln Ser Phe Thr Ala Leu Gly Val Glu Val Ala Tyr Thr Glu Ala Asp
225                 230                 235                 240
Val Arg Ile Leu Leu Pro Thr Thr Ala Thr Leu Ala Gln Gln Ser
                245                 250                 255
Ser Asp Phe Gln Ala Leu Val Gln Ser Cys Val Gln Thr Thr Gly Cys
            260                 265                 270
Val Gly Phe Thr Ile Trp Asp Trp Thr Asp Lys Tyr Ser Trp Val Pro
            275                 280                 285
Ser Thr Phe Ser Gly Tyr Gly Ala Ala Leu Pro Trp Asp Glu Asn Leu
    290                 295                 300
```

Val Lys Lys Pro Ala Tyr Asn Gly Leu Leu Ala Met Gly Val Thr
305                 310                 315                 320

Val Thr Thr Thr Thr Thr Thr Thr Ala Thr Ala Thr Gly Lys Thr
            325                 330                 335

Thr Thr Thr Thr Thr Gly Ala Thr Ser Thr Gly Thr Thr Ala Ala His
            340                 345                 350

Trp Gly Gln Cys Gly Gly Leu Asn Trp Ser Gly Pro Thr Ala Cys Ala
        355                 360                 365

Thr Gly Tyr Thr Cys Thr Tyr Val Asn Asp Tyr Tyr Ser Gln Cys Leu
        370                 375                 380

<210> SEQ ID NO 25
<211> LENGTH: 288
<212> TYPE: PRT
<213> ORGANISM: Clostridium acetobutylicum

<400> SEQUENCE: 25

Ala Met Ser His Ser Lys Phe Val Gly Asn Ile Ile Ala Gly Ser Ile
1               5                   10                  15

Pro Ser Asn Phe Asp Thr Tyr Trp Asn Gln Val Thr Pro Glu Asn Ala
            20                  25                  30

Thr Lys Trp Gly Ala Ile Glu Tyr Gly Arg Gly Asn Tyr Asn Trp Gly
        35                  40                  45

Ser Ala Asp Leu Ile Tyr Asn Tyr Ala Arg Ser Lys Asn Met Pro Phe
    50                  55                  60

Lys Phe His Asn Leu Val Trp Gly Ser Gln Gln Leu Thr Trp Leu Ser
65                  70                  75                  80

Asn Leu Ser Pro Gln Asp Gln Lys Ser Glu Val Ser Lys Trp Ile Ala
                85                  90                  95

Ala Ala Gly Gln Arg Tyr Ser Gly Ser Ala Phe Val Asp Val Val Asn
            100                 105                 110

Glu Pro Leu His Thr Gln Pro Ser Tyr Lys Asn Ala Leu Gly Gly Asp
        115                 120                 125

Gly Ser Thr Gly Tyr Asp Trp Ile Val Trp Ser Tyr Gln Gln Ala Arg
    130                 135                 140

Lys Ala Phe Pro Asn Ser Lys Leu Leu Ile Asn Glu Tyr Gly Ile Ile
145                 150                 155                 160

Gly Asp Pro Asn Ala Ala Asn Tyr Val Lys Ile Ile Asn Val Leu
                165                 170                 175

Lys Ser Lys Gly Leu Ile Asp Gly Ile Gly Ile Gln Cys His Tyr Phe
            180                 185                 190

Asn Met Asp Asn Val Ser Val Gly Thr Met Asn Tyr Val Leu Asn Met
        195                 200                 205

Leu Ser Asn Thr Gly Leu Pro Ile Tyr Val Ser Glu Leu Asp Met Thr
    210                 215                 220

Gly Asp Asp Ser Thr Gln Leu Ala Arg Tyr Gln Gln Lys Phe Pro Val
225                 230                 235                 240

Leu Tyr Gln Asn Pro Asn Val Lys Gly Ile Thr Leu Trp Gly Tyr Met
                245                 250                 255

Gln Gly Gln Thr Trp Asn Ser Gly Thr Tyr Leu Val Asn Ser Asn Gly
            260                 265                 270

Thr Glu Arg Pro Ala Leu Lys Trp Leu Arg Ser Tyr Leu Ala Ser His
        275                 280                 285

<210> SEQ ID NO 26

```
<211> LENGTH: 308
<212> TYPE: PRT
<213> ORGANISM: Aspergillus aculeatus

<400> SEQUENCE: 26

Asn Pro Ile Glu Pro Arg Gln Ala Ser Val Ser Ile Asp Ala Lys Phe
1               5                   10                  15

Lys Ala His Gly Lys Lys Tyr Leu Gly Thr Ile Gly Asp Gln Tyr Thr
            20                  25                  30

Leu Asn Lys Asn Ala Lys Thr Pro Ala Ile Ile Lys Ala Asp Phe Gly
        35                  40                  45

Gln Leu Thr Pro Glu Asn Ser Met Lys Trp Asp Ala Thr Glu Pro Asn
    50                  55                  60

Arg Gly Gln Phe Ser Phe Ser Gly Ser Asp Tyr Leu Val Asn Phe Ala
65                  70                  75                  80

Gln Ser Asn Gly Lys Leu Ile Arg Gly His Thr Leu Val Trp His Ser
                85                  90                  95

Gln Leu Pro Ser Trp Val Gln Ser Ile Ser Asp Lys Asn Thr Leu Ile
            100                 105                 110

Gln Val Met Gln Asn His Ile Thr Thr Val Met Gln Arg Tyr Lys Gly
        115                 120                 125

Lys Val Tyr Ala Trp Asp Val Val Asn Glu Ile Phe Asn Glu Asp Gly
    130                 135                 140

Ser Leu Cys Gln Ser His Phe Tyr Asn Val Ile Gly Glu Asp Tyr Val
145                 150                 155                 160

Arg Ile Ala Phe Glu Thr Ala Arg Ala Val Asp Pro Asn Ala Lys Leu
                165                 170                 175

Tyr Ile Asn Asp Tyr Asn Leu Asp Ser Ala Ser Tyr Pro Lys Leu Thr
            180                 185                 190

Gly Leu Val Asn His Val Lys Lys Trp Val Ala Ala Gly Val Pro Ile
        195                 200                 205

Asp Gly Ile Gly Ser Gln Thr His Leu Ser Ala Gly Ala Gly Ala Ala
    210                 215                 220

Val Ser Gly Ala Leu Asn Ala Leu Ala Gly Ala Gly Thr Lys Glu Val
225                 230                 235                 240

Ala Ile Thr Glu Leu Asp Ile Ala Gly Ala Ser Ser Thr Asp Tyr Val
                245                 250                 255

Asn Val Val Lys Ala Cys Leu Asn Gln Pro Lys Cys Val Gly Ile Thr
            260                 265                 270

Val Trp Gly Ser Ser Asp Pro Asp Ser Trp Arg Ser Ser Ser Ser Pro
        275                 280                 285

Leu Leu Phe Asp Ser Asn Tyr Asn Pro Lys Ala Ala Tyr Thr Ala Ile
    290                 295                 300

Ala Asn Ala Leu
305

<210> SEQ ID NO 27
<211> LENGTH: 195
<212> TYPE: PRT
<213> ORGANISM: Thermomyces lanuginosus

<400> SEQUENCE: 27

Arg Gln Thr Thr Pro Asn Ser Glu Gly Trp His Asp Gly Tyr Tyr Tyr
1               5                   10                  15

Ser Trp Trp Ser Asp Gly Gly Ala Gln Ala Thr Tyr Thr Asn Leu Glu
            20                  25                  30
```

```
Gly Gly Thr Tyr Glu Ile Ser Trp Gly Asp Gly Asn Leu Val Gly
            35                  40                  45

Gly Lys Gly Trp Asn Pro Gly Leu Asn Ala Arg Ala Ile His Phe Glu
 50                  55                  60

Gly Val Tyr Gln Pro Asn Gly Asn Ser Tyr Leu Ala Val Tyr Gly Trp
 65                  70                  75                  80

Thr Arg Asn Pro Leu Val Glu Tyr Tyr Ile Val Glu Asn Phe Gly Thr
                85                  90                  95

Tyr Asp Pro Ser Ser Gly Ala Thr Asp Leu Gly Thr Val Glu Cys Asp
               100                 105                 110

Gly Ser Ile Tyr Arg Leu Gly Lys Thr Arg Val Asn Ala Pro Ser
           115                 120                 125

Ile Asp Gly Thr Gln Thr Phe Asp Gln Tyr Trp Ser Val Arg Gln Asp
       130                 135                 140

Lys Arg Thr Ser Gly Thr Val Gln Thr Gly Cys His Phe Asp Ala Trp
145                 150                 155                 160

Ala Arg Ala Gly Leu Asn Val Asn Gly Asp His Tyr Tyr Gln Ile Val
                165                 170                 175

Ala Thr Glu Gly Tyr Phe Ser Ser Gly Tyr Ala Arg Ile Thr Val Ala
            180                 185                 190

Asp Val Gly
        195

<210> SEQ ID NO 28
<211> LENGTH: 203
<212> TYPE: PRT
<213> ORGANISM: Dictyoglomus thermophilum

<400> SEQUENCE: 28

Gln Thr Ser Ile Thr Leu Thr Ser Asn Ala Ser Gly Thr Phe Asp Gly
 1               5                  10                  15

Tyr Tyr Tyr Glu Leu Trp Lys Asp Thr Gly Asn Thr Thr Met Thr Val
                20                  25                  30

Tyr Thr Gln Gly Arg Phe Ser Cys Gln Trp Ser Asn Ile Asn Asn Ala
            35                  40                  45

Leu Phe Arg Thr Gly Lys Lys Tyr Asn Gln Asn Trp Gln Ser Leu Gly
 50                  55                  60

Thr Ile Arg Ile Thr Tyr Ser Ala Thr Tyr Asn Pro Asn Gly Asn Ser
 65                  70                  75                  80

Tyr Leu Cys Ile Tyr Gly Trp Ser Thr Asn Pro Leu Val Glu Phe Tyr
                85                  90                  95

Ile Val Glu Ser Trp Gly Asn Trp Arg Pro Pro Gly Ala Thr Ser Leu
               100                 105                 110

Gly Gln Val Thr Ile Asp Gly Gly Thr Tyr Asp Ile Tyr Arg Thr Thr
           115                 120                 125

Arg Val Asn Gln Pro Ser Ile Val Gly Thr Ala Thr Phe Asp Gln Tyr
       130                 135                 140

Trp Ser Val Arg Thr Ser Lys Arg Thr Ser Gly Thr Val Thr Val Thr
145                 150                 155                 160

Asp His Phe Arg Ala Trp Ala Asn Arg Gly Leu Asn Leu Gly Thr Ile
                165                 170                 175

Asp Gln Ile Thr Leu Cys Val Glu Gly Tyr Gln Ser Ser Gly Ser Ala
            180                 185                 190

Asn Ile Thr Gln Asn Thr Phe Ser Gln Gly Ser
```

195                 200

<210> SEQ ID NO 29
<211> LENGTH: 182
<212> TYPE: PRT
<213> ORGANISM: Paenibacillus Pabuli

<400> SEQUENCE: 29

Thr Asp Tyr Trp Gln Asn Trp Thr Asp Gly Gly Gly Thr Val Asn Ala
1               5                   10                  15

Val Asn Gly Ser Gly Gly Asn Tyr Ser Val Asn Trp Gln Asn Thr Gly
            20                  25                  30

Asn Phe Val Val Gly Lys Gly Trp Thr Tyr Gly Thr Pro Asn Arg Val
        35                  40                  45

Val Asn Tyr Asn Ala Gly Val Phe Ser Pro Ser Gly Asn Gly Tyr Leu
    50                  55                  60

Thr Phe Tyr Gly Trp Thr Arg Asn Ala Leu Ile Glu Tyr Tyr Val Val
65                  70                  75                  80

Asp Asn Trp Gly Thr Tyr Arg Pro Thr Gly Thr Tyr Lys Gly Thr Val
                85                  90                  95

Thr Ser Asp Gly Gly Thr Tyr Asp Ile Tyr Thr Thr Met Arg Tyr Asn
            100                 105                 110

Gln Pro Ser Ile Asp Gly Tyr Ser Thr Phe Pro Gln Tyr Trp Ser Val
        115                 120                 125

Arg Gln Ser Lys Arg Pro Ile Gly Val Asn Ser Gln Ile Thr Phe Gln
    130                 135                 140

Asn His Val Asn Ala Trp Ala Ser Lys Gly Met Tyr Leu Gly Asn Ser
145                 150                 155                 160

Trp Ser Tyr Gln Val Met Ala Thr Glu Gly Tyr Gln Ser Ser Gly Ser
                165                 170                 175

Ser Asn Val Thr Val Trp
            180

<210> SEQ ID NO 30
<211> LENGTH: 183
<212> TYPE: PRT
<213> ORGANISM: Geobacillus stearothermophilus

<400> SEQUENCE: 30

Ala Thr Asp Tyr Trp Gln Tyr Trp Thr Asp Gly Gly Gly Met Val Asn
1               5                   10                  15

Ala Val Asn Gly Pro Gly Gly Asn Tyr Ser Val Thr Trp Gln Asn Thr
            20                  25                  30

Gly Asn Phe Val Val Gly Lys Gly Trp Thr Val Gly Ser Pro Asn Arg
        35                  40                  45

Val Ile Asn Tyr Asn Ala Gly Ile Trp Glu Pro Ser Gly Asn Gly Tyr
    50                  55                  60

Leu Thr Leu Tyr Gly Trp Thr Arg Asn Ala Leu Ile Glu Tyr Tyr Val
65                  70                  75                  80

Val Asp Ser Trp Gly Thr Tyr Arg Pro Thr Gly Asn Tyr Lys Gly Thr
                85                  90                  95

Val Asn Ser Asp Gly Gly Thr Tyr Asp Ile Tyr Thr Thr Met Arg Tyr
            100                 105                 110

Asn Ala Pro Ser Ile Asp Gly Thr Gln Thr Phe Gln Gln Phe Trp Ser
        115                 120                 125

Val Arg Gln Ser Lys Arg Pro Thr Gly Ser Asn Val Ser Ile Thr Phe

```
                130                 135                 140
Ser Asn His Val Asn Ala Trp Arg Ser Lys Gly Met Asn Leu Gly Ser
145                 150                 155                 160

Ser Trp Ala Tyr Gln Val Leu Ala Thr Glu Gly Tyr Gln Ser Ser Gly
                165                 170                 175

Arg Ser Asn Val Thr Val Trp
            180

<210> SEQ ID NO 31
<211> LENGTH: 183
<212> TYPE: PRT
<213> ORGANISM: Geobacillus stearothermophilus

<400> SEQUENCE: 31

Ala Thr Asp Tyr Trp Gln Tyr Trp Thr Asp Gly Gly Gly Met Val Asn
1               5                   10                  15

Ala Val Asn Gly Pro Gly Gly Asn Tyr Ser Val Thr Trp Gln Asn Thr
            20                  25                  30

Gly Asn Phe Val Val Gly Lys Gly Trp Thr Val Gly Ser Pro Asn Arg
        35                  40                  45

Val Ile Asn Tyr Asn Ala Gly Ile Trp Glu Pro Ser Gly Asn Gly Tyr
50                  55                  60

Leu Thr Leu Tyr Gly Trp Thr Arg Asn Ala Leu Ile Glu Tyr Tyr Val
65                  70                  75                  80

Val Asp Ser Trp Gly Thr Tyr Arg Pro Thr Gly Asn Tyr Lys Gly Thr
                85                  90                  95

Val Asn Ser Asp Gly Gly Thr Tyr Asp Ile Tyr Thr Thr Met Arg Tyr
            100                 105                 110

Asn Ala Pro Ser Ile Asp Gly Thr Gln Thr Phe Gln Gln Phe Trp Ser
        115                 120                 125

Val Arg Gln Ser Lys Arg Pro Thr Gly Ser Asn Val Ser Ile Thr Phe
130                 135                 140

Ser Asn His Val Asn Ala Trp Arg Ser Lys Gly Met Asn Leu Gly Ser
145                 150                 155                 160

Ser Trp Ala Tyr Gln Val Leu Ala Thr Glu Gly Tyr Gln Ser Ser Gly
                165                 170                 175

Arg Ser Asn Val Thr Val Trp
            180

<210> SEQ ID NO 32
<211> LENGTH: 299
<212> TYPE: PRT
<213> ORGANISM: Streptomyces beijiangensis

<400> SEQUENCE: 32

Asp Thr Val Val Asn Ser Asn Gln Thr Gly Thr Asn Asn Gly Tyr Tyr
1               5                   10                  15

Tyr Ser His Trp Ser Asp Gly Gly Ser Val Ser Met Thr Leu Gly
            20                  25                  30

Ser Gly Gly Asn Tyr Gly Tyr Gln Trp Ser Asn Val Gly Asn Phe Val
        35                  40                  45

Gly Gly Lys Gly Trp Ser Thr Gly Arg Lys Ser Val Asn Tyr Ser
            50                  55                  60

Gly Ser Phe Asn Pro Ser Gly Asn Ala Tyr Leu Ala Leu Tyr Gly Trp
65                  70                  75                  80

Thr Thr Asn Pro Leu Val Glu Tyr Tyr Val Val Glu Asn Phe Gly Thr
```

```
                    85                  90                  95
Tyr Arg Pro Thr Gly Thr Phe Lys Gly Thr Val Thr Ser Asp Gly Gly
                100                 105                 110

Thr Tyr Asp Ile Tyr Glu Thr Thr Arg Val Asn Gln Pro Ser Ile Glu
            115                 120                 125

Gly Thr Lys Thr Phe Lys Gln Tyr Trp Ser Val Arg Gln Ser Lys Arg
        130                 135                 140

Thr Gly Gly Thr Ile Thr Thr Gly Asn His Phe Asp Ala Trp Ser Ser
145                 150                 155                 160

His Gly Met Ser Met Gly Ser Phe Asn Tyr Met Ile Met Ala Thr Glu
                165                 170                 175

Gly Tyr Gln Ser Ser Gly Ser Ser Asn Ile Thr Val Ser Glu Gly Ser
            180                 185                 190

Ser Gly Gly Gly Thr Gly Gly Gly Thr Gly Gly Thr Gly Gly
        195                 200                 205

Gly Gly Ser Gly Gly Cys Thr Ala Thr Leu Ser Ala Gly Asp Lys Trp
    210                 215                 220

Ser Asp Arg Tyr Asn Leu Asn Val Ser Val Ser Gly Ala Gly Asn Trp
225                 230                 235                 240

Thr Val Thr Met Lys Val Pro Ser Pro Glu Lys Val Leu Ser Thr Trp
                245                 250                 255

Asn Val Ser Ala Ala Tyr Pro Asp Ser Gln Thr Leu Val Ala Lys Ser
            260                 265                 270

Asn Gly Ser Gly Ser Asn Trp Gly Ala Thr Ile Gln Thr Asn Gly Ser
        275                 280                 285

Trp Thr Trp Pro Thr Val Thr Cys Ser Ala Gly
    290                 295

<210> SEQ ID NO 33
<211> LENGTH: 299
<212> TYPE: PRT
<213> ORGANISM: Streptomyces beijiangensis

<400> SEQUENCE: 33

Asp Thr Val Val Asn Ser Asn Gln Thr Gly Thr Asn Gly Tyr Tyr
1               5                   10                  15

Tyr Ser His Trp Ser Asp Gly Gly Ser Val Ser Met Thr Leu Gly
            20                  25                  30

Ser Gly Gly Asn Tyr Gly Tyr Gln Trp Ser Asn Val Gly Asn Phe Val
        35                  40                  45

Gly Gly Lys Gly Trp Ser Thr Gly Gly Arg Lys Ser Val Asn Tyr Ser
    50                  55                  60

Gly Ser Phe Asn Pro Ser Gly Asn Ala Tyr Leu Ala Leu Tyr Gly Trp
65                  70                  75                  80

Thr Thr Asn Pro Leu Val Glu Tyr Tyr Val Val Glu Asn Phe Gly Thr
                85                  90                  95

Tyr Arg Pro Thr Gly Thr Phe Lys Gly Thr Val Thr Ser Asp Gly Gly
            100                 105                 110

Thr Tyr Asp Ile Tyr Glu Thr Thr Arg Val Asn Gln Pro Ser Ile Glu
        115                 120                 125

Gly Thr Lys Thr Phe Lys Gln Tyr Trp Ser Val Arg Gln Ser Lys Arg
    130                 135                 140

Thr Gly Gly Thr Ile Thr Thr Gly Asn His Phe Asp Ala Trp Ser Ser
145                 150                 155                 160
```

```
His Gly Met Ser Met Gly Ser Phe Asn Tyr Met Ile Met Ala Thr Glu
            165                 170                 175

Gly Tyr Gln Ser Ser Gly Ser Ser Asn Ile Thr Val Ser Glu Gly Ser
        180                 185                 190

Ser Gly Gly Gly Thr Gly Gly Gly Thr Gly Gly Thr Gly Gly
        195                 200                 205

Gly Gly Ser Gly Gly Cys Thr Ala Thr Leu Ser Ala Gly Asp Lys Trp
        210                 215                 220

Ser Asp Arg Tyr Asn Leu Asn Val Ser Val Gly Ala Gly Asn Trp
225                 230                 235                 240

Thr Val Thr Met Lys Val Pro Ser Pro Glu Lys Val Leu Ser Thr Trp
                245                 250                 255

Asn Val Ser Ala Ala Tyr Pro Asp Ser Gln Thr Leu Val Ala Lys Ser
            260                 265                 270

Asn Gly Ser Gly Ser Asn Trp Gly Ala Thr Ile Gln Thr Asn Gly Ser
        275                 280                 285

Trp Thr Trp Pro Thr Val Thr Cys Ser Ala Gly
    290                 295

<210> SEQ ID NO 34
<211> LENGTH: 188
<212> TYPE: PRT
<213> ORGANISM: Fusarium oxysporum

<400> SEQUENCE: 34

Thr Gln Pro Thr Thr Gly Thr Ser Gly Gly Tyr Tyr Phe Ser Phe Trp
1               5                   10                  15

Thr Asp Thr Pro Asn Ser Val Thr Tyr Thr Asn Gly Asn Gly Gly Gln
                20                  25                  30

Phe Ser Met Gln Trp Ser Asn Gly Asn His Val Gly Gly Lys Gly
            35                  40                  45

Trp Met Pro Gly Thr Ser Arg Thr Ile Lys Tyr Ser Gly Ser Tyr Asn
    50                  55                  60

Pro Asn Gly Asn Ser Tyr Leu Ala Val Tyr Gly Trp Thr Arg Asn Pro
65                  70                  75                  80

Leu Ile Glu Tyr Tyr Ile Val Glu Asn Phe Gly Thr Tyr Asn Pro Ser
                85                  90                  95

Ser Gly Gly Gln Lys Lys Gly Glu Val Asn Val Asp Gly Ser Val Tyr
            100                 105                 110

Asp Ile Tyr Val Ser Thr Arg Val Asn Ala Pro Ser Ile Asp Gly Asn
        115                 120                 125

Lys Thr Phe Gln Gln Tyr Trp Ser Val Arg Arg Asn Lys Arg Ser Ser
    130                 135                 140

Gly Ser Val Asn Thr Gly Ala His Phe Gln Ala Trp Lys Asn Val Gly
145                 150                 155                 160

Leu Asn Leu Gly Thr His Asp Tyr Gln Ile Leu Ala Val Glu Gly Tyr
                165                 170                 175

Tyr Ser Ser Gly Ser Ala Ser Met Thr Val Ser Gln
            180                 185

<210> SEQ ID NO 35
<211> LENGTH: 189
<212> TYPE: PRT
<213> ORGANISM: Aspergillus clavatus

<400> SEQUENCE: 35
```

-continued

```
Ala Gly Thr Pro Ser Ser Thr Gly Trp Asn Asn Gly Tyr Tyr Tyr Ser
1               5                   10                  15

Phe Trp Thr Asp Asn Gly Gly Thr Val Asn Tyr Gln Asn Gly Asn Gly
            20                  25                  30

Gly Ser Tyr Ser Val Gln Trp Lys Asp Thr Gly Asn Phe Val Gly Gly
            35                  40                  45

Lys Gly Trp Asn Pro Gly Ser Ala Arg Thr Ile Asn Tyr Ser Gly Ser
50                      55                  60

Phe Asn Pro Ser Gly Asn Ala Tyr Leu Thr Val Tyr Gly Trp Thr Thr
65                  70                  75                  80

Asn Pro Leu Val Glu Tyr Tyr Ile Val Glu Asn Tyr Gly Thr Tyr Asn
                85                  90                  95

Pro Gly Asn Gly Gly Thr Tyr Arg Gly Ser Val Tyr Ser Asp Gly Ala
            100                 105                 110

Asn Tyr Asn Ile Tyr Thr Ala Thr Arg Tyr Asn Ala Pro Ser Ile Glu
            115                 120                 125

Gly Asp Lys Thr Phe Thr Gln Tyr Trp Ser Val Arg Gln Ser Lys Arg
            130                 135                 140

Thr Gly Gly Thr Val Thr Thr Ala Asn His Phe Asn Ala Trp Ala Gln
145                 150                 155                 160

Leu Gly Met Ser Leu Gly Thr His Asn Tyr Gln Ile Val Ala Thr Glu
                165                 170                 175

Gly Tyr Gln Ser Ser Gly Ser Ser Ile Thr Val Tyr
            180                 185
```